United States Patent
Tao et al.

(10) Patent No.: US 10,745,028 B2
(45) Date of Patent: Aug. 18, 2020

(54) METHOD, APPARATUS AND DEVICE FOR OBSTACLE IN LANE WARNING

(71) Applicant: BEIJING BAIDU NETCOM SCIENCE TECHNOLOGY CO., LTD., Beijing (CN)

(72) Inventors: Sheng Tao, Beijing (CN); Huo Cao, Beijing (CN); Zeshu Shen, Beijing (CN); Haisong Wang, Beijing (CN); Ji Tao, Beijing (CN); Dewang Song, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/136,190

(22) Filed: Sep. 19, 2018

(65) Prior Publication Data

US 2019/0202476 A1 Jul. 4, 2019

(30) Foreign Application Priority Data

Dec. 28, 2017 (CN) .......................... 2017 1 1464686

(51) Int. Cl.
*B60W 50/14* (2020.01)
*H04W 4/46* (2018.01)
(Continued)

(52) U.S. Cl.
CPC ......... *B60W 50/14* (2013.01); *G06K 9/00805* (2013.01); *G08G 1/056* (2013.01);
(Continued)

(58) Field of Classification Search
None
See application file for complete search history.

(56) References Cited

U.S. PATENT DOCUMENTS

| 5,078,013 A | 1/1992 | Kuramochi |
| 2004/0090319 A1* | 5/2004 | Kimura ................. G08G 1/167 340/435 |

(Continued)

FOREIGN PATENT DOCUMENTS

| CN | 104252796 A | 12/2014 |
| CN | 104269071 A | 1/2015 |

(Continued)

OTHER PUBLICATIONS

First Office Action of the priority application.
Second Office Action of the parallel CA application.

*Primary Examiner* — John F Mortell
(74) *Attorney, Agent, or Firm* — J.C. Patents

(57) ABSTRACT

Provided are a method, an apparatus and a device for obstacle in lane warning. The method includes receiving information of an obstacle in a front lane of a first vehicle, where the first vehicle is in front of a second vehicle; and performing an obstacle warning on the second vehicle according to the information of the obstacle. The second vehicle receives the information of the obstacle, and performs the obstacle warning on the second vehicle according to the information of the obstacle to prevent the second vehicle from failing to detect the obstacle in a blind area when the sight of the second vehicle is blocked by the first vehicle; the front vehicle notifies the subsequent vehicle of the obstacle in the lane immediately, which facilitates the driver to handle the situation in advance, improves the vehicle's ability to sense the obstacle and prevents the collision from occurring.

55 Claims, 24 Drawing Sheets

(51) Int. Cl.
    *G06K 9/00*         (2006.01)
    *G08G 1/16*         (2006.01)
    *G08G 1/0967*     (2006.01)
    *G08G 1/056*      (2006.01)
    *G07C 5/00*       (2006.01)
    *G08G 1/07*        (2006.01)

(52) U.S. Cl.
    CPC . *G08G 1/096725* (2013.01); *G08G 1/096783* (2013.01); *G08G 1/162* (2013.01); *G08G 1/163* (2013.01); *G08G 1/164* (2013.01); *G08G 1/166* (2013.01); *H04W 4/46* (2018.02); *B60W 2050/143* (2013.01); *G07C 5/008* (2013.01); *G08G 1/07* (2013.01)

(56) References Cited

U.S. PATENT DOCUMENTS

2014/0343836 A1* 11/2014 Maise ............... G08G 1/166
                                                  701/301
2016/0071418 A1* 3/2016 Oshida ............... G08G 1/205
                                                  701/23

FOREIGN PATENT DOCUMENTS

| CN | 104408970 A | 3/2015 |
| CN | 105976631 A | 9/2016 |
| CN | 106314424 A | 1/2017 |
| CN | 106448266 A | 2/2017 |
| CN | 107346612 A | 11/2017 |
| CN | 107358816 A | 11/2017 |
| CN | 107444406 A | 12/2017 |
| JP | 2002269695 A | 9/2002 |
| JP | 2017151798 A | 8/2017 |

* cited by examiner

METHOD, APPARATUS AND DEVICE FOR OBSTACLE IN LANE WARNING

CROSS-REFERENCE TO RELATED APPLICATIONS

This application claims priority to Chinese Patent Application No. 201711464686.X, filed on Dec. 28, 2017, which is hereby incorporated by reference in its entirety.

TECHNICAL FIELD

The embodiments of the present disclosure relate to the field of intelligent transportation and, in particular, to a method, an apparatus and a device for obstacle in lane warning.

BACKGROUND

In the prior art, while a vehicle is driving along, there might be an obstacle in the driving lane. However, when the driver has restricted range of visibility because the driver's line-of-sight is hindered or partly hindered, the driver might not be able to spot the obstacle in lane fast enough, leading to traffic accident.

SUMMARY

The embodiments of the present disclosure provide a method, an apparatus and a device for obstacle in lane warning to improve the vehicle's ability to sense the obstacle and prevent the collision from occurring.

A first aspect of embodiments of the present disclosure is to provide a method for obstacle in lane warning, including:

receiving information of an obstacle in a front lane of a first vehicle, wherein the first vehicle is in front of a second vehicle; and performing an obstacle warning on the second vehicle according to the information of the obstacle.

A second aspect of embodiments of the present disclosure is to provide a method for obstacle in lane warning, including:

receiving information of an obstacle in a front lane of a first vehicle; and performing an obstacle warning on a second vehicle behind the first vehicle according to the information of the obstacle.

A third aspect of embodiments of the present disclosure is to provide an apparatus for obstacle in lane warning, including:

a transceiving module, configured to receive information of an obstacle in a front lane of a first vehicle, wherein the first vehicle is in front of a second vehicle; and an early warning module, configured to perform an obstacle warning on the second vehicle according to the information of the obstacle.

A fourth aspect of embodiments of the present disclosure is to provide an apparatus for obstacle in lane warning, including:

a receiving module, configured to receive information of an obstacle in a front lane of a first vehicle; and an early warning module, configured to perform an obstacle warning on a second vehicle behind the first vehicle according to the information of the obstacle.

A fifth aspect of the embodiments of the present disclosure provides a terminal device including: a memory and a processor;

wherein the memory is configured to store a program code;

the processor is configured to call the program code, which, when being executed, is configured to perform the method described in the first aspect.

A sixth aspect of the embodiments of the present disclosure provides a traffic control unit including: a memory and a processor;

wherein the memory is configured to store a program code;

the processor is configured to call the program code, which, when being executed, is configured to perform the method described in the second aspect.

A seventh aspect of the embodiments of the present disclosure is to provide a computer readable storage medium including instructions, which, when being executed on a computer, cause the computer to perform the method of the first aspect.

An eighth aspect of the embodiments of the present disclosure is to provide a computer readable storage medium including instructions, which, when being executed on a computer, cause the computer to perform the method of the second aspect.

According to the method, apparatus and device for obstacle in lane warning in embodiments of the present disclosure, the second vehicle receives the information of the obstacle in the front lane of the first vehicle in front of the second vehicle, and perform the obstacle warning on the second vehicle according to the information of the obstacle to prevent the second vehicle from failing to detect the obstacle in a blind area when the sight of the second vehicle is blocked by the first vehicle; the front vehicle notifies the subsequent vehicle of the obstacle in the lane immediately, which facilitates the driver to handle the situation in advance, improves the vehicle's ability to sense the obstacle and prevents the collision from occurring.

BRIEF DESCRIPTION OF THE DRAWINGS

Accompanying drawings, which are incorporated into and constitute a part of the present specification, illustrate embodiments consistent with the present disclosure and serve to explain the principles of the present disclosure together with the specification.

Through the above drawings, specific embodiments of the present disclosure have been shown, and a more detailed description will be given below. These figures and text descriptions are not intended to limit the scope of the present disclosure in any way, but the concept of the present disclosure will be explained for those skilled in the art by referring to specific embodiments.

DESCRIPTION OF EMBODIMENTS

Exemplary embodiments will be described in detail herein, examples of which are illustrated in the accompanying drawings. When the following description refers to the accompanying drawings, unless otherwise indicated, like numerals in different drawings indicate the same or similar elements. Embodiments described in the following exemplary embodiments do not represent all embodiments consistent with the present disclosure. Instead, they are merely examples of apparatus and method consistent with some aspects of the disclosure as detailed in the appended claims.

First, the terms involved in the present disclosure are explained as follows:

Traffic Control Unit (TCU): refers to a functional entity that forms the control subsystem in the intelligent transportation system, which coordinates the traffic activities of vehicles, roads, and pedestrians based on traffic information to ensure the safety and efficiency of the traffic. Where the traffic information includes information of vehicles, pedestrians, roads, facilities, weather, etc., which may be obtained by vehicles, pedestrians, or road side units.

Local Control Unit (LCU): refers to a traffic control unit that is responsible for coordinating traffic activities within a specific area in the managing scope of the intelligent transportation system.

Global Control Unit (GCU): refers to a traffic control unit that is responsible for coordinating the globally involved traffic activities and the local traffic control units within the managing scope of the intelligent transportation system.

Road Side Unit (RSU): includes a traffic information collection unit or a traffic facility control unit that is deployed in the vicinity of the road, where the former provides collected traffic information to the traffic control unit, and the latter implements the control instruction the traffic control unit applies on control traffic facilities.

Host Vehicle (HV): refers to a target vehicle with an on board unit and running applications.

Remote Vehicle (RV): refers to a background vehicle that may cooperate with the host vehicle and may broadcast V2X information regularly.

Autonomous Vehicle (AV): refers to a smart car that realizes driverless driving.

Illegal Vehicle (IV): refers to a vehicle that violates traffic regulations.

Figure 1:
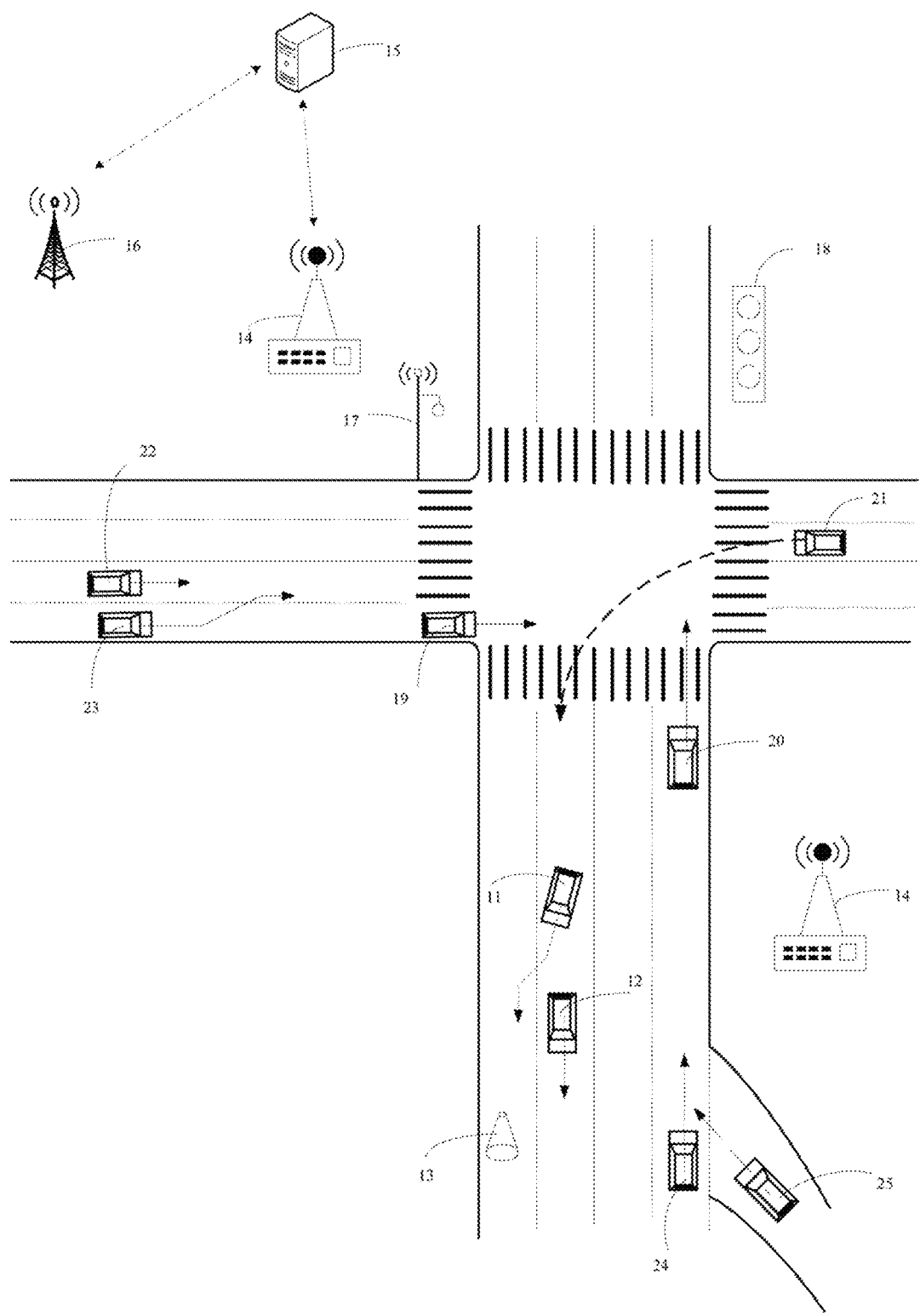
FIG. 1 is an architecture diagram of an intelligent transportation network provided by an embodiment of the present disclosure.

FIG. 1 is an architecture diagram of an intelligent transportation network provided by an embodiment of the present disclosure. As shown in FIG. 1, the intelligent transportation network includes driving vehicles such as a vehicle 11, a vehicle 12, an obstacle 13, a traffic control unit 14, a remote server 15, a base station 16, a road side unit 17, a traffic facility 18 (e.g., a traffic light), a vehicle 19, a vehicle 20, a vehicle 21, a vehicle 22, a vehicle 23, a vehicle 24, a vehicle 25, and the like. This is only a schematic illustration and does not specifically define the intelligent transportation network.

In the intelligent transportation network, wireless communication may be performed between the vehicles, between the vehicle and the traffic control unit, or among the traffic control unit, the remote server, the road side unit and the base station, where the remote server or traffic control unit may also control the traffic facilities, and the like. Some vehicles are provided with a trip computer or an On Board Unit (OBU), while some vehicles carry with a user terminal such as a mobile phone. The mobile phone, trip computer or OBU in the vehicle may communicate with the network side device, where the network side device may specifically be a traffic control unit, a base station, a road side unit, and the like.

A control apparatus may be disposed on the traffic light arranged in an intersection, and may control the switch on and off of signal lights of different colors on the traffic light, where the control manner for the control apparatus to control the switch on and off of the signal lights may be as follows: the control apparatus performs the control according to a preset control mechanism; or alternatively, the control device receives a control instruction transmitted by the remote server, and controls the switch on and off of the signal lights according to the control instruction.

In the present embodiment, the control device may further transmit color information of the signal light which is currently switched on to the vehicles in the vicinity of the intersection to realize a warning of the signal light; or the control device may transmit the color information of the signal light which is currently switched on and the current time to the vehicles in the vicinity of the intersection; or the control device may transmit the color information of the signal light which is currently switched on, position information of the traffic light, and the current time to the vehicles in the vicinity of the intersection.

A variety of functions may be realized through the intelligent transportation network shown in FIG. 1, where the embodiment introduces the following functions:

One function is Obstacle in Lane Warning (OILW). The OILW refers to a case where when an autonomous vehicle (AV) detects a presence of an obstacle (such as falling rock, littered object, dead branch, etc.) in the front lane while the AV is running, and thus determines a presence of a risk of collision, it warns a rear host vehicle (HV) by transmitting information of the obstacle (size, position, type, and etc.) thereto. This application is applicable to the risk of collision of obstacles on all roads. Correspondingly, an application (APP) which is installed on a mobile phone, a trip computer, or an OBU in the rear vehicle may implement the function of OILW. As shown in FIG. 1, the vehicle 11 (HV) is running behind the vehicle 12 (AV). When the vehicle 12 detects that there is an obstacle 13 in the driving direction, the vehicle 12 may transmit the information of the obstacle 13 to the vehicle 11, thereby avoiding a collision of the vehicle 11 and the obstacle after a lane change resulted from a case that the sight of the vehicle 11 is blocked by the vehicle 12.

Another function is Illegal Vehicle Warning (IVW). The IVW refers to a case where when the traffic control unit detects that an vehicle (RV) has an illegal behavior, information of an illegal vehicle (IV) is transmitted to a host vehicle (HV) via the wireless communication means; and according to the content of the received message, the host vehicle (HV) identifies the RV as the illegal vehicle; and if the identified illegal vehicle may affect the driving route of the host vehicle, a mobile phone, a trip computer or an OBU in the host vehicle (HV) warns the HV to pay attention. This application applies to the passage of all types of roads. An application (APP) which is installed on a mobile phone, a trip computer or an OBU in the host vehicle (HV), may implement the function of IVW. As shown in FIG. 1, a vehicle entering an intersection may transmit its vehicle information to the traffic control unit 14, and the traffic control unit 14 may detect the illegal vehicle according to the vehicle information; or the traffic control unit 14 may detect the illegal vehicle via the road side unit 17 which may specifically be a camera. For example, the vehicle 19 is an illegal vehicle, i.e., the IV, and the vehicle 19 is running a red light, when the vehicle 20 (HV) enters the intersection, the traffic control unit 14 may transmit the information of the illegal vehicle to the vehicle 20, so that the vehicle 20 avoids a collision with the illegal vehicle.

A further function is Cooperative Intersection (CI). The CI refers to a case where when a host vehicle is driving to an intersection and entering a control scope of a traffic control unit, an OBU of the host vehicle transmits a passage request for intersection to the traffic control unit, where passage request for intersection includes vehicle driving information and driving intention information; then the traffic control unit transmits a traffic directing instruction to the OBU of the host vehicle according to the passage request for intersection and traffic control phase information of the intersection, where the traffic directing instruction includes a green light passage instruction, a red light stop instruction, a follow-up driving instruction, a lane change driving instruction and the like; the OBU of the host vehicle controls the host vehicle to drive through the intersection according to the traffic directing instruction in conjunction with surrounding environment information sensed by V2X function or other on board sensors. This application is applicable to the passage of the intersections on ordinary roads and highways in cities and suburbs, as well as the intersections at the expressway entrances. An application (APP) which is installed on a mobile phone, a trip computer, or the OBU in the host vehicle (HV), may implement the function of CI. As shown in FIG. 1, the vehicle 21 may be an HV, the vehicle 21 may transmit a passage request for intersection to the traffic control unit 14, the passage request for intersection includes vehicle driving information and driving intention information of the vehicle 21; the traffic control unit 14 may transmit a traffic directing instruction to the vehicle 21 according to traffic control phase information of the intersection corresponding to the driving intention information of the vehicle 21. For example, if the traffic control phase information is a red light, the traffic control unit 14 transmits a red light stop instruction to the vehicle 21, so that the vehicle 21 stops in front of a stop line in a lane where the vehicle 21 is located.

A further function is Collaborative Lane Change (CLC). The CLC includes three sub-applications: Collaborative Discretionary Lane Change (CDLC), Collaborative Vehicle Confluence (CVC), and Collaborative Reverse Vehicle Routing (CRVR).

The Collaborative Discretionary Lane Change (CDLC) refers to a case where a host vehicle (HV-1) which needs to perform a lane change during the drive transmits driving intention information to a host vehicle (HV-2) in relevant lanes (the current lane and a target lane) or a traffic control unit, then the HV-2 performs an acceleration or a deceleration, or the traffic control unit performs a general coordination according to the request so that the HV may smoothly complete the passage. As shown in FIG. 1, the vehicle 23 may specifically be the HV-1, and the vehicle 22 may specifically be the HV-2, and the vehicle 23 needs to perform a lane change during the drive, then the vehicle 23 transmits driving intention information regarding the lane change to the vehicle 22; after receiving the driving intention information regarding the lane change of the vehicle 23, a mobile phone, a trip computer, or the OBU in the vehicle 22 warns the driver in the vehicle 22 that the vehicle 23 needs to perform the lane change, and the driver decides to decelerate or accelerate. Alternatively, the vehicle 23 may also transmit its driving intention information regarding the lane change to the traffic control unit 14; the traffic control unit 14 controls the vehicle 23 and the vehicle 22 according to driving speeds of the vehicle 23 and the vehicle 22. For example, if the driving speed of the vehicle 23 is greater than the driving speed of the vehicle 22, the traffic control unit 14 may transmit prompt information for an acceleration to the vehicle 23, and transmit prompt information for a deceleration to the vehicle 22, thereby avoiding a collision between the vehicle 23 and the vehicle 22.

The collaborative Vehicle Confluence (CVC) refers to a case where when a traffic control unit receives a confluence request from a host vehicle (HV-1) or determines that the host vehicle (HV-1) enters a confluence area, the traffic control unit determines whether there is another host vehicle (HV-2) in the confluence area, which has a confluence priority higher than a confluence priority of the host vehicle (HV-1), by obtaining confluence priorities of each vehicle in the confluence area, so as to perform a general coordination on the passage order of the relevant vehicles at the confluence intersection; if the traffic control unit determines that there is the another host vehicle (HV-2) in the confluence area, which has the confluence priority higher than the confluence priority of the host vehicle (HV-1), then the traffic control unit performs a determination and transmits a control instruction to the host vehicle (HV-1) to control the host vehicle (HV-1) to decelerate or stop, so that the host vehicle (HV-2) performs a confluence driving preferentially; and if the traffic control unit determines that there is no host vehicle (HV-2) in the confluence area, which has the confluence priority higher than the confluence priority of the host vehicle (HV-1), then the traffic control unit performs a determination and transmits a control instruction to the host vehicle (HV-1) to control the confluence driving of the host vehicle (HV-1). As shown in FIG. 1, the vehicle 25 may specifically be the HV-1, and the vehicle 24 may specifically be the HV-2. The vehicle 25 transmits a confluence request to the traffic control unit 14, and the traffic control unit 14 determines the passage order of each vehicle at the confluence intersection according to the confluence priorities of each vehicle in the confluence area. For example, the vehicle 24 and the vehicle 25 are simultaneously in the intersection, with the vehicle 24 on a main road while the vehicle 25 on a side road, where the vehicles on the main road and the side road have different road right levels, specifically, the vehicle on the side road has a road right level lower than a road right level of the vehicle on the main road, that is, the vehicle 24 has a higher confluence priority than the confluence priority of the vehicle 25, the traffic control unit 14 transmits a control instruction to the vehicle 25 for controlling the vehicle 25 to decelerate or stop, so that the vehicle 24 performs the confluence driving preferentially.

The Collaborative Reverse Vehicle Routing (CRVR) refers to a case where: the traffic control unit generates a reverse vehicle routing passage strategy of a vehicle (including an instruction for controlling a reverse vehicle routing passage of the vehicle) according to a reverse vehicle routing request (including a reason for reverse vehicle routing), a movement trend of the vehicle and preset traffic rules, and transmits the reverse vehicle routing passage strategy to the vehicle to ensure that the vehicle safely and efficiently conducts the reverse vehicle routing under a direction of the traffic control unit.

The Obstacle in Lane Warning (OILW), the Illegal Vehicle Warning (IVW), the Cooperative Intersection (CI) and the Collaborative Lane Change (CLC) described in the embodiments of the present disclosure are applications in the Enhanced Set of Applications (ESA) based on collaborative intelligent transportation. In addition, the enhanced set of applications based on collaborative intelligent transportation is not limited to these applications.

The specific application scenario of the present disclosure is applicable to a typical application of cooperative intelligent transportation which is defined based on requirements for intelligent network automatic driving application such as road safety, traffic efficiency and information service.

In the following, the Obstacle in Lane Warning (OILW), the Illegal Vehicle Warning (IVW), the Cooperative Intersection (CI) and the Collaborative Lane Change (CLC) are sequentially introduced in detail in conjunction with the accompanying drawings.

Obstacle in Lane Warning (OILW) refers to a case where when a vehicle in front, such as an autonomous vehicle (AV), detects a presence of an obstacle (such as falling rock, littered object, dead branch, etc.) in the front lane while the vehicle is running, and thus determines a presence of a risk of collision, it warns a rear host vehicle (HV) by transmitting information of the obstacle (size, position, type, and etc.) thereto. The OILW application notifies the subsequent vehicle of the obstacle in the lane immediately, which facilitates the driver to handle the situation in advance, improves the vehicle's ability to sense the obstacle and prevents the collision from occurring.

Figure 2:
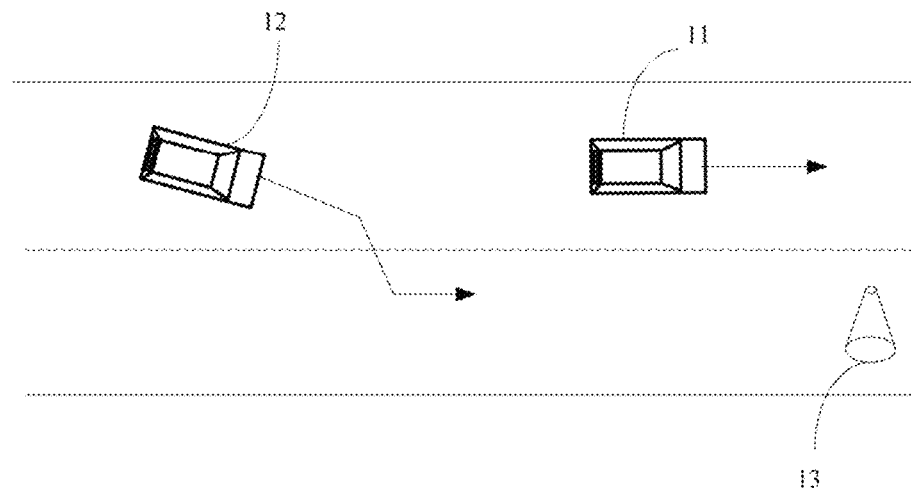
FIG. 2 is a schematic diagram of a main scenario of OILW provided by an embodiment of the present disclosure.

A main scenario of the OILW may be as shown in FIG. 2, where the first vehicle 11 runs in front of the second vehicle 12, and the first vehicle 11 may be specifically an AV, and the second vehicle 12 may be specifically an HV. The second vehicle 12 is ready to overtake, but the sight of the second vehicle 12 may be blocked by the first vehicle 11. The second vehicle 12 and the first vehicle 11 are provided with wireless communication capabilities. In addition, the first vehicle 11 is further provided with a detection device which may detect an obstacle in the front lane of the first vehicle 11. It can be understood that the front lane of the first vehicle 11 is not limited to the dead ahead lane of the first vehicle 11, but may also be the right front lane of the first vehicle 11, the left front lane of the first vehicle 11 and the like. The detection device may be specifically a radar, an ultrasonic wave detection device, a time of flight (TOF) ranging detection device, a visual detection device, a laser detection device and combinations thereof.

As shown in FIG. 2, when the detection device of the first vehicle 11 detects the presence of an obstacle 13 in the front lane of the first vehicle 11, the first vehicle 11 transmits information of the obstacle detected by the detection device to the second vehicle 12. Optionally, the information of the obstacle may include at least one of the following: position information of the obstacle, information of a lane where the obstacle is located. The position information of the obstacle includes longitude, latitude and altitude of the obstacle. Further, the information of the obstacle may further include at least one of the following: size of the obstacle, type of the obstacle, time information and description information of the obstacle. In the present embodiment, a data frame format of the information of the obstacle is as shown in Table 1:

TABLE 1

| DATA | UNIT | REMARKS |
|---|---|---|
| TIME | ms | |
| POSITION (LONGTITUDE, LATITUDE) | deg | |
| POSITION (ALTITUDE) | m | |
| LANE WHERE OBSTACLE IS LOCATED | | |
| SIZE OF OBSTACLE (LENGTH AND WIDTH) | m | |
| TYPE OF OBSTACLE | | INTEGER |
| DESCRIPTION OF OBSTACLE | | STRING |

Specifically, the time in Table 1 may specifically be the time when the first vehicle 11 transmits information of the obstacle to the second vehicle 12, i.e., a timestamp of the system when the information is transmitted. The description of obstacle specifically refers to a classification of obstacle. INTEGER denotes the integer and STRING denotes the string.

Figure 3:
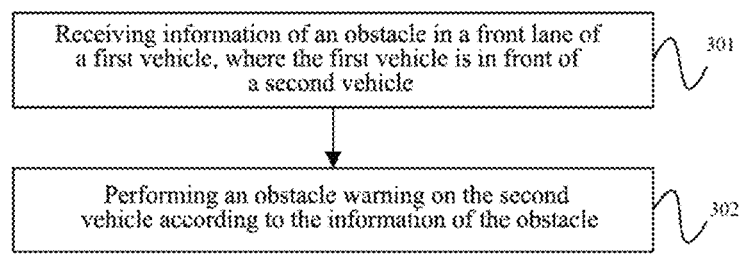
FIG. 3 is a flow diagram of a method for obstacle in lane warning provided by an embodiment of the present disclosure.

FIG. 3 is a flow diagram of a method for obstacle in lane warning provided by an embodiment of the present disclosure. The method for obstacle in lane warning provided by the embodiment of the present disclosure is applied to a terminal device in a host vehicle, for example, a terminal device in the second vehicle 12 as shown in FIG. 2, and the terminal device may be a mobile phone, a trip computer, an OBU and the like. In other embodiments, the method for obstacle in lane warning is also applicable to other devices. The present embodiment is illustrated by taking the terminal device in the second vehicle 12 as an example. The specific steps of the method are as follows:

Step 301: receiving information of an obstacle in a front lane of a first vehicle, where the first vehicle is in front of a second vehicle.

As shown in FIG. 2, the second vehicle 12 may receive information of the obstacle 13 transmitted by the first vehicle 11, where the information of the obstacle 13 is obtained by the first vehicle 11 by detecting the obstacle 13 in its front lane.

Optionally, the first vehicle 11 broadcasts the information of the obstacle 13 to the second vehicle 12, and correspondingly, the second vehicle 12 receives the information of the obstacle 13 transmitted by the first vehicle 11 by broadcasting. The first vehicle 11 (AV) and the second vehicle 12 (HV) are required to have wireless communication capability, and the information of the obstacle 13 is transmitted in a manner of V2V between the second vehicle 12 (HV) and the first vehicle 11 (AV) by wireless communication.

Figure 4:
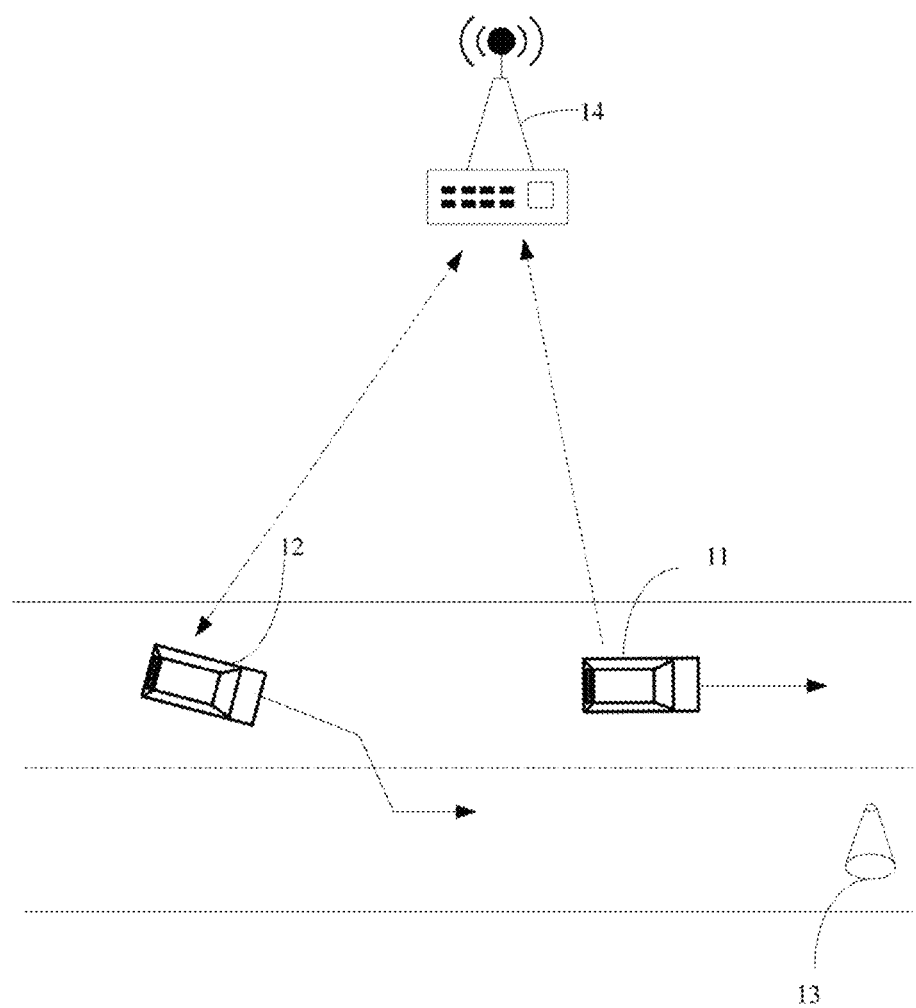
FIG. 4 is a schematic diagram of a main scenario of OILW provided by an embodiment of the present disclosure.

Alternatively, as shown in FIG. 4, a first vehicle 11 may also transmit information of a detected obstacle 13 to a traffic control unit 14, where the traffic control unit 14 may be a road side network side device or a remote network side device. Illustration is made by taking the case where the traffic control unit 14 is a road side network side device as an example. After the traffic control unit 14 receives the information of the obstacle 13 transmitted by the first vehicle 11, it may forward the information of the obstacle 13 to a second vehicle 12. That is, the second vehicle 12 may also receive the information of the obstacle transmitted by the first vehicle 11 and forwarded through the traffic control unit 14.

Figure 5:
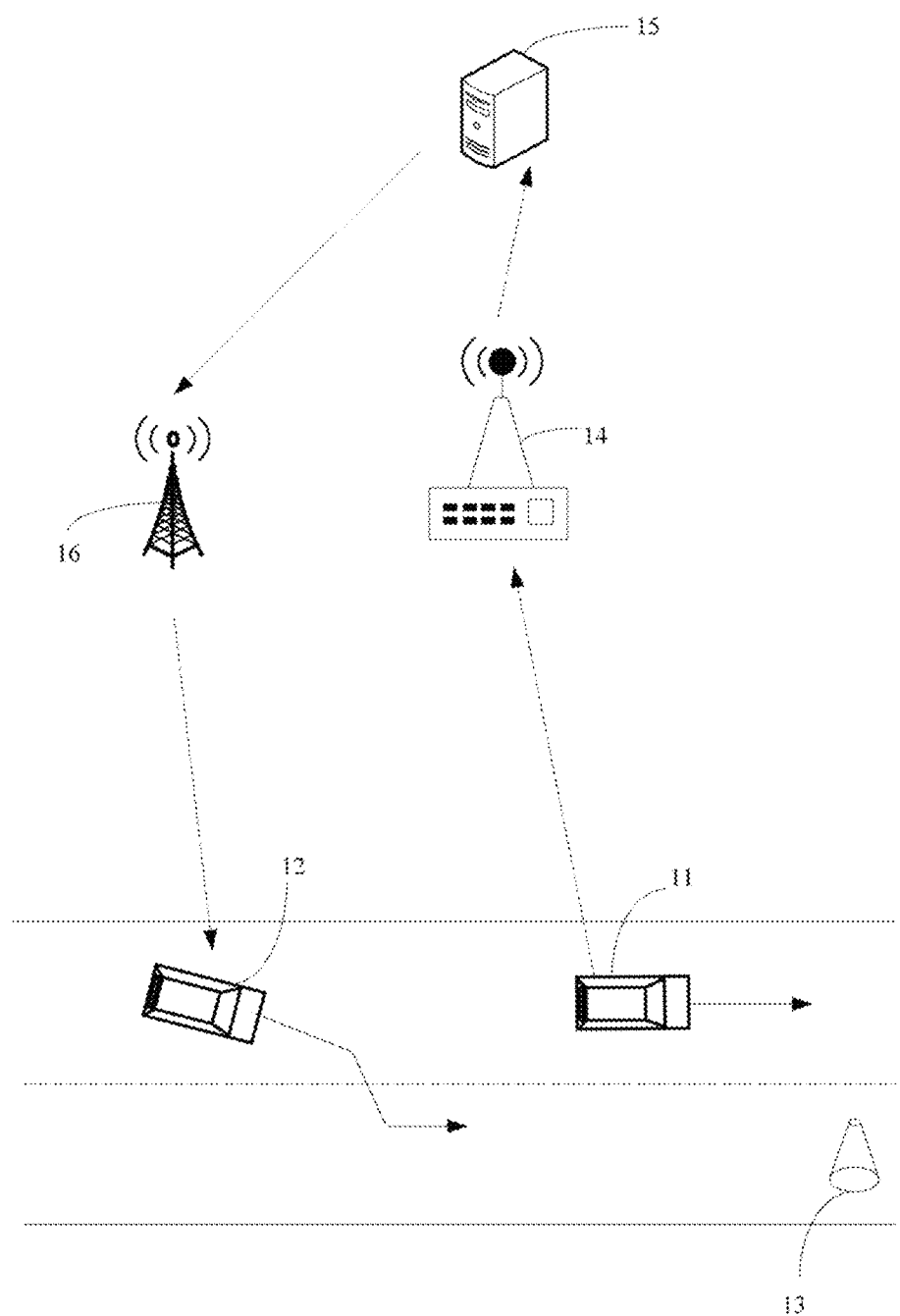
FIG. 5 is a schematic diagram of a main scenario of OILW provided by an embodiment of the present disclosure.

Alternatively, as shown in FIG. 5, a first vehicle 11 transmits the information of an obstacle 13 detected by the first vehicle 11 to a traffic control unit 14, the traffic control unit 14 may further transmits the information of the obstacle 13 to the remote server 15, the remote server 15 transmits the information of the obstacle 13 to a second vehicle 12 through other traffic control units or other transit devices such as the base station 16.

Figure 6:
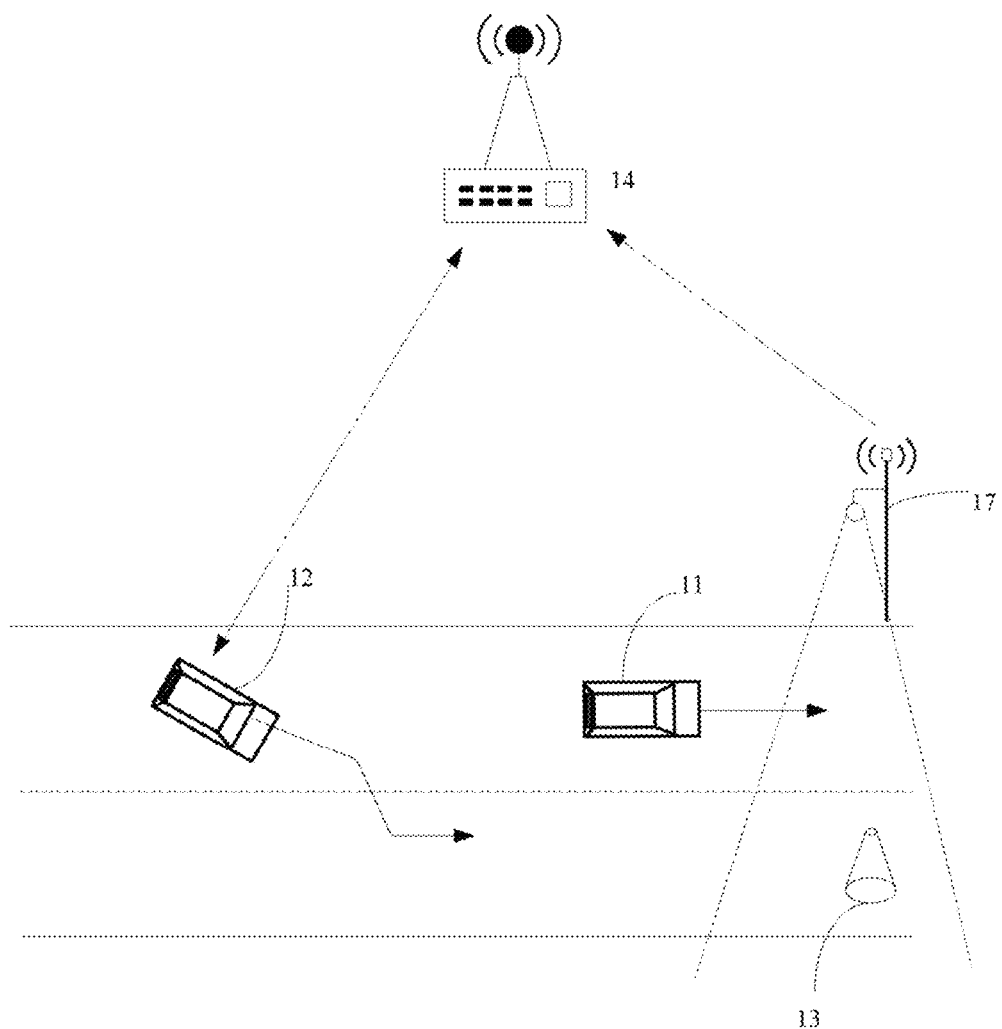
FIG. 6 is a schematic diagram of a main scenario of OILW provided by an embodiment of the present disclosure.

Alternatively, as shown in FIG. 6, when a first vehicle 11 does not have the detection device, the first vehicle 11 is not provided with the wireless communication function or the first vehicle 11 is not an autonomous vehicle, a road side unit 17 in front of the first vehicle 11 may also detect an obstacle such as an obstacle 13 in a driving lane within its sensing range to obtain the information of the obstacle 13, where the road side unit 17 and a traffic control unit 14 are connected through a wired network or a wireless network. Specifically, as shown in FIG. 6, the road side unit 17 and the traffic control unit 14 may perform wireless communication, and the road side device 17 transmits the information of the obstacle 13 detected by the road side unit 17 to the traffic control unit 14, the traffic control unit 14 further transmits the information of the obstacle 13 to the second vehicle 12. That is, a second vehicle 12 may also receive the information of the obstacle 13 transmitted by the traffic control unit 14. At this time, the information of the obstacle 13 is obtained by the road side unit 17 which is in front of the first vehicle 11 detecting the obstacle in the driving lane within its sensing range.

Step 302: performing an obstacle warning on the second vehicle according to the information of the obstacle.

It can be seen that the second vehicle 12 may receive the information of the obstacle 13 through any of the ways as mentioned in FIG. 2, FIG. 4, FIG. 5 and FIG. 6. Specifically, the second vehicle 12 may receive the information of the obstacle 13 through the mobile phone in the vehicle; or the second vehicle 12 is provided with the trip computer which may receive the information of the obstacle 13; or the second vehicle 12 is provided with the On Board Unit (OBU) which may receive the information of obstacle 13. Optionally, a corresponding application (APP) which is installed on the mobile phone, the trip computer or the on board unit in the vehicle may implement the function of OILW, that is, the mobile phone, the trip computer, or the on board unit in the vehicle has the function of OILW. Taking the on board unit as an example for illustration, the on board unit may perform an obstacle warning on the second vehicle 12 according to the information of the obstacle 13.

Specifically, the performing an obstacle warning on the second vehicle according to the information of the obstacle includes: if it is determined that the second vehicle may collide with the obstacle according to the information of the obstacle and vehicle information of the second vehicle, performing the obstacle warning, where the vehicle information of the second vehicle includes at least one of: position information of the second vehicle, information of a lane where the second vehicle is located, a speed of the second vehicle and a driving direction of the second vehicle.

The second vehicle 12 is provided with a plurality of sensors, such as a satellite positioning device, an inertial measurement unit, a vision sensor, a barometer, an ultrasonic sensor, a TOF sensor and the like, to form a sensor system of the second vehicle 12 together, where the satellite positioning device may specifically be a Global Positioning System (GPS) positioning device or Global Navigation Satellite System (GNSS) receiver. The sensor system of the second vehicle 12 may detect information such as position information, a speed, an accelerated speed, an altitude and the like of the second vehicle 12. The on board unit of the second vehicle 12 may be electrically or communicably connected with the sensor system, and may also store an electronic map, thus the onboard unit may determine the information of the lane where the second vehicle 12 is located according to the position information of the second vehicle 12 and the electronic map.

Specifically, when the on board unit of the second vehicle 12 determines that the second vehicle may collide with the obstacle 13 according to the information of the obstacle 13, such as the position information of the obstacle 13, and the vehicle information of the second vehicle 12, such as the position information and the driving direction of the second vehicle 12, it perform the obstacle warning on the second vehicle 12, such as issuing an early warning, and the specific obstacle warning manner will not be defined in the embodiment.

Optionally, a possible implementation for if it is determined that the second vehicle may collide with the obstacle according to the information of the obstacle and the vehicle information of the second vehicle, performing the obstacle warning is: if it is determined that the obstacle is located in the lane where the second vehicle is currently located according to the information of the obstacle and the vehicle information of the second vehicle, performing the obstacle warning.

Figure 7:
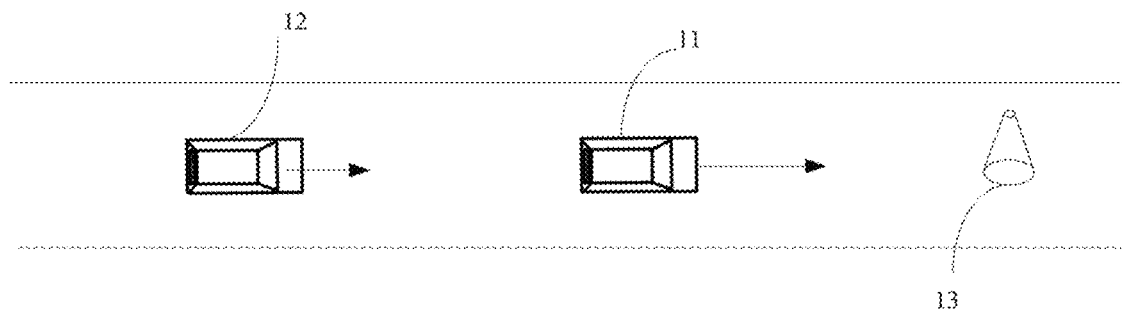
FIG. 7 is a schematic diagram of a main scenario of OILW provided by an embodiment of the present disclosure.

For example, as shown in FIG. 7, an obstacle 13 is in the lane where a second vehicle 12 is currently located. At this time, the on board unit of the second vehicle 12 determines that the obstacle 13 is located in the lane where the second vehicle 12 is currently located according to the information of the obstacle 13, such as the position information of the obstacle 13, and the vehicle information of the second vehicle 12, such as the lane and the driving direction of the second vehicle 12, and performs the obstacle warning.

In addition, when the on board unit of the second vehicle 12 performs the obstacle warning, it may also first determine an obstacle warning timing, and perform the obstacle warning at the obstacle warning timing. The obstacle warning timing may also be referred to as an alarm timing which is required to ensure that the second vehicle 12, such as the HV, has sufficient time to take measures to avoid collision with the obstacle.

Specifically, the if it is determined that the obstacle is located in the lane where the second vehicle is currently located according to the information of the obstacle and vehicle information of the second vehicle, performing the obstacle warning includes: if it is determined that the obstacle is located in the lane where the second vehicle is currently located according to the information of the obstacle and the vehicle information of the second vehicle, performing the obstacle warning when a distance between the second vehicle and the obstacle is within a preset range.

For example, as shown in FIG. 7, if the on board unit of the second vehicle 12 determines that the obstacle 13 is located in the lane where the second vehicle 12 is currently located according to the information of the obstacle 13, such as the position information of the obstacle 13, and the vehicle information of the second vehicle 12, such as the lane and the driving direction of the second vehicle 12, it calculates the distance of the second vehicle 12 with respect to the obstacle 13 in real time. When the distance between the second vehicle 12 and the obstacle 13 is within the preset range, the on board unit of the second vehicle 12 performs the obstacle warning, where the preset range is required to ensure that the second vehicle 12 has sufficient time to take measures to avoid a collision with the obstacle.

In addition, if it is determined that the obstacle is not located in the lane where the second vehicle is currently located according to the information of the obstacle and the vehicle information of the second vehicle, a lane change information of the second vehicle is detected; if it is determined that the second vehicle after performing the lane change may collide with the obstacle according to the lane change information of the second vehicle, the obstacle warning is performed. The lane change information includes at least one of the following: a steering signal and a steering wheel angle, where the steering signal may specifically be a turn light switch signal.

As shown in FIGS. 2, 4, 5 and 6, the obstacle 13 is not in the lane where the second vehicle 12 is currently located, but the obstacle 13 is located in the target lane to which the second vehicle 12 is to change. Specifically, if the on board unit of the second vehicle 12 determines that the obstacle 13 is not located in the lane where the second vehicle 12 is currently located according to the information of the obstacle 13, such as the position information of the obstacle 13, and the vehicle information of the second vehicle 12, such as the lane and the driving direction of the second vehicle 12, then the on board unit of the second vehicle 12 may also detect the turn signal switch signal of the second vehicle 12 through a turn signal switch circuit, or/and the on board unit of the second vehicle 12 may also detect the steering wheel angle of the second vehicle 12 through the steering wheel angle sensor. The on board unit of the second vehicle 12 determines that the second vehicle 12 after performing the lane change may collide with the obstacle 13 according to the turn light switch signal or/and the steering wheel angle, and then performs an obstacle warning.

Optionally, the if it is determined that the second vehicle after performing the lane change may collide with the obstacle according to the lane change information of the second vehicle, performing the obstacle warning includes the following possible implementations:

one possible implementation is: if it is determined that the second vehicle after performing the lane change may collide with the obstacle according to the lane change information of the second vehicle, performing the obstacle warning when a lane change preparation action occurs.

For example, if the on board unit of the second vehicle 12 determines that the second vehicle 12 after performing the lane change may collide with the obstacle 13 according to the turn light switch signal, then when the lane change preparation action occurs, that is, when the second vehicle 12 turns on a turn light and prepares to enter the lane where the obstacle is located, the on board unit performs the obstacle warning, for example, issuing an early warning to warn the second vehicle 12 of a risk of collision in the target lane after the lane change. By taking the time when the second vehicle 12 turns on the turn light and prepares to enter the lane in which the obstacle is located as an early warning timing, the second vehicle 12, such as the HV, may have sufficient time to take measures to avoid collision with the obstacle.

Another possible implementation is: if it is determined that the second vehicle after performing the lane change may collide with the obstacle according to the lane change information of the second vehicle, performing the obstacle warning when a lane change action occurs.

For example, if the on board unit of the second vehicle 12 determines that the second vehicle 12 after performing the lane change may collide with the obstacle 13 according to the steering wheel angle, then when the lane change action occurs, that is, when the steering wheel is turned, the on board unit performs the obstacle warning, for example, issuing an early warning to warn the second vehicle 12 of a risk of collision in the target lane after the lane change. By taking the time when the steering wheel is turned as an early warning timing, the second vehicle 12, such as the HV, may have sufficient time to take measures to avoid collision with an obstacle.

In addition, basic performance requirements of OILW include the following:

A speed range of the host vehicle may be 0-70 km/h.

The communication distance is greater than or equal to 150 meters, where the communication distance includes: a communication distance between the second vehicle 12 and the first vehicle 11, a communication distance between the second vehicle 12 and the traffic control unit 14 and a communication distance between the first vehicle 11 and the traffic control unit 14, and the like.

The data update frequency is less than or equal to 10 HZ, where the data update frequency may specifically be the frequency at which the data packet is transmitted.

The system delay is less than or equal to 100 ms, where the system delay may specifically be the total delay time of wireless signal transmission and reception.

The positioning accuracy is less than or equal to 30 cm, where the positioning accuracy includes: the positioning accuracy of the first vehicle, the positioning accuracy of the second vehicle and the positioning accuracy of the obstacle.

In the embodiment of the present disclosure, the second vehicle receives the information of the obstacle in the front lane of the first vehicle in front of the second vehicle, and perform the obstacle warning on the second vehicle according to the information of the obstacle to prevent the second vehicle from failing to detect the obstacle in a blind area when the sight of the second vehicle is blocked by the first vehicle; the front vehicle notifies the subsequent vehicle of the obstacle in the lane immediately, which facilitates the driver to handle the situation in advance, improves the vehicle's ability to sense the obstacle and prevents the collision from occurring.

Figure 8:
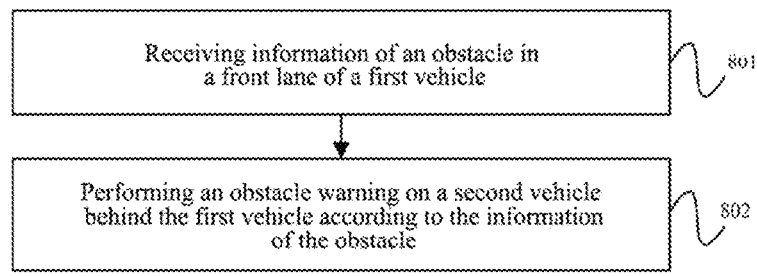
FIG. 8 is a flow diagram of a method for obstacle in lane warning provided by another embodiment of the present disclosure.

FIG. 8 is a flow diagram of a method for obstacle in lane warning provided by another embodiment of the present disclosure. The method for obstacle in lane warning described in the present embodiment is applicable to a traffic control unit. In other embodiments, the method for obstacle in lane warning is also applicable to other devices. The present embodiment is illustrated by taking the traffic control unit as an example. The method for obstacle in lane warning provided in the present embodiment specifically includes the following steps:

Step 801: receiving information of an obstacle in a front lane of a first vehicle, Optionally, the receiving the information of the obstacle in the front lane of the first vehicle includes the following possible implementations:

one possible implementation is: receiving the information of the obstacle transmitted by the first vehicle, where the information of the obstacle is obtained by the first vehicle by detecting the obstacle in its front lane.

As shown in FIG. 4, the traffic control unit 14 receives information of the obstacle 13 transmitted by the first vehicle 11, where the information of the obstacle 13 is obtained by the first vehicle 11 by detecting the obstacle 13 in its front lane.

Another possible implementation is: receiving the information of the obstacle transmitted by a road side unit in front of the first vehicle, where the information of the obstacle is obtained by the road side unit in front of the first vehicle by detecting the obstacle in a driving lane within its sensing range.

As shown in FIG. 6, the traffic control unit 14 receives information of the obstacle 13 transmitted by the road side unit 17 in front of the first vehicle 11, where the information of the obstacle 13 is obtained by the road side unit 17 in front of the first vehicle 11 by detecting the obstacle 13 in a driving lane within its sensing range.

Optionally, the information of the obstacle includes at least one of the following: position information of the obstacle, information of a lane where the obstacle is located. Further, the information of the obstacle further includes at least one of the following: size of the obstacle, type of the obstacle, time information and description information of the obstacle. In the present embodiment, a data frame format of the information of the obstacle is as shown in Table 1.

Step 802: performing an obstacle warning on a second vehicle behind the first vehicle according to the information of the obstacle.

Optionally, the performing the obstacle warning on the second vehicle behind the first vehicle according to the information of the obstacle includes the following possible implementations:

one possible implementation is: transmitting the information of the obstacle to the second vehicle behind the first vehicle, so as to cause the second vehicle to avoid a collision with the obstacle.

As shown in FIG. 4 or FIG. 6, when the traffic control unit 14 receives the information of the obstacle 13, the traffic control unit 14 may transmit the information of the obstacle 13 to the second vehicle 12 behind the first vehicle 11, then the mobile phone, the trip computer, or the on board unit in the second vehicle 12 may perform the obstacle warning on the second vehicle 12 according to the information of the obstacle 13, so as to cause the second vehicle 12 to avoid a collision with the obstacle 13. The specific principle and implementation for the mobile phone, the trip computer, or the on board unit in the second vehicle 12 to perform the obstacle warning on the second vehicle according to the information of the obstacle 13 are as described in the above embodiments, thus details thereof will not be repeated herein.

Another possible implementation is: transmitting obstacle warning information to the second vehicle behind the first vehicle according to the information of the obstacle, so as to cause the second vehicle to avoid a collision with the obstacle.

As shown in FIG. 4 or FIG. 6, when the traffic control unit 14 receives the information of the obstacle 13, the traffic control unit 14 may not transmit the information of the obstacle 13 to the second vehicle 12, but transmits obstacle warning information to warn the second vehicle 12 of a risk of collision to cause the second vehicle 12 to avoid a collision with the obstacle 13.

Yet another possible implementation is: receiving vehicle information of the second vehicle behind the first vehicle transmitted by the second vehicle; if it is determined that the second vehicle may collide with the obstacle according to the information of the obstacle and the vehicle information of the second vehicle, performing the obstacle warning on the second vehicle, so as to cause the second vehicle to avoid a collision with the obstacle. Optionally, the vehicle information of the second vehicle includes at least one of: position information of the second vehicle, information of a lane where the second vehicle is located, a speed of the second vehicle and a driving direction of the second vehicle.

For example, as shown in FIG. 4 or FIG. 6, the second vehicle 12 may also transmit the vehicle information of the second vehicle 12 to the traffic control unit 14, where the vehicle information of the second vehicle 12 may specifically be the position information and the driving direction of the second vehicle 12. The traffic control unit 14, when determining that the second vehicle 12 may collide with the obstacle 13 according to the information of the obstacle 13, such as the position information of the obstacle 13, and the vehicle information of the second vehicle 12, such as the position information and the driving direction of the second vehicle 12, performs the obstacle warning on the second vehicle 12, so as to cause the second vehicle 12 to avoid a collision with the obstacle. The manner in which the traffic control unit 14 performs the obstacle warning on the second vehicle 12 may be that: the traffic control unit 14 transmits an obstacle warning information to the second vehicle 12; or the traffic control unit 14 transmits an audio signal for the obstacle warning to the directional sound horn on the road side, where the directional sound horn may directionally play the audio signal to the second vehicle 12; or the traffic control unit 14 transmits obstacle warning information to a directional display screen, such as a Light Emitting Diode (LED) display screen, on the road side, where the directional display screen may display the obstacle warning information to cause the second vehicle 12 passing the directional display screen to observe the obstacle warning information.

Optionally, a possible implementation for if it is determined that the second vehicle may collide with the obstacle according to the information of the obstacle and the vehicle information of the second vehicle, performing the obstacle warning on the second vehicle is: if it is determined that the obstacle is located in the lane where the second vehicle is currently located according to the information of the obstacle and the vehicle information of the second vehicle, performing the obstacle warning on the second vehicle.

Figure 9:
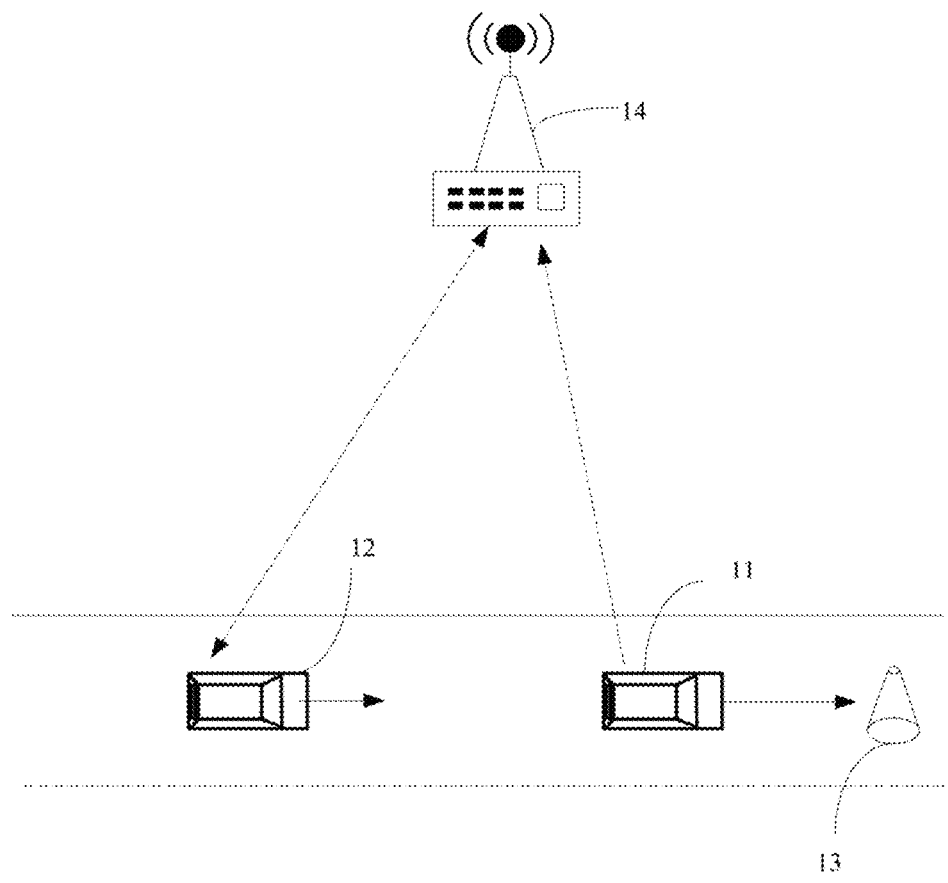
FIG. 9 is a schematic diagram of a main scenario of OILW provided by another embodiment of the present disclosure.

For example, as shown in FIG. 9, an obstacle 13 is in the lane where a second vehicle 12 is currently located. At this time, a traffic control unit 14 determines that the obstacle 13 is located in the lane where the second vehicle 12 is currently located according to the information of the obstacle 13, such as the position information of the obstacle 13, and the vehicle information of the second vehicle 12, such as the lane and the driving direction of the second vehicle 12, and transmits obstacle warning information to the second vehicle 12 to cause the second vehicle 12 to avoid a collision with the obstacle.

Further, when the traffic control unit 14 transmits the obstacle warning information to the second vehicle 12, it may also first determine a transmission timing for the obstacle warning information, and transmit the obstacle warning information to the second vehicle 12 at the transmission timing. The transmission timing is required to ensure that the second vehicle 12, such as the HV, has sufficient time to take measures to avoid a collision with the obstacle.

Specifically, the if it is determined that the obstacle is located in the lane where the second vehicle is currently located according to the information of the obstacle and the vehicle information of the second vehicle, performing the obstacle warning on the second vehicle includes: if it is determined that the obstacle is located in the lane where the second vehicle is currently located according to the information of the obstacle and the vehicle information of the second vehicle, performing the obstacle warning on the second vehicle when a distance between the second vehicle and the obstacle is within a preset range.

For example, as shown in FIG. 9, if the traffic control unit 14 determines that the obstacle 13 is located in the lane where the second vehicle 12 is currently located according to the information of the obstacle 13, such as the position information of the obstacle 13, and the vehicle information of the second vehicle 12, such as the lane and the driving direction of the second vehicle 12, it calculates the distance of the second vehicle 12 with respect to the obstacle 13 in real time. When the distance between the second vehicle 12 and the obstacle 13 is within the preset range, the traffic control unit 14 transmits the obstacle warning information to the second vehicle 12, where the preset range is required to ensure that the second vehicle 12 has sufficient time to take measures to avoid a collision with the obstacle.

In addition, the vehicle information of the second vehicle includes: lane change information of the second vehicle. The if it is determined that the second vehicle may collide with the obstacle according to the information of the obstacle and the vehicle information of the second vehicle, performing the obstacle warning on the second vehicle includes: if it is determined that the second vehicle after performing the lane change may collide with the obstacle according to the information of the obstacle and the vehicle information of the second vehicle, performing the obstacle warning on the second vehicle. The lane change information includes at least one of the following: a steering signal and a steering wheel angle, where the steering signal may specifically be a turn light switch signal.

As shown in FIG. 4 or FIG. 6, the obstacle 13 is not in the lane where the second vehicle 12 is currently located, but the obstacle 13 is located in the target lane to which the second vehicle 12 is to change. Specifically, if the traffic control unit 14 determines that the obstacle 13 is not located in the lane where the second vehicle 12 is currently located according to the information of the obstacle 13, such as the position information of the obstacle 13, and the vehicle information of the second vehicle 12, such as the lane and the driving direction of the second vehicle 12, then the traffic control unit 14 may also determine whether the second vehicle 12 after performing the lane may collide with the obstacle 13 according to the lane change information transmitted by the second vehicle 12, such as the steering signal, the steering wheel angle, and the information of the obstacle 13, such as the position information of the obstacle 13. If the traffic control unit 14 determines that the second vehicle 12 after performing the lane change may collide with the obstacle 13, then the traffic control unit 14 transmits the obstacle warning information to the second vehicle 12.

In the present embodiment, the traffic control unit receives the information of the obstacle in the front lane of the first vehicle, and performs the obstacle warning to the second vehicle behind the first vehicle according to the information of the obstacle to prevent the second vehicle from failing to detect the obstacle in a blind area when the sight of the second vehicle is blocked by the first vehicle; the traffic control unit notifies the subsequent vehicle immediately, which facilitates the driver to handle the situation in advance, improves the vehicle's ability to sense the obstacle and prevents the collision from occurring.

Figure 10:
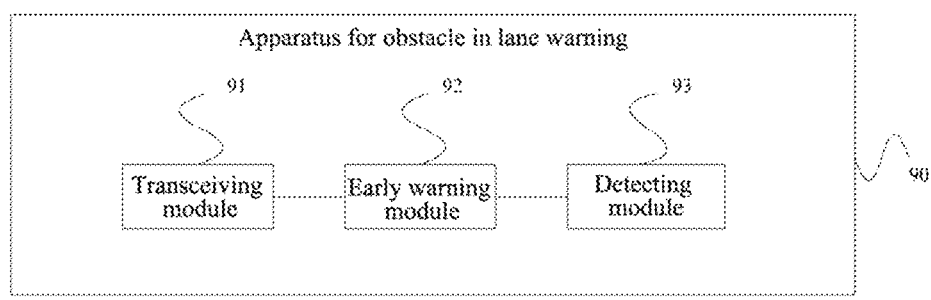
FIG. 10 is a structural diagram of an apparatus for obstacle in lane warning provided by an embodiment of the present disclosure.

FIG. 10 is a structural diagram of an apparatus for obstacle in lane warning provided by an embodiment of the present disclosure. The apparatus for obstacle in lane warning provided by the embodiment of the present disclosure may perform the processing provided by the embodiment of the method for obstacle in lane warning. As shown in FIG. 10, the apparatus for obstacle in lane warning 90 includes: a transceiving module 91 and an early warning module 92. The apparatus for obstacle in lane warning 90 may be specifically integrated into a mobile phone, a trip computer or an on board unit in the second vehicle 12, and is configured to implement the OILW application. Specifically, the transceiving module 91 is configured to receive information of an obstacle in a front lane of a first vehicle, where the first vehicle is in front of a second vehicle; and the early warning module 92 is configured to perform an obstacle warning on the second vehicle according to the information of the obstacle.

Optionally, the transceiving module 91 is specifically configured to receive the information of the obstacle transmitted by the first vehicle, where the information of the obstacle is obtained by the first vehicle by detecting the obstacle in its front lane.

Optionally, the transceiving module 91 is specifically configured to receive the information of the obstacle transmitted by the first vehicle by broadcasting.

Optionally, the transceiving module 91 is specifically configured to receive the information of the obstacle transmitted by the first vehicle and forwarded through the traffic control unit.

Optionally, the transceiving module 91 is specifically configured to receive the information of the obstacle transmitted by traffic control unit, where the information of the obstacle is obtained by the road side unit in front of the first vehicle by detecting the obstacle in a driving lane within its sensing range, and the road side unit and the traffic control unit are connected through a wired network or a wireless network.

Optionally, the early warning module 92 is specifically configured to perform the obstacle warning when it is determined that the second vehicle may collide with the obstacle according to the information of the obstacle and the vehicle information of the second vehicle.

Optionally, the early warning module 92 is specifically configured to perform the obstacle warning when it is determined that the obstacle is located in a lane where the second vehicle is currently located according to the information of the obstacle and the vehicle information of the second vehicle.

Optionally, the early warning module 92 is specifically configured to perform the obstacle warning when it is determined that the obstacle is located in the lane where the second vehicle is currently located and a distance between the second vehicle and the obstacle is within a preset range according to the information of the obstacle and the vehicle information of the second vehicle.

Optionally, the apparatus for obstacle in lane warning 90 further includes: a detecting module 93; the detecting module 93 is configured to detect lane change information of the second vehicle; the early warning module 92 is further configured to determine that the obstacle is not located in the lane where the second vehicle is currently located according to the information of the obstacle and the vehicle information of the second vehicle, and perform an obstacle warning if it is determined that the second vehicle after performing a lane change may collide with the obstacle according to the lane change information of the second vehicle.

Optionally, the lane change information includes at least one of the following: a steering signal and a steering wheel angle.

Optionally, the early warning module 92 is specifically configured to perform the obstacle warning when it is determined that the second vehicle after performing the lane change may collide with the obstacle according to the lane change information of the second vehicle and a lane change preparation action occurs.

Optionally, the early warning module 92 is specifically configured to perform the obstacle warning when it is determined that the second vehicle after performing the lane change may collide with the obstacle according to the lane change information of the second vehicle and a lane change action occurs.

Optionally, the vehicle information of the second vehicle includes at least one of the following: position information of the second vehicle, information of the lane where the second vehicle is located, a speed of the second vehicle and a driving direction of the second vehicle.

Optionally, the information of the obstacle includes at least one of the following: position information of the obstacle and information of a lane where the obstacle is located.

Optionally, the information of the obstacle further includes at least one of the following: size of the obstacle, type of the obstacle, time information and description information of the obstacle.

The apparatus for obstacle in lane warning provided by the embodiment of the present disclosure may be specifically configured to perform the above method embodiment provided in FIG. 3, and specific functions will not be repeated herein again.

In the embodiment of the present disclosure, the second vehicle receives the information of the obstacle in the front lane of the first vehicle in front of the second vehicle, and perform the obstacle warning on the second vehicle according to the information of the obstacle to prevent the second vehicle from failing to detect the obstacle in a blind area when the sight of the second vehicle is blocked by the first vehicle; the front vehicle notifies the subsequent vehicle of the obstacle in the lane immediately, which facilitates the driver to handle the situation in advance, improves the vehicle's ability to sense the obstacle and prevents the collision from occurring.

Figure 11:
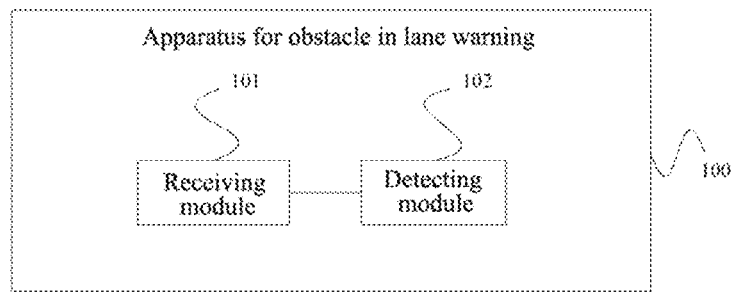
FIG. 11 is a structural diagram of an apparatus for obstacle in lane warning provided by another embodiment of the present disclosure.

FIG. 11 is a structural diagram of an apparatus for obstacle in lane warning provided by another embodiment of the present disclosure. The apparatus for obstacle in lane warning provided by the embodiment of the present disclosure may perform the processing provided by the embodiment of the method for obstacle in lane warning. As shown in FIG. 11, the apparatus for obstacle in lane warning 100 includes: a receiving module 101 and an early warning module 102. The apparatus for obstacle in lane warning 100 may be specifically integrated into the traffic control unit 14, and is configured to implement the OILW application. Specifically, the receiving module 101 is configured to receive information of an obstacle in a front lane of a first vehicle; the early warning module 102 is configured to perform an obstacle warning on a second vehicle behind the first vehicle according to the information of the obstacle.

Optionally, the receiving module 101 is specifically configured to receive the information of the obstacle transmitted by the first vehicle, where the information of the obstacle is obtained by the first vehicle by detecting the obstacle in its front lane.

Optionally, the receiving module 101 is specifically configured to receive the information of the obstacle transmitted by a road side unit in front of the first vehicle, where the information of the obstacle is obtained by the road side unit in front of the first vehicle by detecting the obstacle in a driving lane within its sensing range.

Optionally, the early warning module 102 is specifically configured to transmit the information of the obstacle to the second vehicle behind the first vehicle, so as to cause the second vehicle to avoid a collision with the obstacle.

Optionally, the early warning module 102 is specifically configured to transmit obstacle warning information to the second vehicle behind the first vehicle according to the information of the obstacle, so as to cause the second vehicle to avoid a collision with the obstacle.

Optionally, the receiving module 101 is further configured to receive vehicle information of the second vehicle transmitted by the second vehicle behind the first vehicle; the early warning module 102 is specifically configured to perform the obstacle warning on the second vehicle of an obstacle to cause the second vehicle to avoid a collision with the obstacle when it is determined that the second vehicle may collide with the obstacle according to the information of the obstacle and the vehicle information of the second vehicle.

Optionally, the early warning module 102 is specifically configured to perform the obstacle warning on the second vehicle when it is determined that the obstacle is located in a lane where the second vehicle is currently located according to the information of the obstacle and the vehicle information of the second vehicle.

Optionally, the early warning module 102 is specifically configured to perform the obstacle warning on the second vehicle if it is determined that the obstacle is located in the lane where the second vehicle is currently located and a distance between the second vehicle and the obstacle is within a preset range according to the information of the obstacle and the vehicle information of the second vehicle.

Optionally, the vehicle information of the second vehicle includes: lane change information of the second vehicle; the early warning module 102 is specifically configured to perform the obstacle warning on the second vehicle when it is determined that the second vehicle after performing a lane change may collide with the obstacle according to the information of the obstacle and the vehicle information of the second vehicle.

Optionally, the lane change information includes at least one of the following: a steering signal and a steering wheel angle.

Optionally, the vehicle information of the second vehicle includes at least one of the following: position information of the second vehicle, information of the lane where the second vehicle is located, a speed of the second vehicle and a driving direction of the second vehicle.

Optionally, the information of the obstacle includes at least one of the following: position information of the obstacle and information of a lane where the obstacle is located.

Optionally, the information of the obstacle further includes at least one of the following: size of the obstacle, type of the obstacle, time information and description information of the obstacle.

The apparatus for obstacle in lane warning provided by the embodiment of the present disclosure may be specifically configured to perform the above method embodiment provided in FIG. 8, and specific functions will not be repeated herein again.

In the embodiment of the present disclosure, the traffic control unit receives the information of the obstacle in the front lane of first vehicle and performs the obstacle warning on the second vehicle behind the first vehicle according to the information of the obstacle to prevent the second vehicle from failing to detect the obstacle in a blind area when the sight of the second vehicle is blocked by the first vehicle; the traffic control unit notifies the subsequent vehicle immediately, which facilitates the driver to handle the situation in advance, improves the vehicle's ability to sense the obstacle and prevents the collision from occurring.

Figure 12:
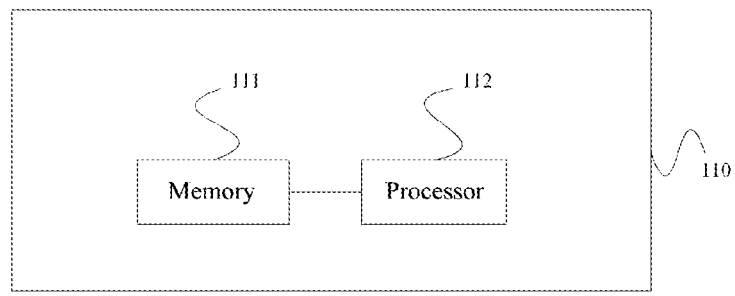
FIG. 12 is a structural diagram of a terminal device provided by an embodiment of the present disclosure.

FIG. 12 is a structural diagram of a terminal device provided by an embodiment of the present disclosure. The terminal device may be a terminal device in a host vehicle, such as a mobile phone, a trip computer or an on board unit in the second vehicle 12. As shown in FIG. 12, the terminal device 110 includes: a memory 111 and a processor 112; where the memory 111 is configured to store a program code; the processor 112 calls the program code, which, when being executed, is configured to perform the method for obstacle in lane warning described in the above embodiments.

Figure 13:
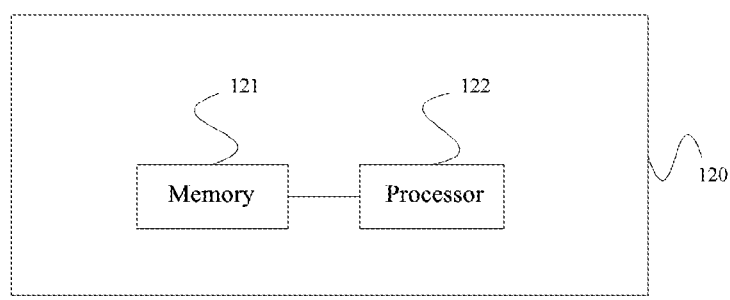
FIG. 13 is a structural diagram of a traffic control unit provided by an embodiment of the present disclosure.

FIG. 13 is a structural diagram of a traffic control unit provided by an embodiment of the present disclosure. As shown in FIG. 13, the traffic control unit 120 includes: a memory 121 and a processor 122; where the memory 121 is configured to store a program code; the processor 122 calls the program code, which, when being executed, is configured to perform the method for obstacle in lane warning described in the above embodiments.

In addition, an embodiment of the present disclosure further provides a computer readable storage medium including instructions, which, when being executed on a computer, cause the computer to perform the method for obstacle in lane warning described in the above embodiments.

The Illegal Vehicle Warning (IVW) refers to a case where: when the traffic control unit detects that an vehicle (RV) has an illegal behavior, information of an illegal vehicle (IV) is transmitted to a host vehicle (HV) via the wireless communication means; and according to the content of the received message, the host vehicle (HV) identifies the RV as the illegal vehicle; and if the identified illegal vehicle may affect the driving route of the host vehicle, an IVW application warns the HV to pay attention. This application applies to the passage of all types of roads. The IVW application may assist the driver to detect the illegal vehicle in advance, thereby avoiding or mitigating a collision and improving the traffic safety.

A main scenario of IVW include the following two types:
one main scenario is that: there are an intersection with a traffic light and an RV that does not obey traffic rules.

Figure 14:
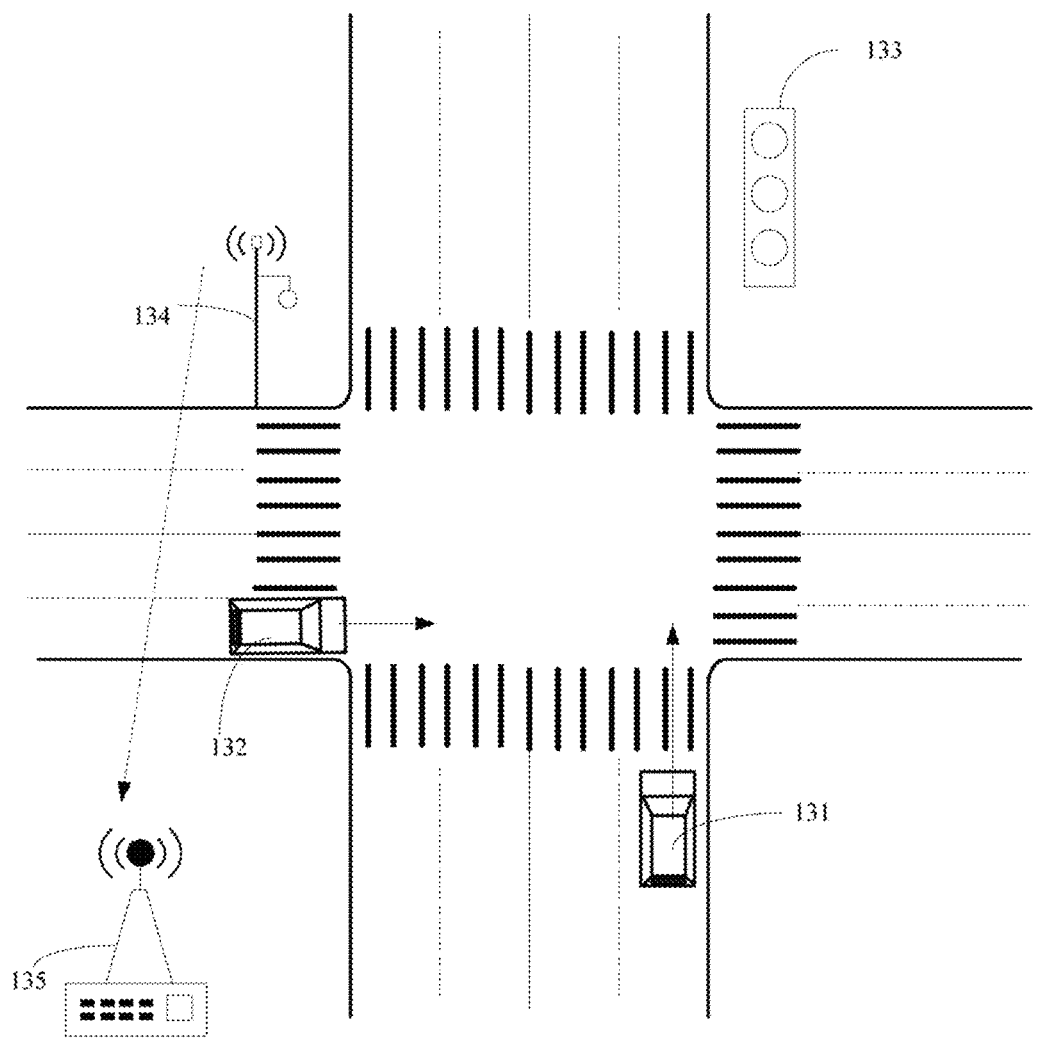
FIG. 14 is a schematic diagram of a main scenario of IVW provided by an embodiment of the present disclosure.

As shown in FIG. 14, a host vehicle 131 drives towards an intersection where a traffic light is a green light, and it is assumed that the host vehicle 131 drives straight, and a traffic light 133 in a straight direction of the host vehicle 131 is the green light; a remote vehicle 132 drives from the left or right side to the intersection, and runs a red light; the host vehicle 131 has a wireless communication capability, and the fact that whether the remote vehicle 132 has a wireless communication capability does not affect an effectiveness of the application scenario; and the intersection is provided with a road side unit 134 and a traffic control unit 135, where the road side unit 134 may specifically be a monitoring device such as a camera, and the traffic control unit 135 has a wireless communication capability.

Another main scenario is that: there is an RV violating the right of way and entering a one-way road in a converse direction.

Figure 15:
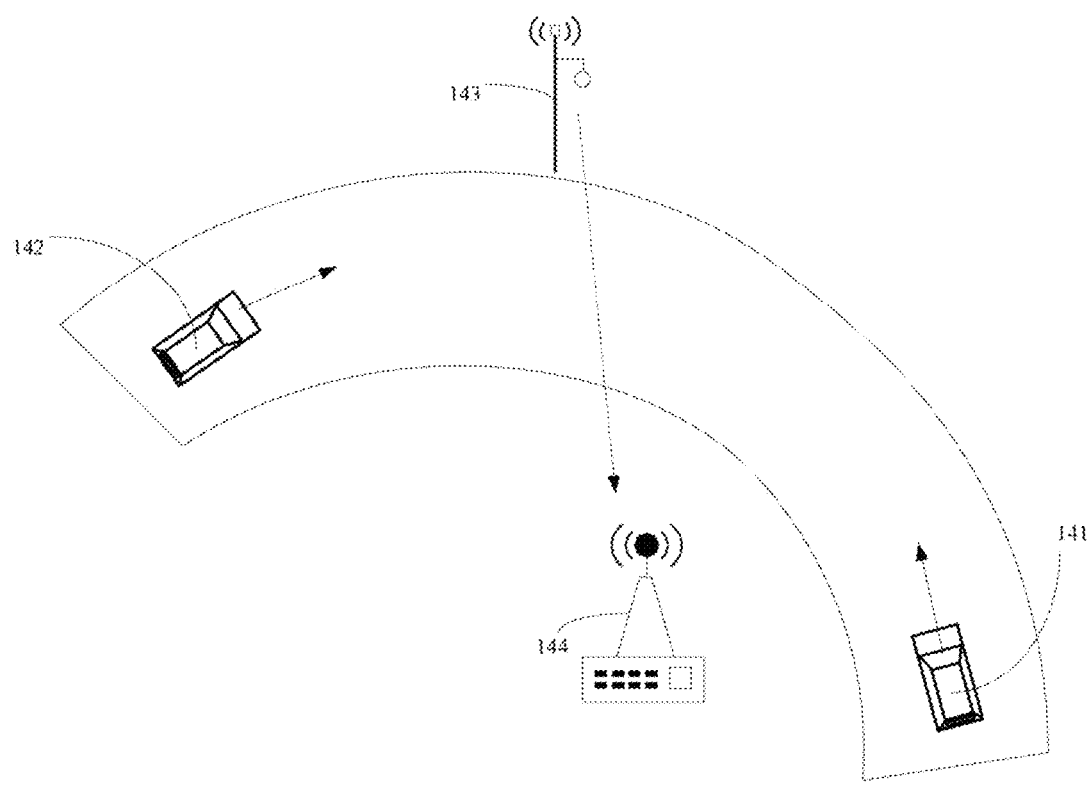
FIG. 15 is a schematic diagram of a main scenario of IVW provided by an embodiment of the present disclosure.

As shown in FIG. 15, a host vehicle 141 normally drives on a one-way road, while a remote vehicle 142 enters the one-way road in the converse direction, and a sight of the host vehicle 141 is blocked by a curve. The host vehicle 141 is required to have a wireless communication capability, and the fact that whether the remote vehicle 142 has a wireless communication capability does not affect an effectiveness of the application scenario. A road side blind area is required to be provided with a road side unit 143 and a traffic control unit 144, where the road side unit 143 may specifically be a monitoring device such as camera, and the traffic control unit 144 has a wireless communication capability.

Figure 16:
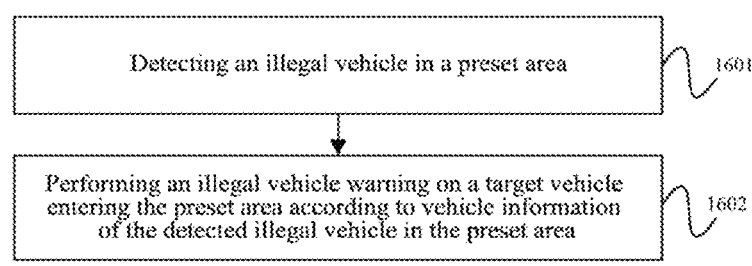
FIG. 16 is a flow diagram of a method for illegal vehicle warning provided by an embodiment of the present disclosure.

FIG. 16 is a flow diagram of a method for illegal vehicle warning provided by an embodiment of the present disclosure. The method for illegal vehicle warning provided by the embodiment of the present disclosure is applicable to a traffic control unit. In other embodiments, the method for illegal vehicle warning is also applicable to other devices. The present embodiment is illustrated by taking the traffic control unit as an example. The traffic control unit may be disposed on a road side or on a remote side. The specific steps of this method are as follows:

Step 1601: detecting an illegal vehicle in a preset area.

The preset area may specifically be the intersection shown in FIG. 14, or may be the curve shown in FIG. 15. As shown in FIG. 14, the traffic control unit 135 may detect an illegal vehicle within the intersection. As shown in FIG. 15, the traffic control unit 144 may detect an illegal vehicle within the curve.

Optionally, the detecting the illegal vehicle in the preset area includes the following implementations:

one possible implementation is: receiving image information of at least one vehicle in the preset area transmitted by at least one road side unit in the preset area; detecting the illegal vehicle in the preset area according to the image information of the at least one vehicle in the preset area.

As shown in FIG. 14, the road side unit 134 may photograph the vehicle in the intersection, and the intersection may be provided with at least one road side unit. The road side unit 134 and the traffic control unit 135 are connected through a wired network or a wireless network. As shown in FIG. 14, the road side unit 134 and the traffic control unit 135 perform wireless communication, and the road side unit 134 transmits the image information of the vehicle in the intersection it photographed to the traffic control unit 135. It will be appreciated that the road side unit 134 is not limited to photographing one vehicle within the intersection. The traffic control unit 135 may detect the illegal vehicle in the intersection according to the image information of the vehicle transmitted by the road side unit 134. In addition, the present embodiment does not limit the specific positions of the road side unit 134 and the traffic control unit 135 within the intersection.

As shown in FIG. 15, the road side unit 143 may photograph the vehicle in the curve, and the curve may be provided with at least one road side unit. The road side unit 143 and the traffic control unit 144 are connected through a wired network or a wireless network. As shown in FIG. 15, the road side unit 143 and the traffic control unit 144 perform wireless communication, and the road side unit 143 transmits the image information of the vehicle in the curve it photographed to the traffic control unit 144. It will be appreciated that the road side unit 143 is not limited to photographing one vehicle within the curve. The traffic control unit 144 may detect the illegal vehicle in the curve according to the image information of the vehicle transmitted by the road side unit 143. In addition, the present embodiment does not limit the specific positions of the road side unit 143 and the traffic control unit 144 within the curve.

Optionally, the detecting the illegal vehicle in the preset area according to the image information of the at least one vehicle in the preset area includes: detecting the vehicle running a red light in the preset area according to the image information of the at least one vehicle in the preset area; or detecting the vehicle running in a converse direction in the preset area according to the image information of the at least one vehicle in the preset area.

As shown in FIG. 14, the traffic control unit 135 may detect a vehicle running the red light, such as the remote vehicle 132, in the intersection according to the image information of the vehicle transmitted by the road side unit 134, i.e., detect that the remote vehicle 132 is an illegal vehicle.

As shown in FIG. 15, the traffic control unit 144 may detect a vehicle running in the converse direction, such as the remote vehicle 142, in the curve according to the image information of the vehicle transmitted by the road side unit 143, i.e., detect that the remote vehicle 142 is an illegal vehicle.

Another possible implementation is: receiving vehicle information of the at least one vehicle transmitted by the at least one vehicle in the preset area; and detecting the illegal vehicle in the preset area according to the vehicle information of the at least one vehicle in the preset area and traffic rules of the preset area. The vehicle information of the at least one vehicle includes at least one of the following: a speed of the at least one vehicle and position information of the at least one vehicle. In addition, the vehicle information of the at least one vehicle further includes at least one of the following: identification information of the at least one vehicle, an accelerated speed of the at least one vehicle, a driving direction of the at least one vehicle and driving intention information of the at least one vehicle.

Figure 17:
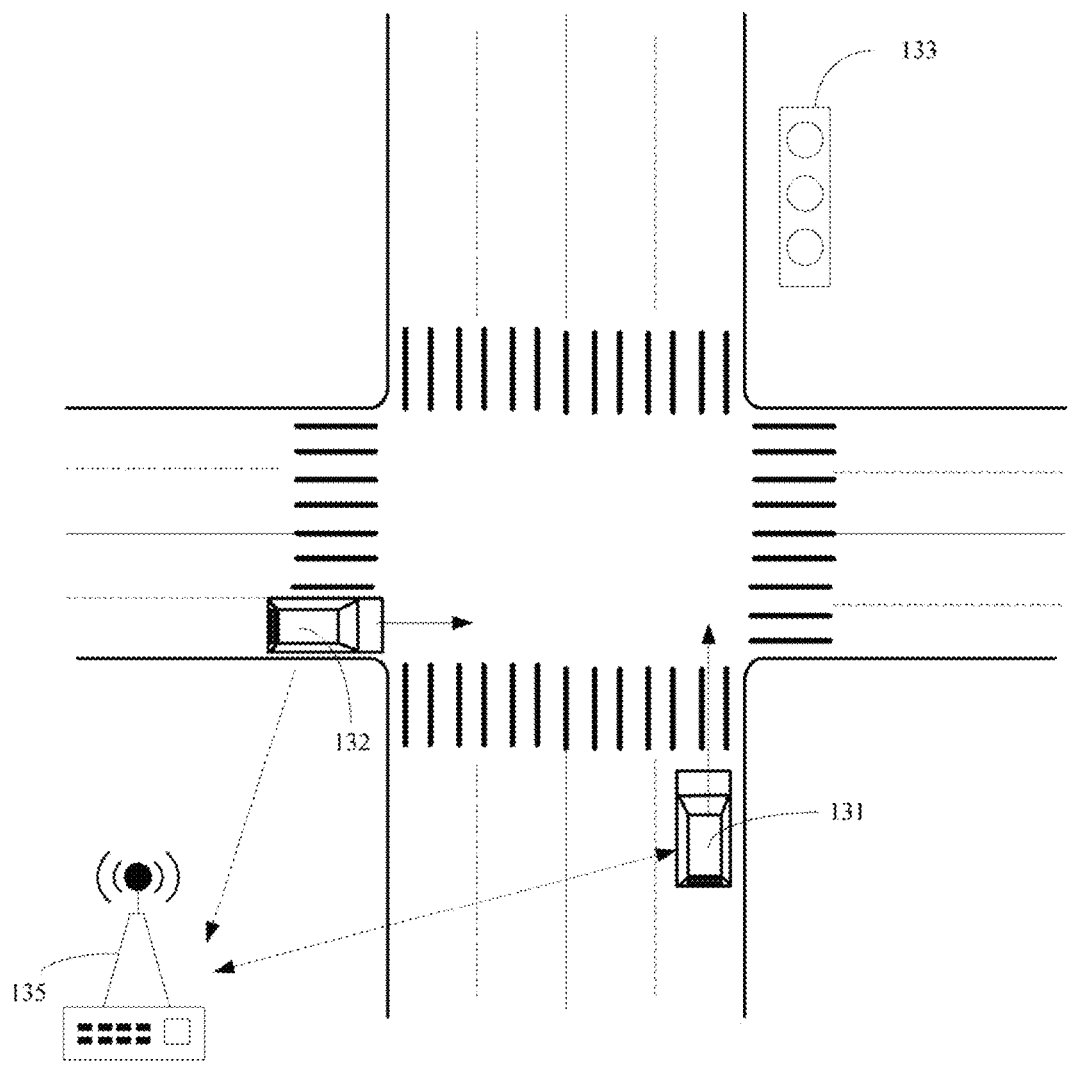
FIG. 17 is a schematic diagram of a main scenario of IVW provided by an embodiment of the present disclosure.

As shown in FIG. 17, a traffic control unit 135 may receive vehicle information of at least one vehicle within the intersection, such as the vehicle information of a remote vehicle 132 transmitted by the remote vehicle 132, the vehicle information of the remote vehicle 132 includes at least one of the following: a speed, position information, identification information such as a license plate number, an accelerated speed, a driving direction and driving intention information such as going straight, left turn, right turn, U-turn, and the like of the remote vehicle 132. The traffic control unit 135 may detect whether the remote vehicle 132 violates traffic rules according to the vehicle information of the remote vehicle 132 and the traffic rules of the current intersection.

Figure 18:
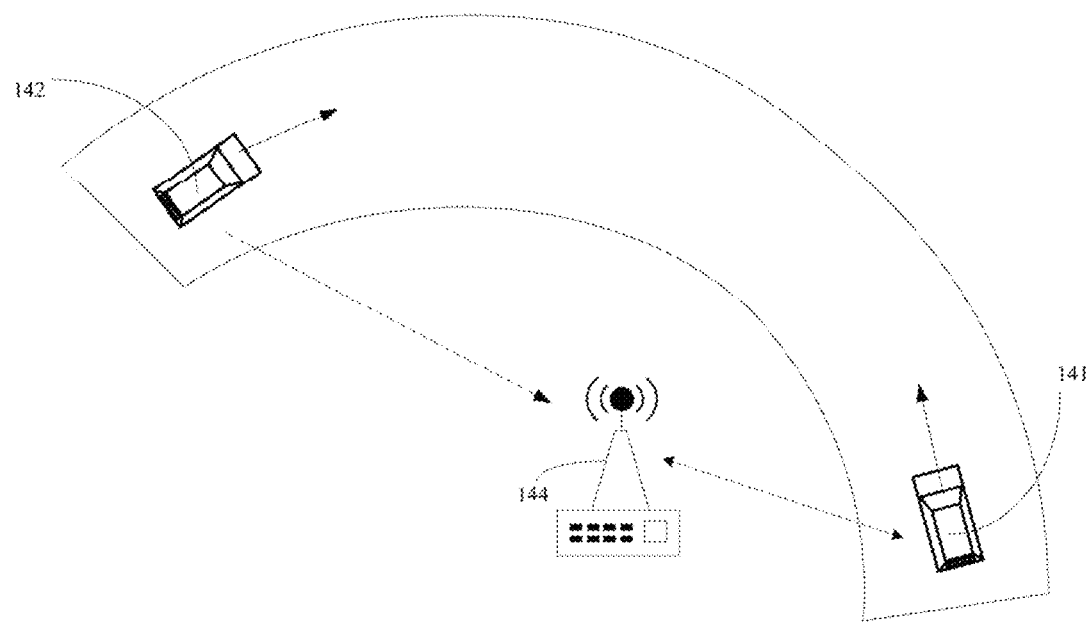
FIG. 18 is a schematic diagram of a main scenario of IVW provided by an embodiment of the present disclosure.

As shown in FIG. 18, a traffic control unit 144 may receive vehicle information of at least one vehicle within the curve, such as the vehicle information of a remote vehicle 142 transmitted by the remote vehicle 142, the vehicle information of the remote vehicle 142 includes at least one of the following: a speed, position information, identification information such as a license plate number, an accelerated speed, a driving direction and driving intention information such as going straight, left turn, right turn, U-turn, and the like of the remote vehicle 142. The traffic control unit 144 may detect whether the remote vehicle 142 violates traffic rules according to the vehicle information of the remote vehicle 142 and the traffic rules of the current curve.

Optionally, the detecting the illegal vehicle in the preset area according to the vehicle information of the at least one vehicle in the preset area and traffic rules of the preset area includes: detecting the vehicle running the red light in the preset area according to the vehicle information of the at least one vehicle in the preset area and traffic control phase information of the preset area.

As shown in FIG. 17, the traffic control unit 135 may determine whether the remote vehicle 132 is running the red light according to the position information of the remote vehicle 132 and the traffic control phase information at the current time such as the indication information of the traffic light.

Optionally, the detecting the illegal vehicle in the preset area according to the vehicle information of the at least one vehicle in the preset area and traffic rules of the preset area includes: detecting the vehicle running in the converse direction in the preset area according to the vehicle information of the at least one vehicle in the preset area and an allowed driving direction of the preset area.

As shown in FIG. 18, the traffic control unit 144 may detect whether the remote vehicle 142 is running in the converse direction according to the driving direction of the remote vehicle 142 and the allowed driving direction in the curve.

Step 1602: performing an illegal vehicle warning on a target vehicle entering the preset area according to the vehicle information of the detected illegal vehicle in the preset area.

Specifically, the performing the illegal vehicle warning on the target vehicle entering the preset area according to the vehicle information of the detected illegal vehicle in the preset area includes the following implementations:

one possible implementation is: transmitting the vehicle information of the detected illegal vehicle in the preset area to the target vehicle entering the preset area, so as to cause the target vehicle to avoid a collision with the illegal vehicle. Specifically, the vehicle information of the illegal vehicle includes at least one of the following: illegal behavior information of the illegal vehicle, and position information of the illegal vehicle. In addition, the vehicle information of the illegal vehicle further includes at least one of the following: the speed of the illegal vehicle, the identification information of the illegal vehicle, the accelerated speed of the illegal vehicle and the driving direction of the illegal vehicle.

As shown in FIG. 14 or FIG. 17, when the traffic control unit 135 detects an illegal vehicle in the intersection, such as the remote vehicle 132, the traffic control unit 135 transmits the vehicle information of the illegal vehicle to the target vehicle, such as the host vehicle 131, entering the intersection to warn the host vehicle 131 to pay attention to the illegal vehicle. The target vehicle may not be limited to the host vehicle 131. It may be understood that the remote vehicle 132 reaches the intersection before the host vehicle 131, and while the remote vehicle 132 has not yet exited the intersection, the host vehicle 131 reaches the intersection. At this time, the traffic control unit 135 transmits the vehicle information of the illegal vehicle detected by the traffic control unit 135, such as the illegal behavior information (running the red light) and the position information of the remote vehicle 132, to the host vehicle 131 to warn the host vehicle 131 to pay attention to the illegal vehicle. In other embodiments, the traffic control unit 135 may also transmit a speed, a license plate number, the accelerated speed, the driving direction and the like of the remote vehicle 132 to the host vehicle 131.

As shown in FIG. 15 or FIG. 18, when the traffic control unit 144 detects an illegal vehicle in the curve, such as the remote vehicle 142, the traffic control unit 144 transmits the vehicle information of the illegal vehicle to the target vehicle, such as the host vehicle 141, entering the curve to warn the host vehicle 141 to pay attention to the illegal vehicle. The target vehicle may not be limited to the host vehicle 141. It may be understood that the remote vehicle 142 reaches the curve before the host vehicle 141, and while the remote vehicle 142 has not yet exited the curve, the host vehicle 141 reaches the curve. At this time, the traffic control unit 144 transmits the vehicle information of the illegal vehicle detected by the traffic control unit 144, such as the illegal behavior information (running in the converse direction) and the position information of the remote vehicle 142, to the host vehicle 141 to warn the host vehicle 141 to pay attention to the illegal vehicle. In other embodiments, the traffic control unit 144 may also transmit the speed, a license plate number, the accelerated speed, the driving direction and the like of the remote vehicle 142 to the host vehicle 141.

Another possible implementation is: transmitting illegal vehicle warning information to the target vehicle entering the preset area according to the vehicle information of the detected illegal vehicle in the preset area, so as to cause the target vehicle to avoid a collision with the illegal vehicle.

As shown in FIG. 14 or FIG. 17, when the traffic control unit 135 detects an illegal vehicle such as the remote vehicle 132 in the intersection, it transmits illegal vehicle warning information to the host vehicle 131 entering the intersection, for example, to warn the host vehicle 131 of a danger in the intersection.

As shown in FIG. 15 or FIG. 18, when the traffic control unit 144 detects an illegal vehicle such as the remote vehicle 142 in the curve, it transmits illegal vehicle warning information to the host vehicle 141 entering the curve, for example, to warn the host vehicle 141 of a danger in the curve.

Yet another possible implementation is: receiving vehicle information of the target vehicle entering the preset area transmitted by the target vehicle; if it is determined that the target vehicle may collide with the illegal vehicle according to the vehicle information of the target vehicle and the vehicle information of the detected illegal vehicle in the preset area, performing the illegal vehicle warning the target vehicle of the illegal vehicle, so as to cause the target vehicle to avoid a collision with the illegal vehicle.

Specifically, the vehicle information of the target vehicle includes at least one of the following: a speed of the illegal vehicle and position information of the target vehicle. In addition, the vehicle information of the target vehicle further includes at least one of the following: identification information of the target vehicle, the accelerated speed of the target vehicle, the driving direction of the target vehicle and the driving intention information of the target vehicle.

As shown in FIG. 14 or FIG. 17, when the host vehicle 131 enters the intersection, the host vehicle 131 may also report the vehicle information of the host vehicle 131, such as the speed and position information of the host vehicle 131, to the traffic control unit 135. In other embodiments, the host vehicle 131 may also report the license plate number, the accelerated speed, the driving direction, the driving intention information and the like of the host vehicle 131 to the traffic control unit 135. The traffic control unit 135 determines whether the host vehicle 131 and the remote vehicle 132 may collide according to the vehicle information of the host vehicle 131 reported by the host vehicle 131 and the vehicle information of the remote vehicle 132 detected by the traffic control unit 135. If the host vehicle 131 and the remote vehicle 132 may collide, the traffic control unit 135 may perform the illegal vehicle warning on the host vehicle 131 in a manner of: transmitting, by the traffic control unit 135, the illegal vehicle warning information to the host vehicle 131 entering the intersection; or transmitting, by the traffic control unit 135, an audio signal for illegal vehicle warning to the directional sound horn on the road side, where the directional sound horn may directionally play the audio signal to the host vehicle 131; or transmitting, by the traffic control unit 135, illegal vehicle warning information to a directional display screen, such as a Light Emitting Diode (LED) display screen, on the road side, where the directional display screen may display the illegal vehicle warning information to cause the host vehicle 131 passing the directional display screen to observe the illegal vehicle warning information, thereby avoiding a collision between the host vehicle 131 and the remote vehicle 132.

As shown in FIG. 15 or FIG. 18, when the host vehicle 141 enters the curve, the host vehicle 141 may also report the vehicle information of the host vehicle 141, such as the speed and position information of the host vehicle 141, to the traffic control unit 144. In other embodiments, the host vehicle 141 may also report the license plate number, the accelerated speed, the driving direction, the driving intention information and the like of the host vehicle 141 to the traffic control unit 144. The traffic control unit 144 determines whether the host vehicle 141 and the remote vehicle 142 may collide according to the vehicle information of the host vehicle 141 reported by the host vehicle 141 and the vehicle information of the remote vehicle 142 detected by the traffic control unit 144. If the host vehicle 141 and the remote vehicle 142 may collide, the traffic control unit 144 may perform the illegal vehicle warning on the host vehicle 141 in a manner of: transmitting, by the traffic control unit 144, the illegal vehicle warning information to the host vehicle 141 entering the curve; or transmitting, by the traffic control unit 144, an audio signal for illegal vehicle warning to the directional sound horn on the road side, where the directional sound horn may directionally play the audio signal to the host vehicle 141; or transmitting, by the traffic control unit 144, illegal vehicle warning information to a directional display screen, such as a Light Emitting Diode (LED) display screen, on the road side, where the directional display screen may display the illegal vehicle warning information to cause the host vehicle 141 passing the directional display screen to observe the illegal vehicle warning information, thereby avoiding a collision between the host vehicle 141 and the remote vehicle 142.

In addition, when the traffic control unit performs the illegal vehicle warning on the target vehicle, it may also first determine an illegal vehicle warning timing, and perform the illegal vehicle warning on the target vehicle at the illegal vehicle warning timing. The illegal vehicle warning timing is required to ensure that the target vehicle has sufficient time to take measures to avoid a collision with the illegal vehicle.

Optionally, the if it is determined that the target vehicle may collide with the illegal vehicle according to the vehicle information of the target vehicle and the vehicle information of the detected illegal vehicle in the preset area, performing the illegal vehicle warning on the target vehicle, so as to cause the target vehicle to avoid a collision with the illegal vehicle includes: if it is determined that the target vehicle may collide with the illegal vehicle according to the vehicle information of the target vehicle and the vehicle information of the detected illegal vehicle in the preset area, calculating a collision time of the target vehicle with the illegal vehicle, and performing the illegal vehicle warning on the target vehicle at a preset time before the collision time. The preset time is related to a braking time of the target vehicle.

As shown in FIG. 14 or FIG. 17, when the traffic control unit 135 determines that the host vehicle 131 and the remote vehicle 132 may collide according to the vehicle information of the host vehicle 131 reported by the host vehicle 131 and the vehicle information of the remote vehicle 132 detected by the traffic control unit 135, it further calculates a collision time of the host vehicle 131 with the remote vehicle 132, and performs the illegal vehicle warning on the host vehicle 131 at a preset time before the collision time. Optionally, the preset time is related to a braking time of the host vehicle 131. For example, the traffic control unit 135 calculates the collision time Ct of the host vehicle 131 with the remote vehicle 132 and the braking time Cb of the host vehicle 131 according to the position information and speed of the host vehicle 131 and the position information and speed of the remote vehicle 132, the traffic control unit 135 then performs the illegal vehicle warning on the host vehicle 131 before Ct–Cb, for example, transmits illegal vehicle information to the host vehicle 131 before Ct–Cb. Taking the time before Ct–Cb as the illegal vehicle warning timing may ensure that the host vehicle 131 has sufficient time to take measures to avoid a collision with the illegal vehicle.

As shown in FIG. 15 or FIG. 18, when the traffic control unit 144 determines that the host vehicle 141 and the remote vehicle 142 may collide according to the vehicle information of the host vehicle 141 reported by the host vehicle 141 and the vehicle information of the remote vehicle 142 detected by the traffic control unit 144, it further calculates a collision time of the host vehicle 141 with the remote vehicle 142, and performs the illegal vehicle warning on the host vehicle 141 at a preset time before the collision time. Optionally, the preset time is related to a braking time of the host vehicle 141. For example, the traffic control unit 144 calculates the collision time Ct of the host vehicle 141 with the remote vehicle 142 and the braking time Cb of the host vehicle 141 according to the position information and speed of the host vehicle 141 and the position information and speed of the remote vehicle 142, the traffic control unit 144 then performs the illegal vehicle warning on the host vehicle 141 before Ct–Cb, for example, transmits illegal vehicle information to the host vehicle 141 before Ct–Cb.

In the present embodiment, the HV and the traffic control unit are provided with the wireless communication capability, and the traffic control unit transmits RV related information to the HV.

In the present embodiment, the traffic control unit detects the illegal vehicle in the preset area, and performs the illegal vehicle warning on the target vehicle entering the preset area of the illegal vehicle according to the vehicle information of the detected illegal vehicle in the preset area, thereby avoiding or mitigating the collision of the target vehicle and the illegal vehicle, and improving the traffic safety of the target vehicle.

Figure 19:
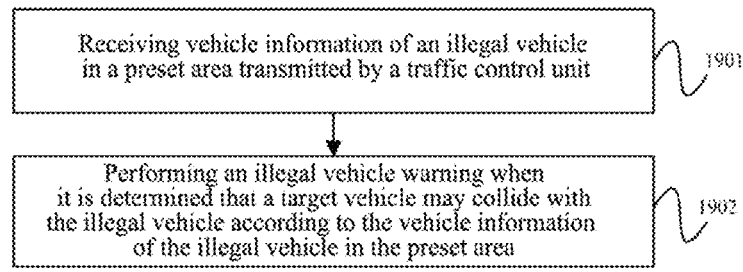
FIG. 19 is a flow diagram of a method for illegal vehicle warning provided by another embodiment of the present disclosure.

FIG. 19 is a flow diagram of a method for illegal vehicle warning provided by another embodiment of the present disclosure. The method for illegal vehicle warning provided by the embodiment of the present disclosure is applicable to a terminal device in a target vehicle entering a preset area. The target vehicle may specifically be a host vehicle, and the terminal device may be a mobile phone, a trip computer, an OBU and the like. In other embodiments, the method for illegal vehicle warning is also applicable to other devices. The present embodiment is illustrated by taking the terminal device in the target vehicle as an example. The specific steps of the method are as follows:

Step 1901: receiving vehicle information of an illegal vehicle in the preset area transmitted by a traffic control unit.

The vehicle information of the illegal vehicle includes at least one of the following: illegal behavior information of the illegal vehicle and position information of the illegal vehicle.

In addition, the vehicle information of the illegal vehicle further includes at least one of the following: a speed of the illegal vehicle, identification information of the illegal vehicle, an accelerated speed of the illegal vehicle and a driving direction of the illegal vehicle.

The preset area is an intersection or a curve.

As shown in FIG. 14 or FIG. 17, when the target vehicle, for example, the host vehicle 131 enters the intersection, the traffic control unit 135 transmits the vehicle information of the illegal vehicle, such as the illegal behavior information (running the red light) of the remote vehicle 132 and the position information of the remote vehicle 132 to the host vehicle 131 to warn the host vehicle 131 to pay attention to the illegal vehicle. In other embodiments, the traffic control unit 135 may also transmit the speed, the license plate number, the accelerated speed, the driving direction and the like of the remote vehicle 132 to the host vehicle 131. Accordingly, the host vehicle 131 receives the vehicle information of the remote vehicle 132 transmitted by the traffic control unit 135. Specifically, the host vehicle 131 may receive the vehicle information of the remote vehicle 132 transmitted by the traffic control unit 135 through the mobile phone in the vehicle; or the host vehicle 131 is provided with a trip computer which may receive the vehicle information of the remote vehicle 132 transmitted by the traffic control unit 135; or, the host vehicle 131 is provided with an On Board Unit (OBU) which may receive the vehicle information of the remote vehicle 132 transmitted by the traffic control unit 135.

Step 1902: performing an illegal vehicle warning when it is determined that the target vehicle may collide with the illegal vehicle according to the vehicle information of the illegal vehicle in the preset area.

Optionally, a corresponding application (APP) which is installed on the mobile phone, the trip computer or the OBU in the host vehicle 131 may implement the IVW function. Taking the on board unit in the host vehicle 131 as an example for illustration, the on board unit in the host vehicle 131 may perform the illegal vehicle warning on the host vehicle 131 according to the vehicle information of the illegal vehicle, i.e., the remote vehicle 132. Specifically, the on board unit in the host vehicle 131 performs the illegal vehicle warning when it is determined that the host vehicle 131 may collide with the remote vehicle 132 according to the vehicle information of the remote vehicle 132.

Optionally, the performing an illegal vehicle warning when it is determined that the target vehicle may collide with the illegal vehicle according to the vehicle information of the illegal vehicle in the preset area includes: when it is determined that the target vehicle may collide with the illegal vehicle according to the vehicle information of the illegal vehicle in the preset area, calculating a collision time of the target vehicle with the illegal vehicle, and performing the illegal vehicle warning at a preset time before the collision time. The preset time is related to a braking time of the target vehicle.

As shown in FIG. 14 or FIG. 17, when the on board unit in the host vehicle 131 determines that the host vehicle 131 may collide with the remote vehicle 132 according to the vehicle information of the remote vehicle 132, it further calculates a collision time of the host vehicle 131 with the remote vehicle 132, and performs the illegal vehicle warning on the host vehicle 131 at a preset time before the collision time. Optionally, the preset time is related to a braking time of the host vehicle 131. For example, the on board unit in the host vehicle 131 calculates the collision time Ct of the host vehicle 131 with the remote vehicle 132 and the braking time Cb of the host vehicle 131 according to the position information and speed of the host vehicle 131 and the position information and speed of the remote vehicle 132, the on board unit in the host vehicle 131 then performs the illegal vehicle warning on the host vehicle 131 before Ct−Cb, for example, transmits illegal vehicle information to the host vehicle 131 before Ct−Cb. Taking the time before Ct−Cb as the illegal vehicle warning timing may ensure that the host vehicle 131 has sufficient time to take measures to avoid a collision with the illegal vehicle.

In the present embodiment, the HV and the traffic control unit are provided with the wireless communication capability, and the traffic control unit transmits RV related information to the HV.

In the present embodiment, the target vehicle entering the preset area receives the vehicle information of the illegal vehicle in the preset area transmitted by the traffic control unit, and performs the illegal vehicle warning when it is determined that the target vehicle may collide with the illegal vehicle according to the vehicle information of the illegal vehicle in the preset area, thereby avoiding or mitigating the collision of the target vehicle and the illegal vehicle, and improving the traffic safety of the target vehicle.

Figure 20:
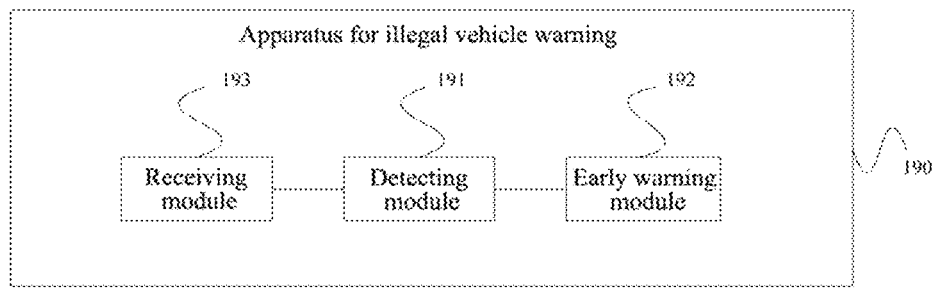
FIG. 20 is a structural diagram of an apparatus for illegal vehicle warning provided by an embodiment of the present disclosure.

FIG. 20 is a structural diagram of an apparatus for illegal vehicle warning provided by an embodiment of the present disclosure. The apparatus for illegal vehicle warning provided by the embodiment of the present disclosure may perform the processing provided by the embodiment of method for illegal vehicle warning. As shown in FIG. 20, the apparatus for illegal vehicle warning 190 includes: a detecting module 191 and an early warning module 192. The apparatus for illegal vehicle warning 190 may be specifically integrated into a traffic control unit, and is configured to implement the IVW application. Specifically, the detecting module 191 is configured to detect an illegal vehicle in a preset area; and the early warning module 192 is configured to perform an illegal vehicle warning on a target vehicle entering the preset area according to vehicle information of the detected illegal vehicle in the preset area.

In addition, the apparatus for illegal vehicle warning 190 further includes: a receiving module 193; the receiving module 193 is configured to receive image information of at least one vehicle in the preset area transmitted by at least one road side unit in the preset area; the detecting module 191 is specifically configured to detect the illegal vehicle in the preset area according to the image information of the at least one vehicle in the preset area.

Optionally, the detecting module 191 is specifically configured to: detect the vehicle running a red light in the preset area according to the image information of the at least one vehicle in the preset area; or detect the vehicle running in a converse direction in the preset area according to the image information of the at least one vehicle in the preset area.

Optionally, the receiving module 193 is further configured to receive vehicle information of the at least one vehicle transmitted by the at least one vehicle in the preset area; the detecting module 191 is specifically configured to detect the illegal vehicle in the preset area according to the vehicle information of the at least one vehicle in the preset area and traffic rules of the preset area.

Optionally, the detecting module 191 is specifically configured to detect the vehicle running the red light in the preset area according to the vehicle information of the at least one vehicle in the preset area and the traffic control phase information of the preset area.

Optionally, the detecting module 191 is specifically configured to detect the vehicle running in the converse direction in the preset area according to the vehicle information of the at least one vehicle in the preset area and an allowed driving direction of the preset area.

Optionally, the early warning module 192 is specifically configured to transmit the vehicle information of the illegal vehicle in the preset area detected by the detecting module 191 to the target vehicle entering the preset area, so as to cause the target vehicle to avoid a collision with the illegal vehicle.

Optionally, the early warning module 192 is specifically configured to transmit illegal vehicle warning information to the target vehicle entering the preset area according to the vehicle information of the illegal vehicle in the preset area detected by the detecting module 191 to cause the target vehicle to avoid a collision with the illegal vehicle.

Optionally, the receiving module 193 is further configured to receive vehicle information of the target vehicle entering the preset area transmitted by the target vehicle; the early warning module 192 is specifically configured to perform the illegal vehicle warning on the target vehicle of the illegal vehicle to cause the target vehicle to avoid a collision with the illegal vehicle when it is determined that the target vehicle may collide with the illegal vehicle according to the vehicle information of the target vehicle and the vehicle information of the detected illegal vehicle in the preset area.

Optionally, the early warning module 192 is specifically configured to calculate a collision time of the target vehicle with the illegal vehicle and perform the illegal vehicle warning on the target vehicle at a preset time before the collision time when it is determined that the target vehicle may collide with the illegal vehicle according to the vehicle information of the target vehicle and the vehicle information of the detected illegal vehicle in the preset area.

Optionally, the preset time is related to a braking time of the target vehicle.

Optionally, the vehicle information of the target vehicle includes at least one of the following: a speed of the illegal vehicle and position information of the target vehicle.

Optionally, the vehicle information of the target vehicle further includes at least one of the following: identification information of the target vehicle, an accelerated speed of the target vehicle, a driving direction of the target vehicle and driving intention information of the target vehicle.

Optionally, the vehicle information of the at least one vehicle includes at least one of the following: a speed of the at least one vehicle and position information of the at least one vehicle.

Optionally, the vehicle information of the at least one vehicle further includes at least one of the following: identification information of the at least one vehicle, an accelerated speed of the at least one vehicle, a driving direction of the at least one vehicle and driving intention information of the at least one vehicle.

Optionally, the vehicle information of the illegal vehicle includes at least one of the following: illegal behavior information of the illegal vehicle and position information of the illegal vehicle.

Optionally, the vehicle information of the illegal vehicle further includes at least one of the following: a speed of the illegal vehicle, identification information of the illegal vehicle, an accelerated speed of the illegal vehicle and a driving direction of the illegal vehicle.

Optionally, the preset area is an intersection or a curve.

The apparatus for illegal vehicle warning provided by the embodiment of the present disclosure may be specifically configured to perform the above method embodiment provided in FIG. 16, and specific functions will not be repeated herein again.

In the embodiment of the present disclosure, the traffic control unit detects the illegal vehicle in the preset area, and performs the illegal vehicle warning on the target vehicle entering the preset area of the illegal vehicle according to the vehicle information of the detected illegal vehicle in the preset area, thereby avoiding or mitigating the collision of the target vehicle and the illegal vehicle, and improving the traffic safety of the target vehicle.

Figure 21:
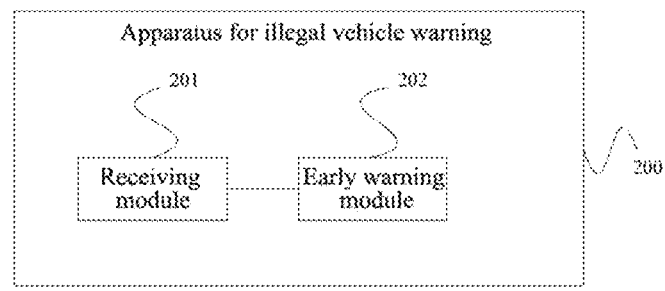
FIG. 21 is a structural diagram of an apparatus for illegal vehicle warning provided by another embodiment of the present disclosure.

FIG. 21 is a structural diagram of an apparatus for illegal vehicle warning provided by another embodiment of the present disclosure. The apparatus for illegal vehicle warning provided by the embodiment of the present disclosure may perform the processing provided by the embodiment of method for illegal vehicle warning. As shown in FIG. 21, the apparatus for illegal vehicle warning 200 includes: a receiving module 201 and an early warning module 202. The apparatus for illegal vehicle warning 200 may be specifically integrated into a terminal device such as a mobile phone, a trip computer or an on board unit in the host vehicle, and is configured to implement the IVW application. Optionally, the receiving module 201 is configured to receive vehicle information of an illegal vehicle in a preset area transmitted by a traffic control unit; and the early warning module 202 is configured to perform an illegal vehicle warning when it is determined that a target vehicle may collide with the illegal vehicle according to the vehicle information of the illegal vehicle in the preset area.

Optionally, the early warning module 202 is specifically configured to calculate a collision time of the target vehicle with the illegal vehicle, and perform the illegal vehicle warning at a preset time before the collision time when it is determined that the target vehicle may collide with the illegal vehicle according to the vehicle information of the illegal vehicle in the preset area.

Optionally, the preset time is related to a braking time of the target vehicle.

Optionally, the vehicle information of the illegal vehicle includes at least one of the following: illegal behavior information of the illegal vehicle and position information of the illegal vehicle.

Optionally, the vehicle information of the illegal vehicle further includes at least one of the following: a speed of the illegal vehicle, identification information of the illegal vehicle, an accelerated speed of the illegal vehicle and a driving direction of the illegal vehicle.

Optionally, the preset area is an intersection, or a curve.

The apparatus for illegal vehicle warning provided by the embodiment of the present disclosure may be specifically configured to perform the above method embodiment provided in FIG. 19, and specific functions will not be repeated herein again.

In the embodiment of the present disclosure, the target vehicle entering the preset area receives the vehicle information of the illegal vehicle in the preset area transmitted by the traffic control unit, and performs the illegal vehicle warning when it is determined that the target vehicle may collide with the illegal vehicle according to the vehicle information of the illegal vehicle in the preset area, thereby avoiding or mitigating the collision of the target vehicle and the illegal vehicle, and improving the traffic safety of the target vehicle.

Figure 22:
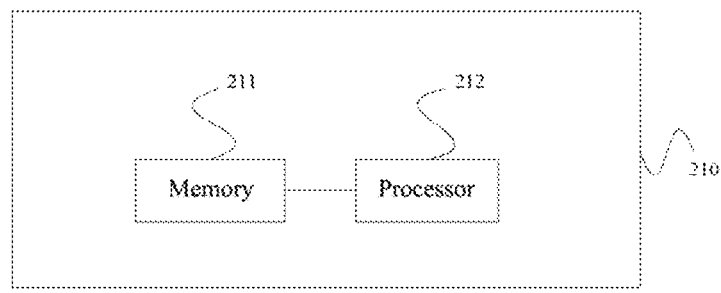
FIG. 22 is a structural diagram of a traffic control unit provided by an embodiment of the present disclosure.

FIG. 22 is a structural diagram of a traffic control unit provided by an embodiment of the present disclosure. As shown in FIG. 22, the traffic control unit 210 includes: a memory 211 and a processor 212; where the memory 211 is configured to store a program code; the processor 212 calls the program code, which, when being executed, is configured to perform the method for illegal vehicle warning described in the above embodiments.

Figure 23:
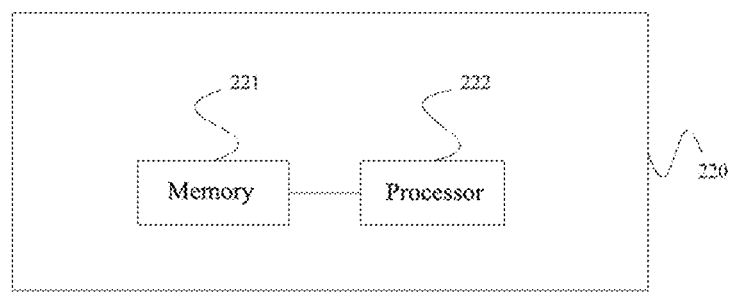
FIG. 23 is a structural diagram of a terminal device provided by an embodiment of the present disclosure.

FIG. 23 is a structural diagram of a terminal device provided by an embodiment of the present disclosure. The terminal device may be a mobile phone, a trip computer or an on board unit in a host vehicle. As shown in FIG. 23, the terminal device 220 includes: a memory 221 and a processor 222; where the memory 221 is configured to store a program code; the processor 222 calls the program code, which, when being executed, is configured to perform the method for illegal vehicle warning described in the above embodiments.

In addition, an embodiment of the present disclosure further provides a computer readable storage medium including instructions, which, when being executed on a computer, cause the computer to perform the method for illegal vehicle warning described in the above embodiments.

The Cooperative Intersection (CI) the CI refers to a case where when a host vehicle is driving to an intersection and entering a control scope of a traffic control unit, an OBU of the host vehicle transmits a passage request for intersection to the traffic control unit, where passage request for intersection includes vehicle driving information and driving intention information; then the traffic control unit transmits a traffic directing instruction to the OBU of the host vehicle according to the passage request for intersection and traffic control phase information of the intersection, where the traffic directing instruction includes a green light passage instruction, a red light stop instruction, a follow-up driving instruction, a lane change driving instruction and the like; the OBU of the host vehicle controls the host vehicle to drive through the intersection according to the traffic directing instruction in conjunction with surrounding environment information sensed by V2X function or other on board sensors. This application is applicable to the passage of the intersections on ordinary roads and highways in cities and suburbs, as well as the intersections at the expressway entrances. CI is an application for directing and dispatching the traffic flow in the intersection, which digitalizes direction operations of a traffic police in the intersection, and transmits a traffic directing instruction through V2X communication, thereby may finely direct the driving lanes of each vehicle, the follow-up driving, the time to drive through, the time to stop, the position to stop at, and make the intersection traffic safer and more efficient. In this process, the traffic control unit completely takes over the control of the vehicle without using the V2X function, or completely controls the longitudinal and horizontal driving of the vehicle using the V2X function, which is just similar to the case where the traffic police directs the vehicle to drive through. After receiving the traffic directing instruction, the vehicle needs to control itself to drive in conjunction with the sensing capability. The traffic directing instruction defined by the CI application may be flexibly and combinedly used, and is applied to various innovation for improving the traffic efficiency of the intersection, such as a variable lane application, which may further set a variable lane dynamically according to real-time traffic flow characteristics.

A main scenarios of the CI include the following types:

one main scenario is: a scenario where after the OBU transmits a passage request for intersection, the traffic control unit directs the vehicle to drive through the intersection.

Figure 24:
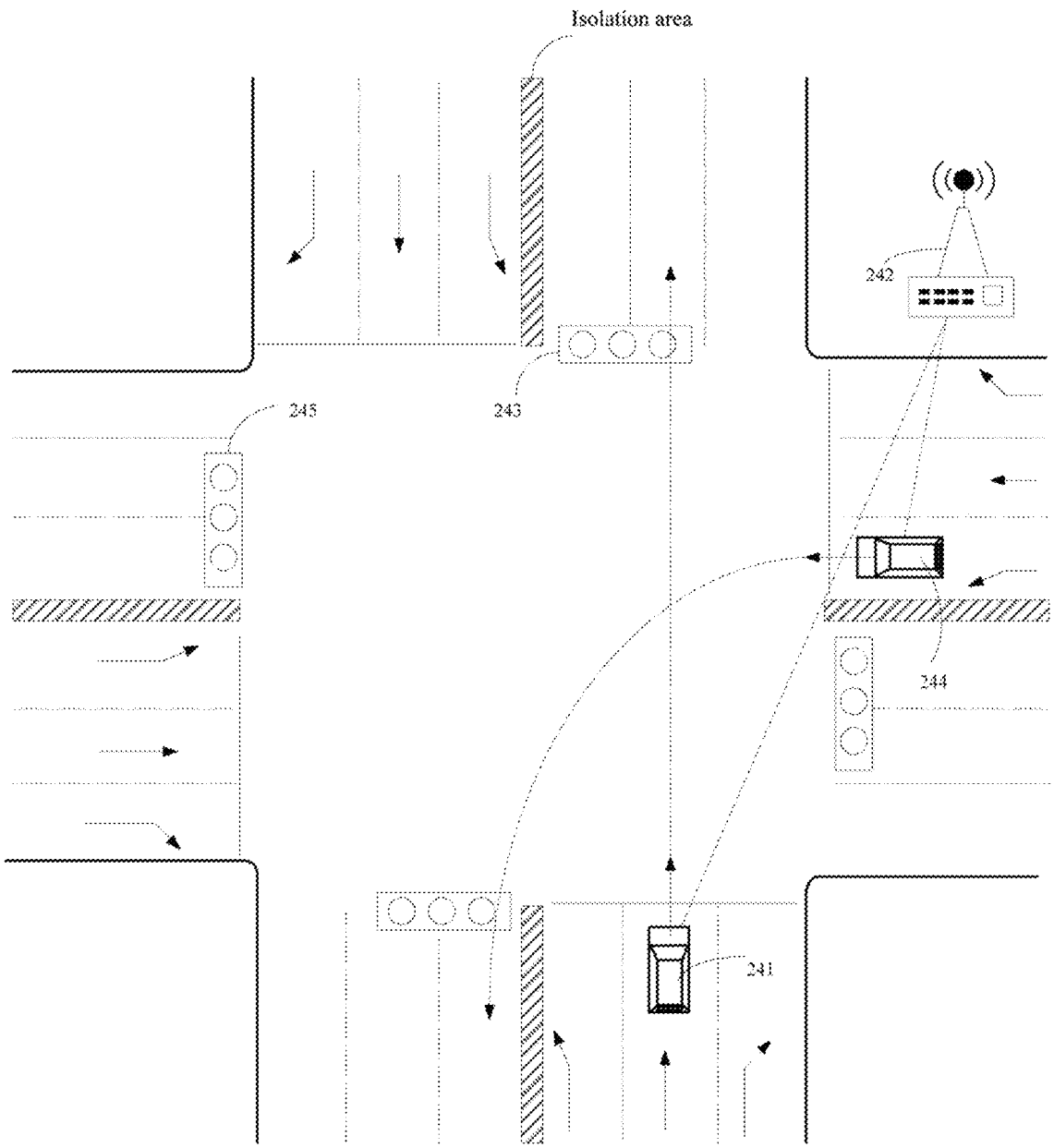
FIG. 24 is a schematic diagram of a main scenario of CI provided by an embodiment of the present disclosure.

As shown in FIG. 24, a vehicle 241, which represents a host vehicle, drives from a distance to an intersection and enters a control range of a traffic control unit 242. The vehicle 241 and the traffic control unit 242 are provided with V2X communication capability. An OBU of the vehicle 241 transmits a passage request for intersection to the traffic control unit 242, where the passage request for intersection includes driving intention information and vehicle driving information of the vehicle 241, the vehicle driving information of the vehicle 241 includes at least one of the following: position information, a speed, an accelerated speed and driving direction of the vehicle 241. The driving intention information of the vehicle 241 indicates that a driving intention of the vehicle 241 is going straight, and the traffic control phase information corresponding to that the vehicle 241 goes straight may be indication information of a traffic light 243. If the indication information of the traffic light 243 is a green light, the traffic control unit 242 determines that the vehicle 241 may drive through the intersection within a remaining duration of the green light according to the vehicle driving information of the vehicle 241, then the traffic control unit 242 transmits a green light passage instruction to the vehicle 241. The OBU of the vehicle 241 controls the host vehicle, i.e., the vehicle 241, to drive through the intersection according to the green light passage instruction in conjunction with surrounding environment information sensed by the V2X function or other on board sensors. The information sensed by the V2X function is mainly derived from information returned back by other vehicles, monitoring devices or pedestrian mobile phones with the v2x communication capability.

Another main scenario is: a scenario where after the OBU transmits a passage request for intersection, the traffic control unit directs the vehicle to stop by a stop line.

As shown in FIG. 24, a vehicle 244, which represents the host vehicle, drives from a distance to the intersection and enters the control range of the traffic control unit 242. The vehicle 244 and the traffic control unit 242 are provided with the V2X communication capability. An OBU of the vehicle 244 transmits a passage request for intersection to the traffic control unit 242, where the passage request for intersection includes the driving intention information and the vehicle driving information of the vehicle 244. The driving intention information of the vehicle 244 indicates that the driving intention of the vehicle 244 is left turn, and the traffic control phase information corresponding to that the vehicle 244 turns left may be the indication information of a traffic light 245. If the indication information of traffic light 245 is a red light, the traffic control unit 242 transmits a red light stop instruction to vehicle 244. The OBU of the vehicle 244 controls the host vehicle, i.e., the vehicle 244, to stop by the stop line according to the red light stop instruction in conjunction with the surrounding environment information sensed by the V2X function or other on board sensors. When the indication information of the traffic light 245 changes to the green light, the traffic control unit 242 transmits a green light passage instruction to the vehicle 244. The OBU of the vehicle 244 controls the host vehicle, i.e., the vehicle 244, to drive through the intersection according to the green light passage instruction in conjunction with the surrounding environment information sensed by the V2X function or other on board sensors.

Another main scenario is: a scenario where after the OBU transmits a passage request for intersection, the traffic control unit directs the vehicle to drive through the intersection scene following a front vehicle.

Figure 25:
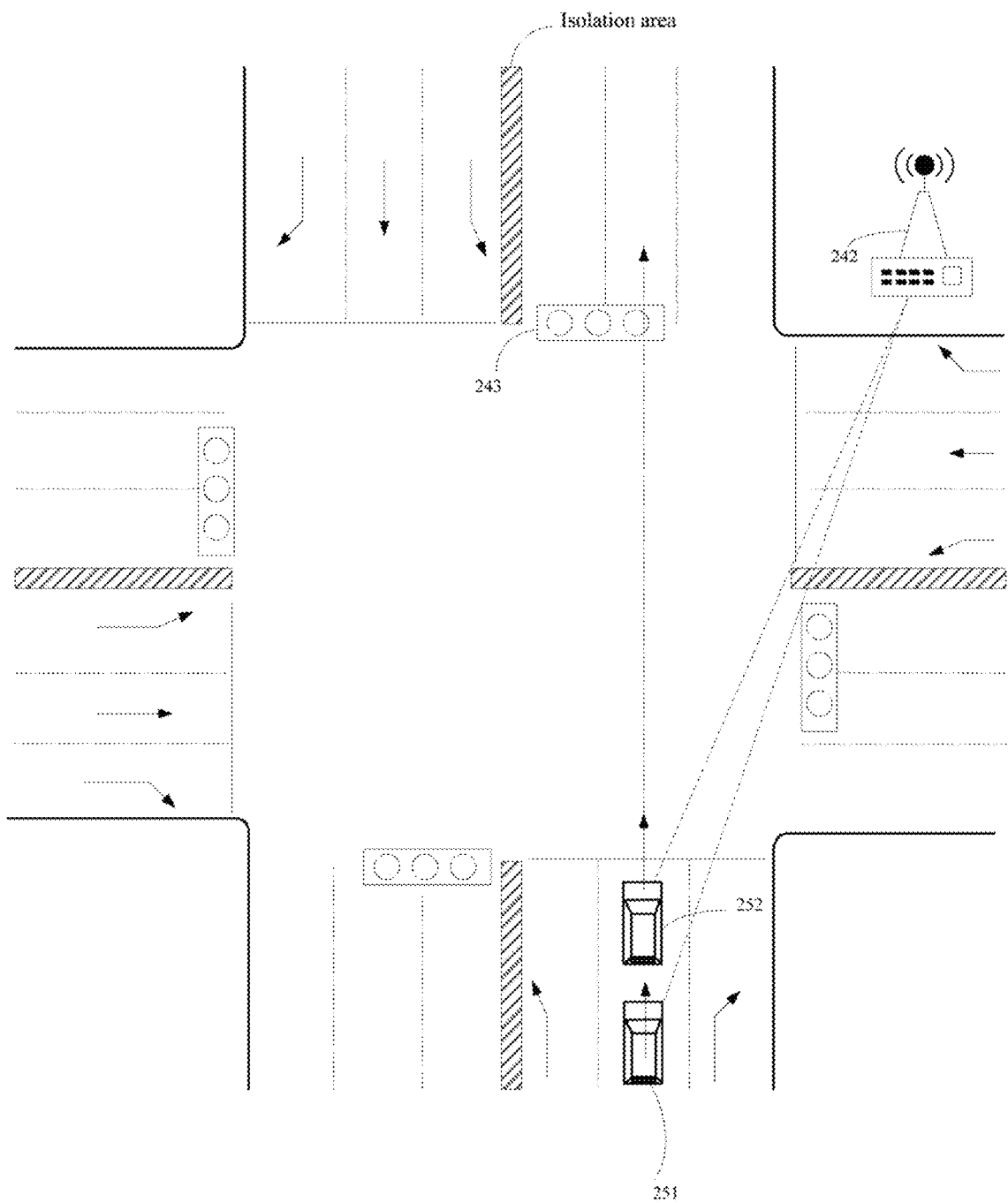
FIG. 25 is a schematic diagram of a main scenario of CI provided by an embodiment of the present disclosure.

As shown in FIG. 25, a vehicle 251, which represents a host vehicle, drives from a distance to an intersection and enters a control range of a traffic control unit 242. The vehicle 251 and the traffic control unit 242 are provided with V2X communication capability. An OBU of the vehicle 251 transmits a passage request for intersection to the traffic control unit 242, where the passage request for intersection includes driving intention information and vehicle driving information of the vehicle 251. The driving intention information of the vehicle 251 indicates that a driving intention of the vehicle 251 is going straight. In front of the vehicle 251, there is a vehicle 252 suitable for being followed by the vehicle 251. The traffic control unit 242 transmits a follow-up driving instruction to the vehicle 251. The OBU of the vehicle 251 controls the host vehicle, i.e., the vehicle 251, to drive following the front vehicle, i.e., the vehicle 252 through the intersection in front according to the follow-up driving instruction and a driving behavior, i.e., acceleration, deceleration, of the front vehicle, i.e., the vehicle 252 detected by the V2V message or its own sensor.

Another main scenario is: a scenario where when the vehicle performs the follow-up driving, the traffic control unit directs the vehicle to stop by the stop line.

As shown in FIG. 25, when the vehicle 251 is driving following the vehicle 252, the corresponding traffic control phase is a green light, the traffic control unit 242 transmits a red light stop instruction to the vehicle 251 when the traffic control unit 242 determines that the vehicle 252 can drive through the intersection during a remaining phase time while the vehicle 251 cannot drive through the intersection during the remaining phase time. The OBU of the vehicle 251 controls the host vehicle, i.e., the vehicle 251, to stop by the stop line according to the red light stop instruction in conjunction with the surrounding environment information sensed by the V2X function or other on board sensors. When the traffic control phase is switched to the green light, the traffic control unit 242 transmits a green light passage instruction to the vehicle 251. The OBU of the vehicle 251 controls the host vehicle, i.e., the vehicle 251, to drive through the intersection according to the green light passage instruction in conjunction with the surrounding environment information sensed by the V2X function or other on board sensors.

Yet another main scenario is: a scenario where the vehicle does not drive in a planned lane, and the traffic control unit directs the vehicle to perform a lane change.

Figure 26:
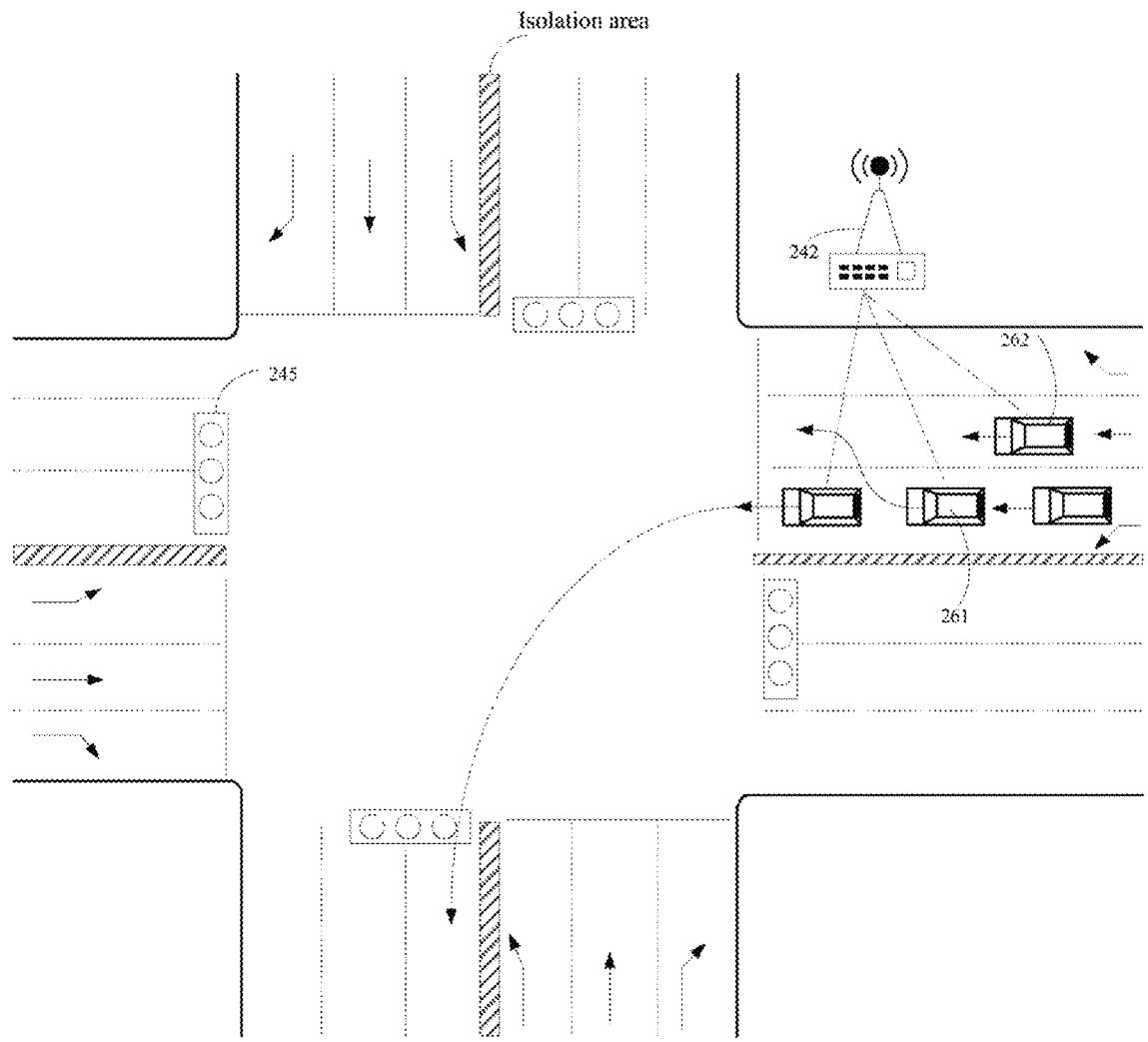
FIG. 26 is a schematic diagram of a main scenario of CI provided by an embodiment of the present disclosure.

As shown in FIG. 26, a vehicle 261 represents a host vehicle. A driving intention of the vehicle 261 is going straight, but the vehicle 261 keeps driving in a left turn lane, or there is a vehicle breaking down in front of a vehicle 261, a traffic control unit 242 needs to re-plan a lane for the vehicle 261; or the traffic control unit 242 detects that the vehicle 261 is not driving in the lane planned by the traffic control unit 242; at this time, the traffic control unit 242 transmits a lane change driving instruction to an OBU of the vehicle 261. If there is no space for lane change in a target lane, the traffic control unit 242 will transmit a stop instruction to a rear vehicle in the target lane, such as the vehicle 262, to coordinate the space for lane change for the vehicle 261. The OBU of the vehicle 261 controls the host vehicle, i.e., the vehicle 261, to perform a lane change according to the lane change driving instruction in conjunction with the surrounding environment information sensed by the V2X function or other on board sensors. When the host vehicle, i.e., the vehicle 261, completes the lane change, the traffic control unit 242 uses a combination of the follow-up driving instruction, the red light stop instruction, the green light passage instruction and the like to direct the vehicle 261 to drive.

Figure 27:
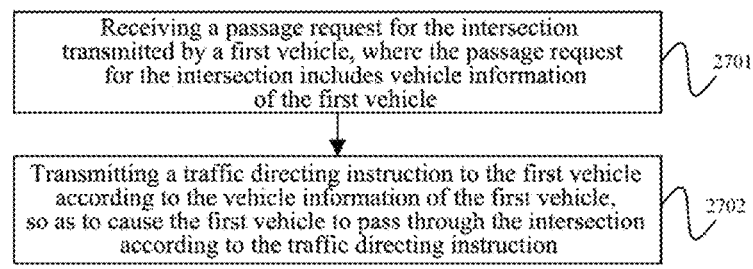
FIG. 27 is a flow diagram of a method for controlling a cooperative intersection provided by an embodiment of the present disclosure.

FIG. 27 is a flow diagram of a method for controlling a cooperative intersection provided by an embodiment of the present disclosure. The method for controlling a cooperative intersection described in this embodiment is applicable to the traffic control unit. In other embodiments, the method for controlling a cooperative intersection is also applicable to other devices. The present embodiment is illustrated by taking the traffic control unit as an example. The method for controlling a cooperative intersection provided in the present embodiment specifically includes the following steps:

Step 2701: receiving a passage request for the intersection transmitted by a first vehicle, where the passage request for the intersection includes vehicle information of the first vehicle.

In the present embodiment, the first vehicle may specifically refer to a host vehicle in the intersection, and the second vehicle may specifically refer to another host vehicle in the intersection.

When the host vehicle drives into the intersection and enters the control range of the traffic control unit, the traffic control unit receives the passage request for intersection transmitted by the host vehicle. The passage request for intersection includes vehicle information of the host vehicle, and the vehicle information of the host vehicle includes vehicle driving information and/or driving intention information of the host vehicle, where the vehicle driving information includes at least one of the following: position information, a speed, an accelerated speed and a driving direction, while the driving intention information includes information such as a target road at an exit of the intersection, or left turn, going straight, right turn, turn at the intersection. The traffic control unit may obtain traffic flow information at the intersection based on these information. Further, the traffic control unit may also allocate an entrance lane and an exit lane for the vehicle from a globally optimal perspective according to the vehicle driving information, the driving intention information of the host vehicle, the lane information in the intersection and the traffic flow information.

In the present embodiment, the frequency at which the host vehicle reports the information to the traffic control unit is not less than 10 Hz.

As shown in FIG. 24, the vehicle 241 represents the host vehicle, and when the vehicle 241 drives from the distance to the intersection, and enters the control range of the traffic control unit 242, it transmits the passage request for intersection to the traffic control unit 242. Correspondingly, the traffic control unit 242 receives the passage request for intersection transmitted by the vehicle 241. The passage request for intersection includes driving intention information and vehicle driving information of the vehicle 241, where the vehicle driving information of the vehicle 241 includes the position information, the speed, the accelerated speed and the driving direction of the vehicle 241, while the driving intention information of the vehicle 241 indicates that a driving intention of the vehicle 241 is going straight.

As shown in FIG. 25, the vehicle 251 represents the host vehicle, and when the vehicle 251 drives from the distance to the intersection, and enters the control range of the traffic control unit 242, it transmits the passage request for intersection to the traffic control unit 242. Correspondingly, the traffic control unit 242 receives the passage request for intersection transmitted by the vehicle 251.

As shown in FIG. 26, the vehicle 261 represents the host vehicle, and the vehicle 261 transmits the passage request for intersection to the traffic control unit 242 when it enters the control range of the traffic control unit 242. Correspondingly, the traffic control unit 242 receives the passage request for intersection transmitted by the vehicle 261.

Step 2702: transmitting a traffic directing instruction to the first vehicle according to the vehicle information of the first vehicle to cause the first vehicle to pass through the intersection according to the traffic directing instruction.

After receiving the vehicle information transmitted by the host vehicle, the traffic control unit 242 transmits the traffic directing instruction to the host vehicle according to the vehicle information of the host vehicle, so as to cause the host vehicle to drive through the intersection according to the traffic directing instruction in conjunction with the surrounding environment information sensed by the V2X function or other on board sensors.

In the present embodiment, the transmitting a traffic directing instruction to the first vehicle according to the vehicle information of the first vehicle includes the following possible implementations:

one possible implementation is: transmitting the traffic directing instruction to the first vehicle according to the vehicle information of the first vehicle and traffic control phase information of the intersection.

For example, as shown in FIG. 24, the traffic control unit 242 may transmit a traffic directing instruction to the vehicle 241 according to the vehicle information of the vehicle 241 and the traffic control phase information of the intersection, such as indication information of the traffic light 243.

Specifically, the vehicle information of the first vehicle includes driving intention information of the first vehicle. Correspondingly, the transmitting the traffic directing instruction to the first vehicle according to the vehicle information of the first vehicle and the traffic control phase information of the intersection includes: transmitting the traffic directing instruction to the first vehicle according to the traffic control phase information corresponding to the driving intention information of the first vehicle.

As shown in FIG. 24, the vehicle information transmitted by the vehicle 241 to the traffic control unit 242 includes the driving intention information, the driving intention information of the vehicle 241 indicates that the driving intention of the vehicle 241 is going straight, and the traffic control unit 242 transmits the traffic directing instruction to the vehicle 241 according to the traffic control phase information corresponding to that the vehicle 241 goes straight, for example, the indication information of the traffic light 243.

As shown in FIG. 24, the vehicle information transmitted by the vehicle 244 to the traffic control unit 242 includes the driving intention information, the driving intention information of the vehicle 244 indicates that the driving intention of the vehicle 244 is left turn, and the traffic control unit 242 transmits the traffic directing instruction to the vehicle 244 according to the traffic control phase information, for example, the indication information of the traffic light 245, corresponding to that the vehicle 244 turns left.

When the traffic control phase information corresponding to the driving intention information of the first vehicle are different, the traffic directing instructions transmitted by the traffic control unit to the first vehicle are different. The specific description is as follows:

the traffic control phase information corresponding to the driving intention information of the first vehicle is the red light; correspondingly, the transmitting the traffic directing instruction to the first vehicle according to the traffic control phase information corresponding to the driving intention information of the first vehicle includes: transmitting a red light stop instruction to the first vehicle according to the traffic control phase information corresponding to the driving intention information of the first vehicle.

Specifically, the red light stop instruction includes: position information of the stop line of the lane where the first vehicle is located, the traffic control phase information, a phase remaining duration, an exit lane and a recommended vehicle speed.

For example, the indication information of the traffic light 245 is the red light, and the traffic control unit 242 transmits a red light stop instruction to the vehicle 244, the red light stop instruction includes the position information of the stop line of the lane where the vehicle 244 is located, the traffic control phase information, the phase remaining duration, the exit lane and the recommended vehicle speed. The OBU of the vehicle 244 controls the host vehicle, i.e., the vehicle 244, to stop by the stop line according to the red light stop instruction in conjunction with the surrounding environment information sensed by the V2X function or other on board sensors. At this time, the vehicle 244 reports the vehicle driving information such as position information, a speed, an accelerated speed and the driving direction to the traffic control unit 242, and the frequency at which the vehicle 244 reports the vehicle driving information to the traffic control unit 242 is not less than 10 Hz. The traffic control unit 242 determines that the vehicle 244 is located at the stop line according to the vehicle driving information, such as the position information, transmitted by the vehicle 244. When the indication information of the traffic light 245 switches to the green light, the traffic control unit 242 transmits a green light passage instruction to the vehicle 244, where the green light passage instruction includes: the traffic control phase information, a phase remaining duration, an exit lane and a recommended vehicle speed. The OBU of the vehicle 244 controls the host vehicle, i.e., the vehicle 244, to drive through the intersection according to the green light passage instruction in conjunction with the surrounding environment information sensed by the V2X function or other on board sensors.

The traffic control phase information corresponding to the driving intention information of the first vehicle is the green light, the vehicle information of the first vehicle further includes the vehicle driving information of the first vehicle; correspondingly, the transmitting the traffic directing instruction to the first vehicle according to the traffic control phase information corresponding to the driving intention information of the first vehicle includes: transmitting a green light passage instruction to the first vehicle when it is determined that, the first vehicle can drive through the intersection within a phase remaining duration of the traffic control phase information corresponding to the driving intention information of the first vehicle according to the vehicle driving information of the first vehicle.

Specifically, the green light passage instruction includes: the traffic control phase information, a phase remaining duration, an exit lane, and a recommended vehicle speed.

As shown in FIG. 24, the vehicle information transmitted by the vehicle 241 to the traffic control unit 242 may further include the vehicle driving information of the vehicle 241, for example, the position information, the speed, the accelerated speed and the driving direction of the vehicle 241. For example, the indication information of the traffic light 243 is the green light, and the traffic control unit 242 further calculates a time required for the vehicle 241 to drive in the lane where the vehicle 241 is located from the position where the vehicle 241 is located over the stop line of the lane where the vehicle 241 is located with the speed and accelerated speed of the vehicle 241. If the phase remaining duration of the green light is greater than or equal to the time required for the vehicle 241 to drive in the lane where it is located from the position where the vehicle 241 is located over the stop line of the lane, the traffic control unit 242 transmits the green light passage instruction to the vehicle 241, the green light passage instruction includes the traffic control phase information, the phase remaining duration, the exit lane and the recommended vehicle speed. The OBU of the vehicle 241 controls the host vehicle, i.e., the vehicle 241, to drive through the intersection according to the green light passage instruction in conjunction with the surrounding environment information sensed by the V2X function or other on board sensors.

In addition, a red light stop instruction is transmitted to the first vehicle when it is determined that the first vehicle cannot drive through the intersection within the phase remaining duration of the traffic control phase information corresponding to the driving intention information of the first vehicle according to the vehicle driving information of the first vehicle.

For example, the indication information of the traffic light 243 is the green light, and the traffic control unit 242 further calculates a time required for the vehicle 241 to drive in the lane where the vehicle 241 is located from the position where the vehicle 241 is located over the stop line of the lane where the vehicle 241 is located with the speed and accelerated speed of the vehicle 241. If the phase remaining duration of the green light is smaller than the time required for the vehicle 241 to drive in the lane where it is located from the position where the vehicle 241 is located over the stop line of the lane where it is located, the traffic control unit 242 transmits a red light stop instruction to the vehicle 241, the red light stop instruction including the position information of the stop line of the lane where the first vehicle is located, the traffic control phase information, the phase remaining duration, the exit lane and the recommended vehicle speed. The OBU of the vehicle 241 controls the host vehicle, i.e., the vehicle 241, to stop by the stop line according to the red light stop instruction in conjunction with the surrounding environment information sensed by the V2X function or other on board sensors. At this time, the vehicle 241 reports the vehicle driving information such as the position information, the speed, the accelerated speed and the driving direction to the traffic control unit 242, and the frequency at which the vehicle 241 reports the vehicle driving information to the traffic control unit 242 is not less than 10 Hz. The traffic control unit 242 determines that the vehicle 241 is located at the stop line according to the vehicle driving information such as the position information transmitted by the vehicle 241. When the indication information of the traffic light 243 switches to the green light again, the traffic control unit 242 transmits a green light passage instruction to the vehicle 241, where the green light passage instruction includes: traffic control phase information, the phase remaining duration, the exit lane and the recommended vehicle speed. The OBU of the vehicle 241 controls the host vehicle, i.e., the vehicle 241, to drive through the intersection according to the green light passage instruction in conjunction with the surrounding environment information sensed by the V2X function or other on board sensors.

Another possible implementation is: the vehicle information of the first vehicle includes the driving intention information of the first vehicle; transmitting a follow-up driving instruction to the first vehicle, so as to cause the first vehicle to drive following the second vehicle through the intersection when it is determined that the driving intention information of the first vehicle and driving intention information of the second vehicle in front of the first vehicle are identical according to the driving intention information of the first vehicle and driving intention information of the second vehicle.

Specifically, the follow-up driving instruction includes: identification information of the second vehicle, a vehicle speed of the second vehicle, driving intention information of the second vehicle, a vehicle attribute of the second vehicle, a safe distance for the follow-up driving, a maximum vehicle speed of the first vehicle.

For example, as shown in FIG. 25, the vehicle 251 represents the host vehicle, and the vehicle 252 is the vehicle in front of the vehicle 251. When the traffic control unit 242 receives the driving intention information and the vehicle driving information of the vehicle 251 and driving intention information and vehicle driving information of the vehicle 252, if it is determined that the driving intentions of the vehicle 251 and the vehicle 252 are identical, and both are going straight, the vehicle 252 is in front of the vehicle 251, and the distance between the vehicle 252 and the vehicle 251 is within a preset distance, for example, less than 20 meters, then the traffic control unit 242 transmits a follow-up driving instruction to the vehicle 251, the follow-up driving instruction includes identification information, a vehicle speed, driving intention information, a vehicle attribute (e.g., physical size and weight) of the vehicle 252, a safe distance for the follow-up driving of vehicle 251, and the maximum vehicle speed. The OBU of the vehicle 251 controls the host vehicle, i.e., the vehicle 251, to drive following the front vehicle, i.e., vehicle 252, through the intersection in front according to the follow-up driving instruction, and a driving behavior, i.e., acceleration, deceleration of the front vehicle, i.e., the vehicle 252 detected by the V2V message or its own sensor.

The method further includes: transmitting the traffic directing instruction to the first vehicle according to traffic control phase information corresponding to the driving intention information of the first vehicle when the first vehicle drives following the second vehicle.

As shown in FIG. 25, the vehicle 251 reports the vehicle driving information of the vehicle 251, for example, position information, a speed, an accelerated speed and a driving direction of the vehicle 251, to the traffic control unit 242 when driving following the vehicle 252. The vehicle 252 reports the vehicle driving information of the vehicle 252, for example, position information, a speed, an accelerated speed and a driving direction of the vehicle 252, to the traffic control unit 242. The traffic control unit 242 transmits traffic directing instructions to the vehicle 251 and the vehicle 252 according to the vehicle driving information of the vehicle 251, the vehicle driving information of the vehicle 252, and the traffic control phase information, such as the indication information of the traffic light 243.

If the current traffic control phase information, such as the indication information of the traffic light 243, is the green light, and the phase remaining duration of the green light is greater than or equal to the time required for the vehicle 252 to drive in the lane where the vehicle 252 is located from the position where the vehicle 252 is located over the stop line of the lane, but less than the time required for the vehicle 251 to drive in the lane where the vehicle 251 is located from the position where the vehicle 251 is located over the stop line of the lane where the vehicle 251 is located, then the traffic control unit 242 transmits a red light stop instruction to the vehicle 251, the red light stop instruction includes the position information of the stop line of the lane where the vehicle 251 is located, the traffic control phase information, the phase remaining duration, the exit lane and the recommended vehicle speed. The OBU of the vehicle 251 controls the host vehicle, i.e., the vehicle 251, to stop by the stop line according to the red light stop instruction in conjunction with the surrounding environment information sensed by the V2X function or other on board sensors. At this time, the vehicle 251 reports the vehicle driving information, such as the position information, the speed, the accelerated speed and the driving direction, to the traffic control unit 242, and the frequency at which the vehicle 251 reports the vehicle driving information to the traffic control unit 242 is not less than 10 Hz. The traffic control unit 242 determines that the vehicle 251 is located at the stop line according to the vehicle driving information, such as position information, transmitted by the vehicle 251. When the indication information of the traffic light 243 switches to the green light again, the traffic control unit 242 transmits a green light passage instruction to the vehicle 251, where the green light passage instruction includes: the traffic control phase information, the phase remaining duration, the exit lane and the recommended vehicle speed. The OBU of the vehicle 251 controls the host vehicle, i.e., the vehicle 251, to drive through the intersection according to the green light passage instruction in conjunction with the surrounding environment information sensed by the V2X function or other on board sensors.

Yet another possible implementation is: transmitting a lane change driving instruction to the first vehicle according to the vehicle information of the first vehicle.

Specifically, the transmitting the lane change driving instruction to the first vehicle according to the vehicle information of the first vehicle includes the following situations:

one situation is: the vehicle information of the first vehicle includes the driving intention information and the driving information of the first vehicle; transmitting the lane change driving instruction to the first vehicle, so as to cause the first vehicle to change to a target lane corresponding to the driving intention of the first vehicle when it is determined that the driving intention of the first vehicle does not match with a current driving state of the first vehicle according to the driving intention information and the driving information of the first vehicle.

As shown in FIG. 26, the driving intention of the vehicle 261 is going straight, but the vehicle 261 is driving in a left turn lane, that is, the driving intention of the vehicle 261 does not match with an actual driving state of the vehicle 261. Specifically, the traffic control unit 242 may calculate the lane where the vehicle 261 is located according to the position information of the vehicle 261 and lane information of the intersection. If the lane where the vehicle 261 is located does not match with the driving intention of the vehicle 261, the traffic control unit 242 transmits to the vehicle 261 the lane change driving instruction which may include lane information of a target lane, for example, through lane information, which matches with the driving intention of the vehicle 261. The OBU of the vehicle 261 controls the host vehicle, i.e., the vehicle 261, to change to a target lane, for example, a through lane, which matches with the driving intention of the vehicle 261 according to the lane change driving instruction in conjunction with the surrounding environment information sensed by the V2X function or other on board sensors.

Another situation is: the vehicle information of the first vehicle includes position information of the first vehicle; transmitting the lane change driving instruction to the first vehicle, so as to cause the first vehicle to change to a target lane that is failure-free when it is determined that a failure occurs in the lane where the first vehicle is currently located according to the position information of the first vehicle.

As shown in FIG. 26, it is assumed that there is a vehicle failure in front of the vehicle 261 and the traffic control unit 242 needs to re-plan a lane for the vehicle 261, the traffic control unit 242 transmits to the vehicle 261 a lane change driving instruction which may include lane information of a target lane that is failure-free. The OBU of the vehicle 261 controls the host vehicle, i.e., the vehicle 261, to change to the target lane that is failure-free according to the lane change driving instruction in conjunction with the surrounding environment information sensed by the V2X function or other on board sensors.

Yet another situation is: the vehicle information of the first vehicle includes the position information of the first vehicle; transmitting the lane change driving instruction to the first vehicle, so as to cause the first vehicle to change to a target lane assigned by the traffic control unit to the first vehicle when it is determined that the current lane of the first vehicle is not the target lane according to the position information of the first vehicle.

As shown in FIG. 26, the traffic control unit 242 calculates the lane where the vehicle 261 is located according to the position information of the vehicle 261 and the lane information of the intersection. If the lane where the vehicle 261 is located is not the target lane, such as the entrance lane, assigned by the traffic control unit 242 to the vehicle 261 the traffic control unit 242 transmits to the vehicle 261 a lane change driving instruction which may include information of entrance lane and exit lane assigned by the traffic control unit 242 to the vehicle 261. The OBU of the vehicle 261 controls the host vehicle, i.e., the vehicle 261, to change to the target lane e.g., the entrance lane, assigned by the traffic control unit 242 to the vehicle 261 according to the lane change driving instruction in conjunction with the surrounding environment information sensed by the V2X function or other on board sensors.

Moreover, the method further includes: transmitting a stop instruction to a rear vehicle in the target lane to coordinate a space for lane change for the first vehicle when there is no space for lane change in the target lane.

As shown in FIG. 26, when the OBU of the vehicle 261 performs a lane change to the target lane, such as the through lane, or the entrance lane assigned by the traffic control unit 242 to the vehicle 261 according to the lane change driving instruction, if there is no space for lane change for the vehicle 261 in the target lane, the traffic control unit 242 may also transmit a stop instruction to a rear vehicle, such as the vehicle 262, in the target lane to cause the vehicle 262 to stop or decelerate, so as to coordinate the space for lane change for the vehicle 261 to complete the lane change.

In the present embodiment, the on board OBU and the traffic control unit may communicate based on cellular network communication or wireless communication, and the on board OBU and the traffic control unit transmits the passage request for intersection and the traffic directing instruction in a unicast manner.

In the present embodiment, the traffic control unit receives the passage request for intersection of the host vehicle, and transmits the traffic directing instruction to the host vehicle according to the vehicle information of the host vehicle in the passage request for intersection, so as to cause the host vehicle to pass through the intersection according to the traffic directing instruction, which digitalizes direction operations of a traffic police in the intersection, and transmits the traffic directing instruction through V2X communication, thereby may finely direct the driving lanes of each vehicle, the follow-up driving, the time to drive through, the time to stop, the position to stop at, and make the intersection traffic safer and more efficient.

Figure 28:
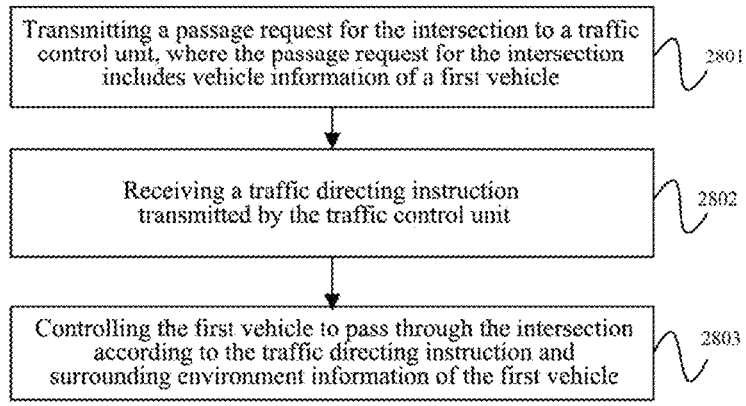
FIG. 28 is a flow diagram of a method for controlling a cooperative intersection provided by another embodiment of the present disclosure.

FIG. 28 is a flow diagram of a method for controlling a cooperative intersection provided by another embodiment of the present disclosure. The method for controlling a cooperative intersection described in the present embodiment is applied to a terminal device of a first vehicle. The terminal device of the first vehicle may specifically be a mobile phone, a trip computer or an OBU in the first vehicle. The first vehicle herein may be a host vehicle. In other embodiments, the method for controlling a cooperative intersection is also applicable to other devices. The present embodiment is illustrated by taking the terminal unit of the first vehicle as an example. The method for controlling a cooperative intersection provided in the present embodiment specifically includes the following steps:

Step 2801: transmitting a passage request for the intersection to a traffic control unit, where the passage request for the intersection includes vehicle information of the first vehicle.

As shown in FIG. 24, the vehicle 241 represents the host vehicle, and when the vehicle 241 drives from the distance to the intersection, and enters a control range of the traffic control unit 242, it transmits a passage request for intersection to the traffic control unit 242. The passage request for intersection includes vehicle information of the vehicle 241, and the vehicle information of the vehicle 241 includes driving intention information and vehicle driving information of the vehicle 241.

Step 2802: receiving a traffic directing instruction transmitted by the traffic control unit.

The traffic directing instruction transmitted by the traffic control unit and received by the host vehicle include a green light passage instruction, a red light stop instruction, a follow-up driving instruction and a lane change driving instruction.

Step 2803: controlling the first vehicle to pass through the intersection according to the traffic directing instruction and surrounding environment information of the first vehicle.

In the present embodiment, the surrounding environment information of the first vehicle is detected by the on board sensor of the first vehicle. Alternatively, the surrounding environment information of the first vehicle is detected by at least one of other vehicles, road side units and pedestrian terminal devices in the vicinity of the first vehicle.

In the following, an implementation for the host vehicle to control the first vehicle to pass through the intersection according to the traffic directing instruction and the surrounding environment information of the first vehicle is introduced in conjunction with different traffic directing instructions.

The traffic directing instruction is the follow-up driving instruction; correspondingly, the controlling the first vehicle to pass through the intersection according to the traffic directing instruction and surrounding environment information of the first vehicle includes: controlling the first vehicle to drive following a second vehicle through the intersection according to the follow-up driving instruction and driving behavior information of the second vehicle. The follow-up driving instruction includes: identification information of the second vehicle, a vehicle speed of the second vehicle, driving intention information of the second vehicle, a vehicle attribute of the second vehicle, a safe distance for the follow-up driving, a maximum vehicle speed of the first vehicle.

For example, as shown in FIG. 25, the vehicle 251 represents the host vehicle, and the vehicle 252 is the vehicle in front of the vehicle 251. When the traffic control unit 242 receives the driving intention information and the vehicle driving information of the vehicle 251 and driving intention information and vehicle driving information of the vehicle 252, if it is determined that the driving intentions of the vehicle 251 and the vehicle 252 are identical, and both are going straight, the vehicle 252 is in front of the vehicle 251, and the distance between the vehicle 252 and the vehicle 251 is within a preset distance, for example, less than 20 meters, then the traffic control unit 242 transmits a follow-up driving instruction to the vehicle 251, the follow-up driving instruction includes identification information, a vehicle speed, driving intention information, a vehicle attribute (e.g., physical size and weight) of the vehicle 25, a safe distance for the follow-up driving of vehicle 251, and a maximum vehicle speed. The OBU of the vehicle 251 controls the host vehicle, i.e., the vehicle 251, to drive following the front vehicle, i.e., vehicle 252, through the intersection in front according to the follow-up driving instruction, and a driving behavior, i.e., acceleration, deceleration of the front vehicle, i.e., the vehicle 252 detected by the V2V message or its own sensor.

The traffic directing instruction is the red light stop instruction; correspondingly, the controlling the first vehicle to pass through the intersection according to the traffic directing instruction and surrounding environment information of the first vehicle includes: controlling the first vehicle to stop by a stop line of a lane where it is located according to the red light stop instruction and the surrounding environment information of the first vehicle. The red light stop instruction includes: position information of the stop line of the lane where the first vehicle is located, traffic control phase information, a phase remaining duration, an exit lane and a recommended vehicle speed.

As shown in FIG. 24, the vehicle information transmitted by the vehicle 244 to the traffic control unit 242 includes the driving intention information, the driving intention information of the vehicle 244 indicates that a driving intention of the vehicle 244 is left turn, and the traffic control unit 242 transmits the traffic directing instruction to the vehicle 244 according to the traffic control phase information, for example, the indication information of the traffic light 245, corresponding to that the vehicle 244 turns left. For example, the indication information of the traffic light 245 is the red light, the traffic control unit 242 transmits the red light stop instruction to the vehicle 244, the red light stop instruction includes the position information of the stop line of the lane where the vehicle 244 is located, the traffic control phase information, the phase remaining duration, the exit lane and the recommended vehicle speed. The OBU of the vehicle 244 controls the host vehicle, i.e., the vehicle 244, to stop by the stop line according to the red light stop instruction in conjunction with the surrounding environment information sensed by the V2X function or other on board sensors. The information sensed by the V2X function is mainly derived from information returned back by other vehicles, monitoring devices or pedestrian mobile phones with the v2x communication capability.

The traffic directing instruction is the green light passage instruction; correspondingly, the controlling the first vehicle to pass through the intersection according to the traffic directing instruction and surrounding environment information of the first vehicle includes: controlling the first vehicle to pass through the intersection according to the green light passage instruction and the surrounding environment information of the first vehicle. The green light passage instruction includes: traffic control phase information, a phase remaining duration, an exit lane and a recommended vehicle speed.

As shown in FIG. 24, the vehicle information transmitted by the vehicle 241 to the traffic control unit 242 includes the driving intention information, the driving intention information of the vehicle 241 indicates that the driving intention of the vehicle 241 is going straight, and the traffic control unit 242 transmits the traffic directing instruction to the vehicle 241 according to the traffic control phase information, for example, the indication information of the traffic light 243, corresponding to that the vehicle 241 goes straight. The vehicle information transmitted by the vehicle 241 to the traffic control unit 242 may further include the vehicle driving information of the vehicle 241, for example, the position information, the speed, the accelerated speed and the driving direction of the vehicle 241. For example, the indication information of the traffic light 243 is the green light, and the traffic control unit 242 further calculates a time required for the vehicle 241 to drive in the lane where the vehicle 241 is located from the position where the vehicle 241 is located over the stop line of the lane where the vehicle 241 is located with the speed and accelerated speed of the vehicle 241. If the phase remaining duration of the green light is greater than or equal to the time required for the vehicle 241 to drive in the lane where it is located from the position where the vehicle 241 is located over the stop line of the lane, the traffic control unit 242 transmits the green light passage instruction to the vehicle 241, the green light passage instruction includes the traffic control phase information, the phase remaining duration, the exit lane and the recommended vehicle speed. The OBU of the vehicle 241 controls the host vehicle, i.e., the vehicle 241, to drive through the intersection according to the green light passage instruction in conjunction with the surrounding environment information sensed by the V2X function or other on board sensors.

The traffic directing instruction is the lane change driving instruction; correspondingly, the controlling the first vehicle to pass through the intersection according to the traffic directing instruction and surrounding environment information of the first vehicle includes: controlling the first vehicle to change to a target lane indicated by the lane change driving instruction according to the lane change driving instruction and the surrounding environment information of the first vehicle.

As shown in FIG. 26, the driving intention of the vehicle 261 is going straight, but the vehicle 261 is driving in a left turn lane, that is, the driving intention of the vehicle 261 does not match with an actual driving state of the vehicle 261. Specifically, the traffic control unit 242 may calculate the lane where the vehicle 261 is located according to the position information of the vehicle 261 and lane information of the intersection. If the lane where the vehicle 261 is located does not match with the driving intention of the vehicle 261, the traffic control unit 242 transmits to the vehicle 261 the lane change driving instruction which may include lane information of a target lane, for example, through lane information, which matches with the driving intention of the vehicle 261. The OBU of the vehicle 261 controls the host vehicle, i.e., the vehicle 261, to change to a target lane, for example, a through lane, which matches with the driving intention of the vehicle 261 according to the lane change driving instruction in conjunction with the surrounding environment information sensed by the V2X function or other on board sensors.

In the present embodiment, the on board OBU and the traffic control unit may communicate based on cellular network communication or wireless communication, and the on board OBU and the traffic control unit transmits the passage request for intersection and the traffic directing instruction in a unicast manner.

In the present embodiment, after transmitting the passage request for intersection to the traffic control unit, the terminal device of the host vehicle receives the traffic directing instruction transmitted by the traffic control unit, and controls the host vehicle to pass through the intersection according to the traffic directing instruction and the surrounding environment information of the host vehicle; the traffic control unit digitalizes direction operations of a traffic police in the intersection, and transmits the traffic directing instruction through V2X communication, thereby may finely direct the driving lanes of each vehicle, the follow-up driving, the time to drive through, the time to stop, the position to stop at, and make the intersection traffic safer and more efficient.

Figure 29:
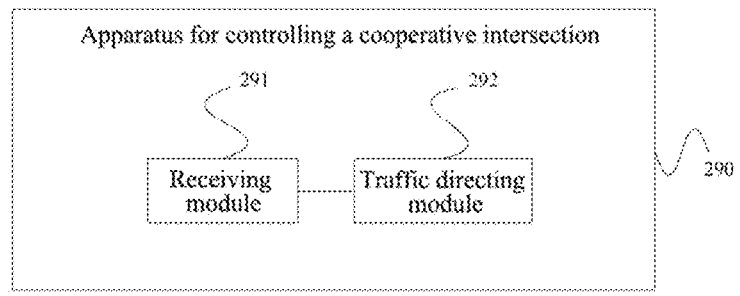
FIG. 29 is a structural diagram of an apparatus for controlling a cooperative intersection provided by an embodiment of the present disclosure.

FIG. 29 is an apparatus for controlling a cooperative intersection provided by an embodiment of the present disclosure. The apparatus for controlling a cooperative intersection provided by the embodiment of the present disclosure may perform the processing provided by the embodiment of the method for controlling a cooperative intersection. As shown in FIG. 29, the apparatus for controlling a cooperative intersection 290 includes a receiving module 291 and a traffic directing module 292. The apparatus for controlling a cooperative intersection 290 may be specifically integrated into a traffic control unit, and is configured to implement the CI application. Specifically, the receiving module 291 is configured to receive a passage request for intersection transmitted by a first vehicle, where the passage request for intersection includes vehicle information of the first vehicle; and the traffic directing module 292 is configured to transmit a traffic directing instruction to the first vehicle according to the vehicle information of the first vehicle to cause the first vehicle to pass through an intersection according to the traffic directing instruction. The first vehicle may specifically be a host vehicle.

Optionally, traffic directing module 292 is specifically configured to transmit the traffic directing instruction to the first vehicle according to the vehicle information of the first vehicle and traffic control phase information of the intersection.

Optionally, the vehicle information of the first vehicle includes driving intention information of the first vehicle; the traffic directing module 292 is specifically configured to transmit the traffic directing instruction to the first vehicle according to the traffic control phase information corresponding to the driving intention information of the first vehicle.

Optionally, the vehicle information of the first vehicle includes the driving intention information of the first vehicle; the traffic directing module 292 is specifically configured to transmit a follow-up driving instruction to the first vehicle, so as to cause the first vehicle to drive following the second vehicle through the intersection when it is determined that the driving intention information of the first vehicle and driving intention information of the second vehicle in front of the first vehicle are identical according to the driving intention information of the first vehicle and the driving intention information of the second vehicle.

Optionally, the traffic directing module 292 is further configured to transmit the traffic directing instruction to the first vehicle according to traffic control phase information corresponding to the driving intention information of the first vehicle when the first vehicle drives following the second vehicle.

Optionally, the traffic control phase information corresponding to the driving intention information of the first vehicle is a red light; correspondingly, the traffic directing module 292 is specifically configured to transmit a red light stop instruction to the first vehicle according to traffic control phase information corresponding to the driving intention information of the first vehicle.

Optionally, the traffic control phase information corresponding to the driving intention information of the first vehicle is a green light, and the vehicle information of the first vehicle further includes vehicle driving information of the first vehicle; correspondingly, the traffic directing module 292 is specifically configured to transmit a green light passage instruction to the first vehicle when it is determined that the first vehicle can drive through the intersection within a phase remaining duration of the traffic control phase information corresponding to the driving intention information of the first vehicle according to the vehicle driving information of the first vehicle.

Optionally, traffic directing module 292 is further configured to transmit a red light stop instruction to the first vehicle when it is determined that the first vehicle cannot drive through the intersection within the phase remaining duration of the traffic control phase information corresponding to the driving intention information of the first vehicle according to the vehicle driving information of the first vehicle.

Optionally, traffic directing module 292 is specifically configured to transmit a lane change driving instruction to the first vehicle according to the vehicle information of the first vehicle.

Optionally, the vehicle information of the first vehicle includes the driving intention information and the driving information of the first vehicle; correspondingly, the traffic directing module 292 is specifically configured to transmit the lane change driving instruction to the first vehicle, so as to cause the first vehicle to change to a target lane corresponding to the driving intention of the first vehicle when it is determined that the driving intention of the first vehicle does not match with a current driving state of the first vehicle according to the driving intention information and the driving information of the first vehicle.

Optionally, the vehicle information of the first vehicle includes position information of the first vehicle; correspondingly, the traffic directing module 292 is specifically configured to transmit the lane change driving instruction to the first vehicle, so as to cause the first vehicle to change to a target lane that is failure-free when it is determined that a failure occurs in the lane where the first vehicle is currently located according to the position information of the first vehicle.

Optionally, the vehicle information of the first vehicle includes the position information of the first vehicle; correspondingly, the traffic directing module 292 is specifically configured to transmit the lane change driving instruction to the first vehicle, so as to cause the first vehicle to change to a target lane assigned by the traffic control unit to the first vehicle when it is determined that the current lane of the first vehicle is not the target lane according to the position information of the first vehicle.

Optionally, the traffic directing module 292 is further configured to transmit a stop instruction to a rear vehicle in the target lane to coordinate a space for lane change for the first vehicle when there is no space for lane change in the target lane.

Optionally, the follow-up driving instruction includes: identification information of the second vehicle, a vehicle speed of the second vehicle, the driving intention information of the second vehicle, a vehicle attribute of the second vehicle, a safe distance for the follow-up driving, a maximum vehicle speed of the first vehicle.

Optionally, the green light passage instruction includes: the traffic control phase information, the phase remaining duration, an exit lane and a recommended vehicle speed.

Optionally, the red light stop instruction includes: position information of a stop line of the lane where the first vehicle is located, traffic control phase information, a phase remaining duration, an exit lane and a recommended vehicle speed.

Optionally, the vehicle driving information of the first vehicle includes at least one of the following: position information, a speed, an accelerated speed and a driving direction of the first vehicle.

The apparatus for controlling a cooperative intersection provided by the embodiment of the present disclosure may be specifically configured to perform the above method embodiment provided in FIG. 27, and specific functions will not be repeated herein again.

In the present embodiment, the traffic control unit receives the passage request for intersection of the host vehicle, and transmits the traffic directing instruction to the host vehicle according to the vehicle information of the host vehicle in the passage request for intersection, so as to cause the host vehicle to pass through the intersection according to the traffic directing instruction, which digitalizes direction operations of a traffic police in the intersection, and transmits the traffic directing instruction through V2X communication, thereby may finely direct the driving lanes of each vehicle, the follow-up driving, the time to drive through, the time to stop, the position to stop at, and make the intersection traffic safer and more efficient.

Figure 30:
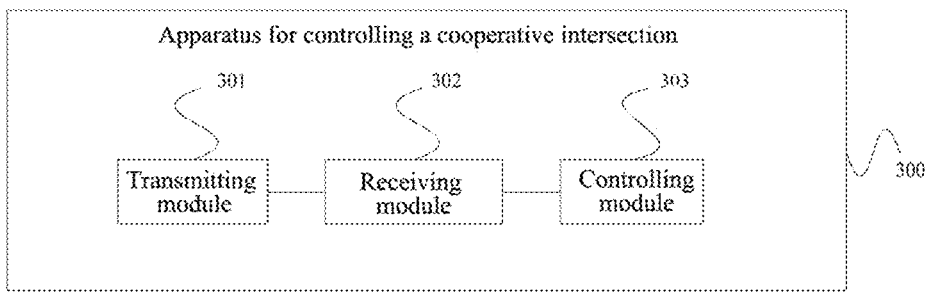
FIG. 30 is a structural diagram of an apparatus for controlling a cooperative intersection provided by another embodiment of the present disclosure.

FIG. 30 is a structural diagram of an apparatus for controlling a cooperative intersection provided by another embodiment of the present disclosure. The apparatus for controlling a cooperative intersection provided by the embodiment of the present disclosure may perform the processing provided by the embodiment of the method for controlling a cooperative intersection. As shown in FIG. 30, the apparatus for controlling a cooperative intersection 300 includes a transmitting module 301, a receiving module 302 and a controlling module 303. The apparatus for controlling a cooperative intersection 300 may be specifically integrated into a terminal device, such as a mobile phone, a trip computer, or an onboard unit, in the host vehicle, and is configured to implement the CI application. Optionally, the transmitting module 301 is configured to transmit a passage request for intersection to a traffic control unit, where the passage request for intersection includes vehicle information of the first vehicle; the receiving module 302 is configured to receive a traffic directing instruction transmitted by the traffic control unit; the controlling module 303 is configured to control the first vehicle to pass through an intersection according to the traffic directing instruction and surrounding environment information of the first vehicle.

Optionally, the traffic directing instruction is a follow-up driving instruction; correspondingly, the controlling module 303 is specifically configured to control the first vehicle to drive following a second vehicle through the intersection according to the follow-up driving instruction and driving behavior information of a second vehicle.

Optionally, the follow-up driving instruction includes: identification information of the second vehicle, a vehicle speed of the second vehicle, driving intention information of the second vehicle, a vehicle attribute of the second vehicle, a safe distance for the follow-up driving, a maximum vehicle speed of the first vehicle.

Optionally, the traffic directing instruction is a red light stop instruction; correspondingly, the controlling module 303 is specifically configured to control the first vehicle to stop by a stop line of a lane where it is located according to the red light stop instruction and the surrounding environment information of the first vehicle.

Optionally, the red light stop instruction includes: position information of the stop line of the lane where the first vehicle is located, traffic control phase information, a phase remaining duration, an exit lane and a recommended vehicle speed.

Optionally, the traffic directing instruction is a green light passage instruction; correspondingly, the controlling module 303 is specifically configured to control the first vehicle to pass through the intersection according to the green light passage instruction and the surrounding environment information of the first vehicle.

Optionally, the green light passage instruction includes: traffic control phase information, a phase remaining duration, an exit lane and a recommended vehicle speed.

Optionally, the traffic directing instruction is a lane change driving instruction; correspondingly, the controlling module 303 is specifically configured to control the first vehicle to change to a target lane indicated by the lane change driving instruction according to the lane change driving instruction and the surrounding environment information of the first vehicle.

Optionally, the surrounding environment information of the first vehicle is detected by an on board sensor of the first vehicle.

Optionally, the surrounding environment information of the first vehicle is detected by at least one of other vehicles, road side units and pedestrian terminal devices in the vicinity of the first vehicle.

The apparatus for controlling a cooperative intersection provided by the embodiment of the present disclosure may be specifically configured to perform the above method embodiment provided in FIG. 28, and specific functions will not be repeated herein again.

In the present embodiment, after transmitting the passage request for intersection to the traffic control unit, the terminal device of the host vehicle receives the traffic directing instruction transmitted by the traffic control unit, and controls the host vehicle to pass through the intersection according to the traffic directing instruction and the surrounding environment information of the host vehicle; the traffic control unit digitalizes direction operations of a traffic police in the intersection, and transmits the traffic directing instruction through V2X communication, which may finely direct the driving lanes of each vehicle, the follow-up driving, the time to drive through, the time to stop, the position to stop at, and make the intersection traffic safer and more efficient.

Figure 31:
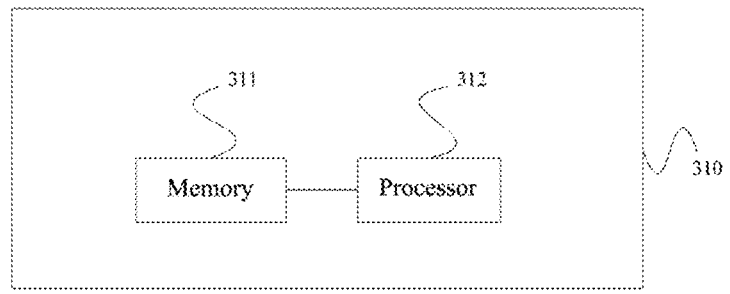
FIG. 31 is a structural diagram of a traffic control unit provided by an embodiment of the present disclosure.

FIG. 31 is a structural diagram of a traffic control unit provided by an embodiment of the present disclosure. As shown in FIG. 31, the traffic control unit 310 includes: a memory 311 and a processor 312; where the memory 111 is configured to store a program code; the processor 112 calls the program code, which, when being executed, is configured to perform the method for controlling a cooperative intersection described in the above embodiments.

Figure 32:
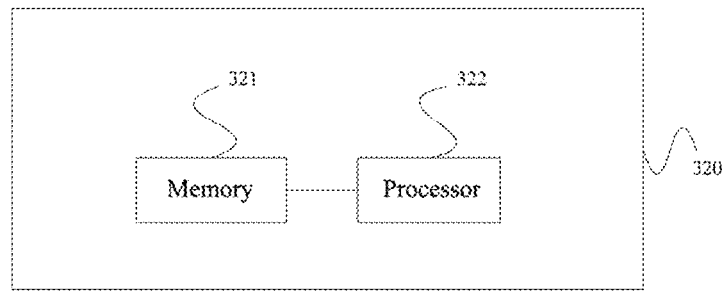
FIG. 32 is a structural diagram of a terminal device provided by an embodiment of the present disclosure.

FIG. 32 is a structural diagram of a terminal device provided by an embodiment of the present disclosure. The terminal device may be a mobile phone, a trip computer or an on board unit in a host vehicle. As shown in FIG. 32, the terminal device 320 includes: a memory 321 and a processor 322; where the memory 321 is configured to store a program code; the processor 322 calls the program code which, when being executed, is configured to perform the method for controlling a cooperative intersection described in the above embodiments.

In addition, an embodiment of the present disclosure further provides a computer readable storage medium including instructions, which, when being executed on a computer, cause the computer to perform the method for controlling a cooperative intersection described in the above embodiments.

The Collaborative Lane Change (CLC). The CLC including three sub-applications: Collaborative Discretionary Lane Change (CDLC), Collaborative Vehicle Confluence (CVC) and Collaborative Reverse Vehicle Routing (CRVR).

In the following, the Collaborative Discretionary Lane Change (CDLC), the Collaborative Vehicle Confluence (CVC) and the Collaborative Reverse Vehicle Routing (CRVR) are introduced separately in conjunction with the specific scenarios.

The Collaborative Discretionary Lane Change (CDLC) refers to a case where a host vehicle (HV-1) which needs to perform a lane change during the drive transmits driving intention information to a host vehicle (HV-2) in relevant lanes (the current lane and a target lane) or a traffic control unit, then the HV-2 performs an acceleration or a deceleration, or the traffic control unit performs a general coordination according to the request so that the HV may smoothly complete the passage. CDLC application may implement an autonomic collaborative lane change among vehicles and generally coordinate the control of vehicle lane change through network, which may improve traffic efficiency and safety.

Figure 33:
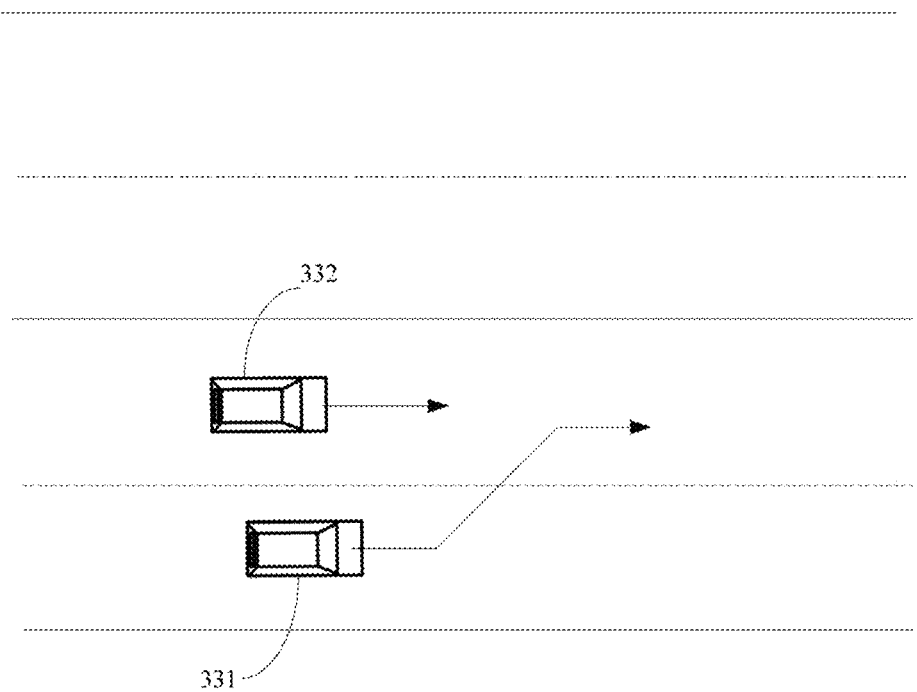
FIG. 33 is a schematic diagram of a main scenario of CDLC provided by an embodiment of the present disclosure.

A main scenario of the CDLC may be as shown in FIG. 33. As shown in FIG. 33, a vehicle 331 (HV-1) drives normally on the present road, and a vehicle 332 (HV-2) drives in a relevant lane (the present lane and a target lane). The vehicle 331 and the vehicle 332 are required to have the wireless communication capability. A corresponding application (APP) which is installed in a mobile phone, a trip computer or an on board unit in the vehicle 331 may implement the CDLC function, that is, the mobile phone, the trip computer or the on board unit in the vehicle 331 has the CDLC function. A corresponding application (APP) which is installed in a mobile phone, a trip computer or an on board unit in the vehicle 332 may implement the CDLC function, that is, the mobile phone, the trip computer or the on board unit in the vehicle 332 has the CDLC function.

Figure 34:
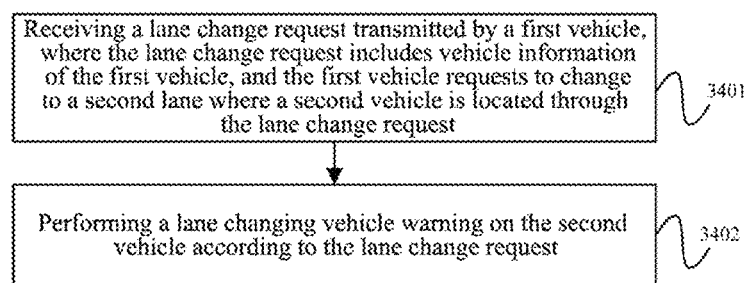
FIG. 34 is a flow diagram of a method for controlling a collaborative lane change provided by an embodiment of the present disclosure.

FIG. 34 is a flow diagram of a method for controlling a collaborative lane change provided by an embodiment of the present disclosure. In the present embodiment, a first vehicle may specifically be the vehicle 331 as shown in FIG. 33, and a second vehicle may specifically be the vehicle 332 as shown in FIG. 33. The method for controlling a collaborative lane change provided by the embodiment of the present disclosure is applied to a terminal device, such as a mobile phone, a trip computer, or an onboard unit, in the second vehicle. In other embodiments, the method for controlling a collaborative lane change is also applicable to other devices. The present embodiment is schematically illustrated by taking the terminal device in the second vehicle, such as the vehicle 332, as an example. The specific steps of this method are as follows:

Step 3401: receiving a lane change request transmitted by the first vehicle, where the lane change request includes vehicle information of the first vehicle, and the first vehicle requests to change to a second lane where the second vehicle is located through the lane change request.

As shown in FIG. 33, when the vehicle 331 needs to perform a lane change during the drive, the vehicle 331 transmits to the vehicle 332 a lane change request which includes vehicle information of the vehicle 331, such as driving intention information, a speed, position information and the like of the vehicle 331. Specifically, the vehicle 331 may transmit the lane change request to the vehicle 332 by broadcasting.

In the present embodiment, the vehicle information of the vehicle 331 transmitted by the vehicle 331 to the vehicle 332, i.e., data of the host vehicle, is specifically as shown in Table 2 below:

TABLE 2

| DATA | UNIT | REMARKS |
| --- | --- | --- |
| TIME | ms | |
| POSITION (LONGTITUDE, LATITUDE) | deg | |
| POSITION (ALTITUDE) | m | |
| HEAD DIRECTION ANGLE | deg | |
| SIZE OF VEHICLE BODY (LENGTH AND WIDTH) | m | |
| SPEED | m/s | |
| LONGITUDINAL ACCELERATED SPEED | m/s$^2$ | |
| YAW VELOCITY | deg/s | |
| STEERING SIGNAL | | WHETHER TURN LIGHT IS ACTIVATED |
| STEERING WHEEL ANGLE | deg | |

Optionally, the vehicle 331 transmits the lane change request to the vehicle 332 at a time when a lane change preparation action occurs, for example, at a time when the turn light of the vehicle 331 is turned on; alternatively, the vehicle 331 transmits the lane change request to the vehicle 332 at a time when a lane change action occurs, for example, at a time when the steering wheel of the vehicle 331 is turned, so that the vehicle 332 may have sufficient time to take measures to avoid a collision from occurring after receiving the lane change request transmitted by the vehicle 331, which enables the vehicle 331 (HV-1) to smoothly complete a lane change action.

Step 3402: performing a lane changing vehicle warning on the second vehicle according to the lane change request.

After a terminal device, such as the mobile phone, the trip computer or the on board unit, in the vehicle 332 receives the lane change request transmitted by the vehicle 331, it performs a lane changing vehicle warning on the vehicle 332. For example, the terminal device in the vehicle 332 may warn a driver in the vehicle 332 that there is a vehicle that needs to perform a lane change. At this time, the driver in the vehicle 332 may automatically decelerate or accelerate according to the warning issued by the terminal device.

Specifically, the performing a lane changing vehicle warning on the second vehicle according to the lane change request includes: if a speed of the first vehicle is greater than a speed of the second vehicle, transmitting a deceleration warning or a stop warning to the second vehicle.

For example, when the terminal device of the vehicle 332 determines that a speed of the vehicle 331 is greater than a speed of the vehicle 332 according to the vehicle information of the vehicle 331, such as the speed of the vehicle 331, and the speed of the vehicle 332, the terminal device of the vehicle 332 transmits a deceleration warning or a stop warning to the vehicle 332, for example, transmits the deceleration warning or the stop warning to the driver in the vehicle 332, so as to cause the vehicle 331 to perform the lane change.

Alternatively, the performing a lane changing vehicle warning on the second vehicle according to the lane change request includes: if the speed of the first vehicle is smaller than the speed of the second vehicle, transmitting an acceleration warning to the second vehicle.

For example, when the terminal device of the vehicle 332 determines that the speed of the vehicle 331 is smaller than the speed of the vehicle 332 according to the vehicle information of the vehicle 331, such as the speed of the vehicle 331, and the speed of the vehicle 332, the terminal device of the vehicle 332 transmits an acceleration warning to the vehicle 332, for example, transmits the acceleration warning to the driver in the vehicle 332 to cause the vehicle 331 to perform the lane change after the vehicle 332 passes quickly.

In the present embodiment, the terminal device in the second vehicle receives the lane change request transmitted by the first vehicle, and performs the lane changing vehicle warning on the second vehicle according to the lane change request, thereby improving the traffic efficiency and security of the vehicle during the lane change process.

Figure 35:
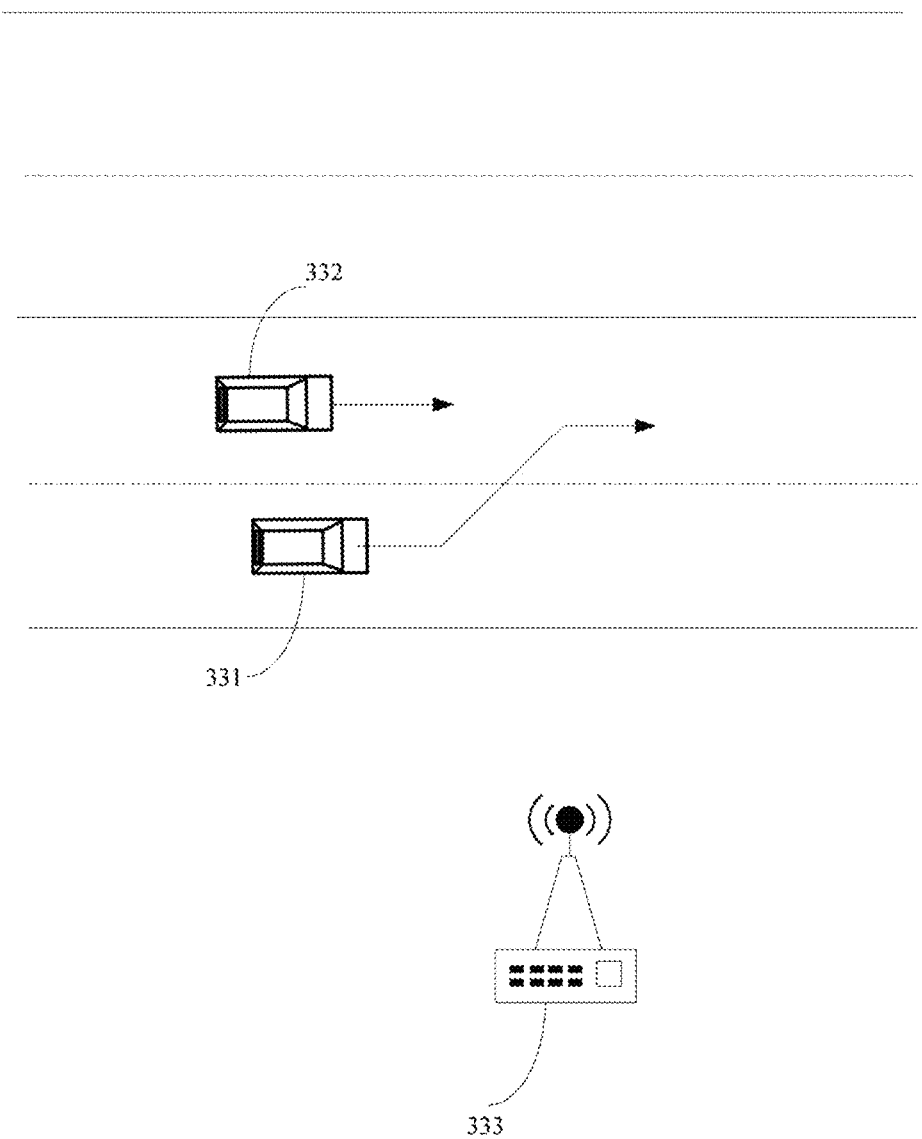
FIG. 35 is a schematic diagram of a main scenario of CDLC provided by another embodiment of the present disclosure.

The main scenario of the CDLC may also be as shown in FIG. 35. As shown in FIG. 35, a vehicle 331 (HV-1) drives normally on the present road, and a vehicle 332 (HV-2) drives in a relevant lane (the present lane and a target lane). The vehicle 331 and the vehicle 332 are required to have the wireless communication capability, and a traffic control unit 333 is also provided with wireless communication capability. A corresponding application (APP) which is installed in a terminal device, such as a mobile phone, a trip computer or an OBU, in the vehicle 331 may implement the CDLC function. The vehicle 331 (HV-1) needs to be merged into the traffic in another lane, for example, needs to change to the lane where the vehicle 332 is located during the drive. At this time, the vehicle 331 transmits a lane change request to the traffic control unit 333, and the traffic control unit 333 may perform a general planning according to the lane change request of the vehicle 331 and vehicle information of the vehicle 332, to specify a passage order, a vehicle speed, a passage time and the like for the vehicle. The terminal device in the vehicle 331 may receive planning information transmitted by the traffic control unit 333 and warns the driver.

Specifically, the planning information transmitted by the traffic control unit 333 to the vehicle 331 is specifically as shown in Table 3 below:

TABLE 3

| DATA | UNIT | REMARKS |
|---|---|---|
| TIME | ms | |
| PASSAGE REQUEST | | BOOLEAN |
| PASSAGE TIME ALLOWED | ms | |
| DRIVING SPEED ALLOWED | m/s | |
| PASSAGE ORDER | | INTEGER |

Optionally, the vehicle 331 transmits the lane change request to the traffic control unit 333 at a time when a lane change preparation action occurs, for example, at a time when the turn light of the vehicle 331 is turned on; alternatively, the vehicle 331 transmits the lane change request to the traffic control unit 333 at a time when a lane change action occurs, for example, at a time when the steering wheel of the vehicle 331 is turned.

Optionally, a timing at which the traffic control unit 333 transmits the planning information to the vehicle 331 needs to ensure that the vehicle 331 may have sufficient time to take measures to avoid a collision from occurring and to cause the vehicle 331 to safely pass through after receiving the planning information of the traffic control unit 333.

Figure 36:
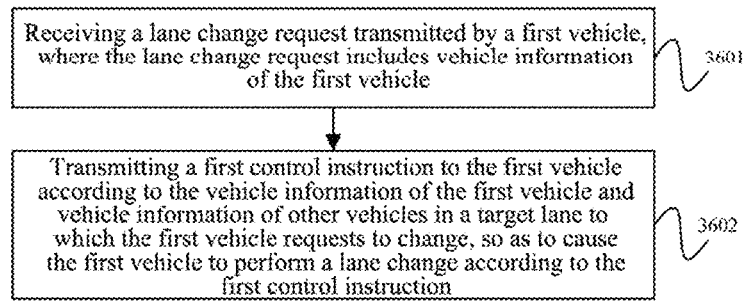
FIG. 36 is a flow diagram of a method for controlling a collaborative lane change provided by an embodiment of the present disclosure.

FIG. 36 is a flow diagram of a method for controlling a collaborative lane change provided by an embodiment of the present disclosure. The method for controlling a collaborative lane change provided by the embodiment of the present disclosure is applicable to a traffic control unit. In other embodiments, the method for controlling a collaborative lane change is also applicable to other devices. The present embodiment is illustrated by taking the traffic control unit as an example. The specific steps of the method are as follows:

Step 3601: receiving a lane change request transmitted by a first vehicle, where the lane change request includes vehicle information of the first vehicle.

In the present embodiment, a second vehicle may specifically be the vehicle 332 as shown in FIG. 35, and the first vehicle may specifically be the vehicle 331 as shown in FIG. 35.

As shown in FIG. 35, the vehicle 331 (HV-1) needs to be merged into the traffic in another lane, for example, needs to change to the lane where the vehicle 332 is located during the drive. At this time, the vehicle 331 transmits to the traffic control unit 333 a lane change request including vehicle information of the vehicle 331, and a data format of the vehicle information of the vehicle 331 is as shown in Table 2 above.

Step 3602: transmitting a first control instruction to the first vehicle according to the vehicle information of the first vehicle and vehicle information of other vehicles in a target lane to which the first vehicle requests to change, so as to cause the first vehicle to perform a lane change according to the first control instruction.

After receiving the lane change request transmitted by the vehicle 331, the traffic control unit 333 may determine a target lane to which the vehicle 331 requests the change according to the vehicle information of the vehicle 331, such as position information and a head direction angle, and further transmit a first control instruction to the vehicle 331 according to the vehicle information of the vehicle 331 and vehicle information of the other vehicles in the target lane, so as to cause the vehicle 331 to perform a lane change according to the first control instruction. A data format of the first control instruction transmitted by the traffic control unit 333 to the vehicle 331 is specifically as shown in Table 3 above.

Specifically, the transmitting a first control instruction to the first vehicle according to the vehicle information of the first vehicle and vehicle information of other vehicles in a target lane to which the first vehicle requests to change, so as to cause the first vehicle to perform a lane change according to the first control instruction includes: transmitting the first control instruction to the first vehicle according to the vehicle information of the first vehicle and vehicle information of the second vehicle adjacent to the first vehicle in the target lane to which the first vehicle requests to change, so as to cause the first vehicle to perform the lane change according to the first control instruction.

As shown in FIG. 35, the vehicle 332 is a vehicle adjacent to the vehicle 331 in the target lane, and after the traffic control unit 333 receives the lane change request transmitted by the vehicle 331, it may transmit a first control instruction to the vehicle 331 according to the vehicle information of the vehicle 331 and the vehicle information of the vehicle 332, so as to cause the vehicle 331 to perform a lane change according to the first control instruction.

Specifically, the transmitting the first control instruction to the first vehicle according to the vehicle information of the first vehicle and vehicle information of the second vehicle adjacent to the first vehicle in the target lane to which the first vehicle requests to change, so as to cause the first vehicle to perform the lane change according to the first control instruction includes: transmitting the first control instruction to the first vehicle if a speed of the first vehicle is greater than a speed of the second vehicle in the target lane adjacent to the first vehicle to which the first vehicle requests to change, so as to cause the first vehicle to perform the lane change according to the first control instruction.

For example, when the traffic control unit 333 determines that a speed of the vehicle 331 is greater than a speed of the vehicle 332 according to the vehicle information of the vehicle 331, such as the speed of the vehicle 331, and the vehicle information of the vehicle 332, such as the speed of the vehicle 332, it transmits the first control instruction to the vehicle 331 to cause the vehicle 331 to perform the lane change according to the first control instruction. That is, the first control instruction is configured to control the vehicle 331 to change to the lane where the vehicle 332 is located for driving.

Optionally, the transmitting the first control instruction to the first vehicle includes: transmitting the first control instruction to the first vehicle when a lane change preparation action of the first vehicle occurs; or transmitting the first control instruction to the first vehicle when a lane change action of the first vehicle occurs. For example, the traffic control unit 333 may transmit the first control instruction to the vehicle 331 when a lane change preparation action of the vehicle 331 occurs, such as when the turn light is turned on. Alternatively, the traffic control unit 333 may also transmit the first control instruction to the vehicle 331 when a lane change action of the vehicle 331 occurs, such as when the steering wheel is turned, to ensure that the vehicle 331 has sufficient time to take measures after receiving the first control instruction and avoids a collision from occurring, which enables the vehicle 331 (HV-1) to smoothly complete the lane change action.

In addition, a second control instruction is transmitted to the first vehicle if the speed of the first vehicle is smaller than the speed of the second vehicle adjacent to the first vehicle in the target lane to which the first vehicle requests to change, so as to cause the first vehicle to decelerate or stop according to the second control instruction.

For example, when the traffic control unit 333 determines that the speed of the vehicle 331 is smaller than the speed of the vehicle 332 according to the vehicle information of the vehicle 331, such as the speed of the vehicle 331, and the vehicle information of the vehicle 332, such as the speed of the vehicle 332, it transmits a second control instruction to the vehicle 331, so as to cause the vehicle 331 to decelerate or stop according to the second control instruction. That is, the second control instruction is configured to control the vehicle 331 to decelerate or stop.

Optionally, the transmitting a second control instruction to the first vehicle includes: transmitting the second control instruction to the first vehicle when a lane change preparation action of the first vehicle occurs; or transmitting the second control instruction to the first vehicle when a lane change action of the first vehicle occurs. For example, the traffic control unit 333 may transmit the second control instruction to the vehicle 331 when a lane change preparation action of the vehicle 331 occurs, such as when the turn light is turned on. Alternatively, the traffic control unit 333 may also transmit the second control instruction to the vehicle 331 when a lane change action of the vehicle 331 occurs, such as when the steering wheel is turned, to ensure that the vehicle 331 has sufficient time to take measures after receiving the first control instruction and avoids a collision from occurring.

In the present embodiment, the HV and the traffic control unit are required to have the wireless communication capability, and the vehicle information is transmitted between the HV-1 and the HV-2 by wireless communication (V2V); the traffic control unit transmits the coordination control information to the HV (V2I).

In the present embodiment, the traffic control unit receives the lane change request transmitted by the first vehicle, where the lane change request includes the vehicle information of the first vehicle, and transmits the first control instruction to the first vehicle according to the vehicle information of the first vehicle and the vehicle information of the other vehicles in the target lane to which the first vehicle requests to change, so as to cause the first vehicle to perform the lane change according to the first control instruction, which may improve the traffic efficiency and safety of the vehicle during the lane change process.

The Collaborative Vehicle Confluence (CVC) refers to a case where when a traffic control unit receives a confluence request from a host vehicle (HV-1) or determines that the host vehicle (HV-1) enters a confluence area, the traffic control unit determines whether there is another host vehicle (HV-2) in the confluence area, which has a confluence priority higher than a confluence priority of the host vehicle (HV-1), by obtaining confluence priorities of each vehicle in the confluence area, so as to perform a general coordination on the passage order of the relevant vehicles at the confluence intersection; if the traffic control unit determines that there is the another host vehicle (HV-2) in the confluence area, which has the confluence priority higher than the confluence priority of the host vehicle (HV-1), then the traffic control unit performs a determination and transmits a control instruction to the host vehicle (HV-1) to control the host vehicle (HV-1) to decelerate or stop, so that the host vehicle (HV-2) performs a confluence driving preferentially; and if the traffic control unit determines that there is no host vehicle (HV-2) in the confluence area, which has the confluence priority higher than the confluence priority of the host vehicle (HV-1), then the traffic control unit performs a determination and transmits a control instruction to the host vehicle (HV-1) to control the confluence driving of the host vehicle (HV-1). CVC applications may make a general plan and coordination control for traffic participants through a network to achieve safe, orderly, and efficient vehicle confluence.

Figure 37:
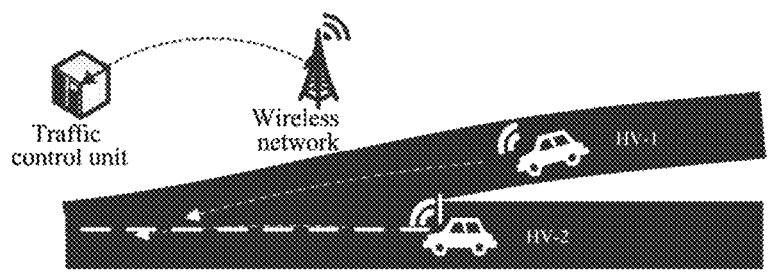
FIG. 37 is a schematic diagram of a main scenario of CVC provided by an embodiment of the present disclosure.
Figure 38:
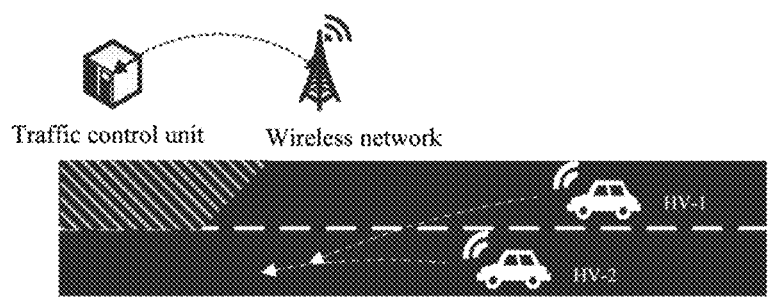
FIG. 38 is a schematic diagram of a main scenario of CVC provided by an embodiment of the present disclosure.

A main scenario of the CVC may be as shown in FIG. 37 and FIG. 38. As shown in FIG. 37, a HV-1 is on a side road, a HV-2 is on a main road, and the HV-1 needs to be merged into the traffic on the main road from the side road. As shown in FIG. 38, due to the construction, obstacles in front of the HV-1, or other reasons that cause the traffic in the lane of the HV-1 to be interrupted, the HV-1 needs to be merged into the traffic in the lane of the HV-2 from the lane where the HV-1 is located, that is, two lanes changing to one lane. A characteristic of the scenarios shown in FIGS. 37 and 38 is that the vehicles in the two lanes have different road right levels. That is, by default, a vehicle performing a lane change needs to give way to a vehicle going straight.

Figure 39:
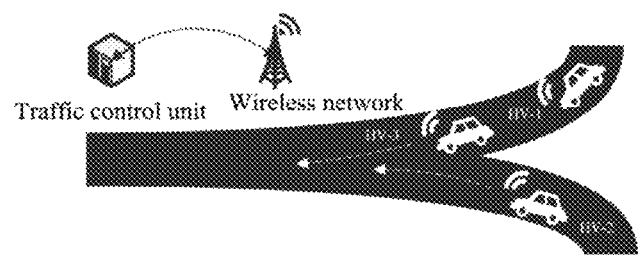
FIG. 39 is a schematic diagram of a main scenario of CVC provided by an embodiment of the present disclosure.

The main scenario of the CVC may also be as shown in FIG. 39. As shown in FIG. 39, HV-1 and HV-2 perform the confluence at a herringbone intersection in a zipper manner. A characteristic of this scenario is that vehicles in two lanes have the same road right level. That is, by default, when the vehicles perform the confluence, they need to follow a successive zipper passage principle.

Based on the scenarios shown in FIGS. 37, 38, and 39, requirements are as follows:

vehicles participating in collaborative vehicle confluence are required to have the wireless communication capability.

The vehicle is required to be able to feed back a confluence request, vehicle information and an execution result to other traffic participants via a wireless network.

The traffic control unit needs to coordinate a passage order of a potential traffic participant in the confluence process.

According to a movement trend and a potential conflict of the traffic participants in the confluence area, and based on preset rules, the traffic control unit generates a confluence passage strategy, and performs a coordination operation on the passage order of the traffic participants.

The traffic control unit needs to coordinate with a potential moving conflict party in the confluence area to avoid a collision.

The traffic control unit predicts the movement trend and the potential conflict of the traffic participants in the confluence area, and performs a warning or coordination control on the traffic participants to avoid a collision.

Figure 40:
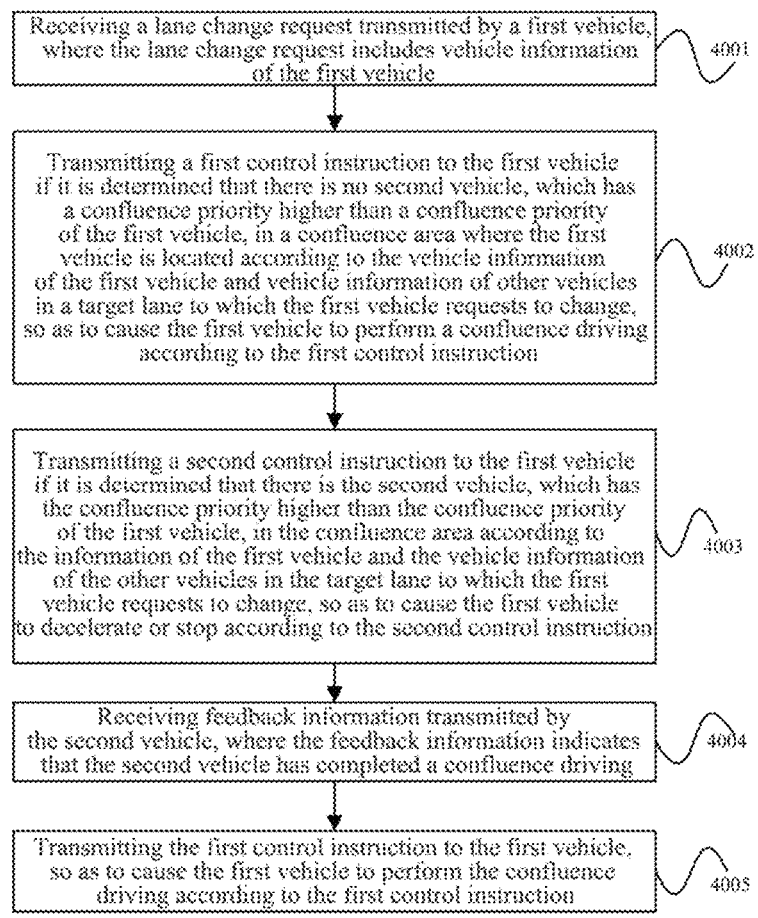
FIG. 40 is a flow diagram of a method for controlling a collaborative lane change provided by another embodiment of the present disclosure.

FIG. 40 is a flow diagram of a method for controlling a collaborative lane change provided by another embodiment of the present disclosure. The method for controlling a collaborative lane change provided by the embodiment of the present disclosure is applicable to a traffic control unit. In other embodiments, the method for controlling a collaborative lane change is also applicable to other devices. The present embodiment is illustrated by taking the traffic control unit as an example. The specific steps of this method are as follows:

Step 4001: receiving a lane change request transmitted by a first vehicle, where the lane change request includes vehicle information of the first vehicle.

In the present embodiment, the first vehicle may specifically be the HV-1 as shown in FIGS. 37, 38 and 39, and a second vehicle may specifically be the HV-2 as shown in FIGS. 37, 38, and 39. In the present embodiment, the vehicle information of the first vehicle includes at least one of the following: position information and a head direction angle of the first vehicle. In addition, the vehicle information of the first vehicle further includes at least one of the following: time information, a size, a speed, a longitudinal accelerated speed, a yaw velocity, a steering signal and a steering wheel angle of the first vehicle. A data format of the vehicle information of the first vehicle is specifically as shown in Table 2 above.

As shown in FIGS. 37, 38 and 39, when the HV-1 needs to perform the confluence, it transmits a lane change request to the traffic control unit, where the lane change request may specifically be a confluence request which includes vehicle information of the HV-1. The vehicle information of the HV-1 includes position information and a head direction angle of the HV-1, and may further include information such as time information, a size, a speed, a longitudinal accelerated speed, a yaw velocity, a steering signal, a steering wheel angle of the HV-1.

Step 4002: transmitting a first control instruction to the first vehicle if it is determined that there is no second vehicle, which has a confluence priority higher than a confluence priority of the first vehicle, in a confluence area where the first vehicle is located according to the vehicle information of the first vehicle and vehicle information of other vehicles in a target lane to which the first vehicle requests to change, so as to cause the first vehicle to perform a confluence driving according to the first control instruction.

When the traffic control unit receives the confluence request transmitted by the HV-1, or the traffic control unit detects that the HV-1 enters the confluence area according to the position information of the HV-1 reported by the HV-1, it obtains confluence priorities of each vehicle in the confluence area where the HV-1 is located, and determines whether there is the HV-2 in the confluence area according to the confluence priorities of each vehicle, where a confluence priority of the HV-2 is higher than a confluence priority of the HV-1, thereby performing a general coordination on the passage order of the relevant vehicles in the confluence intersection. If the traffic control unit determines that there is no HV-2 in the confluence area, where the confluence priority of the HV-2 is higher than the confluence priority of the HV-1, then it transmits the first control instruction the HV-1 to cause the HV-1 to perform the confluence driving according to the first control instruction. A data format of the first control instruction transmitted by the traffic control unit to the HV-1 is specifically as shown in Table 3 above.

Step 4003: transmitting a second control instruction to the first vehicle if it is determined that there is the second vehicle, which has the confluence priority higher than the confluence priority of the first vehicle, in the confluence area according to the information of the first vehicle and the vehicle information of the other vehicles in the target lane to which the first vehicle requests to change, so as to cause the first vehicle to decelerate or stop according to the second control instruction.

If the traffic control unit determines that there is the HV-2 in the confluence area, where the confluence priority of the HV-2 is higher than the confluence priority of the HV-1, it transmits the second control instruction to the HV-1, so as to cause the HV-1 to decelerate or stop according to the second control instruction, which facilitates the HV-2 to perform the confluence driving preferentially.

Specifically, the determining that there is the second vehicle, which has the confluence priority higher than the confluence priority of the first vehicle, in the confluence area according to the information of the first vehicle and the vehicle information of the other vehicles in the target lane to which the first vehicle requests to change includes the following possible implementations:

one possible implementation is: determining that there is the second vehicle, which has the confluence priority higher than the confluence priority of the first vehicle, in the confluence area if a road right level of the target lane to which the first vehicle requests to change is higher than a road right level of a first lane where the first vehicle is located, and the second vehicle in the target lane is in the confluence area.

As shown in FIG. 37, the traffic control unit needs to generally coordinate the passage order of the relevant vehicles within the confluence area in the confluence intersection according to a principle that a vehicle in the main road preferentially passes through when a traffic of the side road is merged into a traffic of the main road.

As shown in FIG. 37 and FIG. 38, when the traffic control unit determines that the road right level of the lane in which the host vehicle (HV-2) is located is higher than the road right level of the lane in which the host vehicle (HV-1) is located, it determines that there is a host vehicle (HV-2), which has a confluence priority higher than a confluence priority of the host vehicle (HV-1), in the confluence area. At this time, the traffic control unit may transmit a second control instruction to the host vehicle (HV-1), so as to cause the HV-1 to decelerate or stop according to the second control instruction, so as to facilitate the HV-2 to perform the confluence driving preferentially. The traffic control unit may also transmit a first control instruction to the host vehicle (HV-2), so as to cause the HV-2 to perform a confluence driving according to the first control instruction.

Another possible implementation is: determining that there is the second vehicle, which has the confluence priority higher than the confluence priority of the first vehicle, in the confluence area if the road right level of the first lane where the first vehicle is located is equal to a road right of a second lane where the second vehicle in the confluence area, which requests to change to the target lane, is located, and if a third vehicle that performs a confluence driving in the target lane drives out from the first lane.

As shown in FIG. 39, when the traffic control unit receives a confluence request from the host vehicle (HV-1) or detects that the host vehicle (HV-1) enters the confluence area, it needs to generally coordinate the passage order of the relevant vehicles within the confluence area in the confluence intersection according to the successive zipper passage principle.

Specifically, the traffic control unit determines that there is a host vehicle (HV-3) that performs a confluence driving in front of a driving direction of the host vehicle (HV-1), and determines that the host vehicle (HV-3) has a confluence priority higher than a confluence priority of the host vehicle (HV-1). Further, when it is determined that the road right level of the lane where the host vehicle (HV-1) is located is equal to the road right level of the lane where the host vehicle (HV-2) is located, it is determined that whether the host vehicle (HV-3) that just performs the confluence driving in the confluence area is a vehicle that drives out from the lane where the main host (HV-1) is located. If the host vehicle (HV-3) is the vehicle that drives out from the lane where the host vehicle (HV-1) is located, it is determined that the confluence priority of the host vehicle (HV-2) is higher than the confluence priority of the host vehicle (HV-1). That is, it is determined that there is the host vehicle (HV-2), which has the confluence priority higher than the confluence priority of the host vehicle (HV-1), in the confluence area.

If the host vehicle (HV-3) that just performs the confluence driving in the confluence area is a vehicle that drives out from the lane where the host vehicle (HV-2) is located, it is determined that the confluence priority of the host vehicle (HV-1) is higher than the confluence priority of the host vehicle (HV-2).

Step 4004: receiving feedback information transmitted by the second vehicle, where the feedback information indicates that the second vehicle has completed a confluence driving.

As shown in FIGS. 37, 38, and 39, after the HV-2 preferentially performs the confluence driving, the HV-2 may also transmit feedback information to the traffic control unit, where the feedback information indicates that the HV-2 has completed the confluence driving.

Step 4005: transmitting the first control instruction to the first vehicle, so as to cause the first vehicle to perform the confluence driving according to the first control instruction.

After receiving the feedback information transmitted by the HV-2, the traffic control unit may further transmit the first control instruction to the HV-1, so as to cause the HV-1 to perform the confluence driving according to the first control instruction.

In this embodiment, the vehicle and the traffic control unit may communicate based on the cellular network communication or the wireless communication.

In this embodiment, the traffic control unit receives the lane change request transmitted by the first vehicle and determines whether there is a second vehicle, which has the confluence priority higher than the confluence priority of the first vehicle, in the confluence area where the first vehicle is located according to the vehicle information of the first vehicle and the vehicle information of the other vehicles in the target lane to which the first vehicle requests to change, if there is no second vehicle in the confluence area, transmits the first control instruction to the first vehicle, so as to cause the first vehicle to perform the confluence driving according to the first control instruction; and if there is the second vehicle in the confluence area, transmits the second control command to the first vehicle, so as to cause the first vehicle to decelerate or stop according to the second control instruction, thereby achieving safe, orderly and efficient vehicle confluence.

The Collaborative Reverse Vehicle Routing (CRVR) refers to a case where: the traffic control unit generates a reverse vehicle routing passage strategy of a vehicle (including an instruction for controlling a reverse vehicle routing passage of the vehicle) according to a reverse vehicle routing request (including a reason for reverse vehicle routing), a movement trend of the vehicle and preset traffic rules, and transmits the reverse vehicle routing passage strategy to the vehicle to ensure that the vehicle safely and efficiently conducts the reverse vehicle routing under a direction of the traffic control unit. A method for reverse vehicle routing which is based on a general coordination of a traffic control unit and defined by the CRVR application cause s relevant vehicles in a reverse vehicle routing area to be generally coordinated and controlled by a traffic management center through a network, so as to achieve safe and orderly reverse vehicle routing passage.

Figure 41:
FIG. 41 is a schematic diagram of a main scenario of CRVR provided by an embodiment of the present disclosure.

A main scenario of the CRVR may be as shown in FIG. 41. As shown in FIG. 41, a lane where a HV-1 is located and a lane where a HV-2 is located are two-way single lanes. When the HV-1 encounters an obstacle during the drive, it needs to use the lane where the HV-2 is located. A characteristic of this scenario is that: there is no other lane in a direction of the original lane for driving; vehicles in the two lanes have different road right levels. That is, by default, a vehicle performing a reverse vehicle routing needs to give way to a vehicle going straight.

The traffic control unit performs the following coordination on the relevant vehicles based on the wireless communication network:

coordinating a passage order of potential traffic participants in the reverse vehicle routing process.

The traffic control unit predicts a movement trend and a potential conflict of the traffic participants in the reverse vehicle routing area, and generates a reverse vehicle routing passage strategy based on preset rules, and performs a coordination operation on the passage order of the traffic participants.

Coordinating with a potential moving conflict party in the reverse vehicle routing area to avoid a collision.

The traffic control unit predicts the movement trend and the potential conflict of the traffic participants in the reverse vehicle routing area, and performs a warning or coordination control on the traffic participants to avoid a collision.

Figure 42:
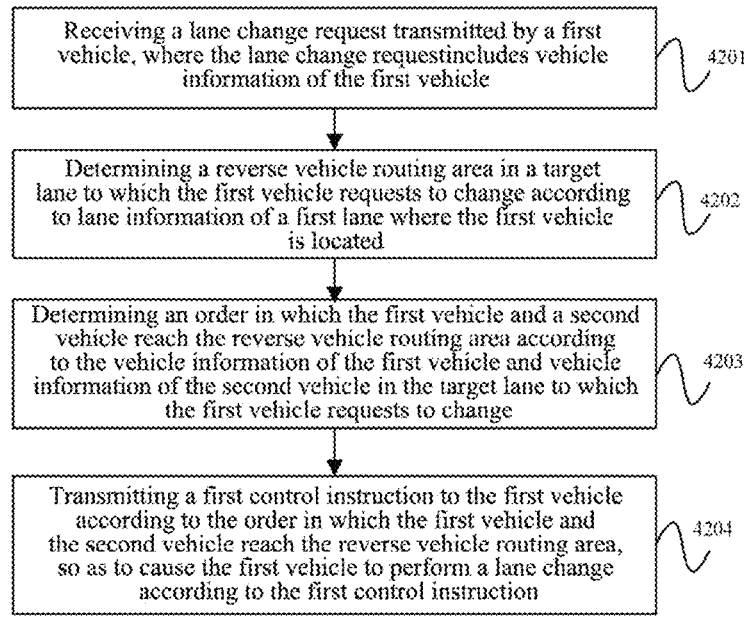
FIG. 42 is a flow diagram of a method for controlling a collaborative lane change provided by another embodiment of the present disclosure.

FIG. 42 is a flow diagram of a method for controlling a collaborative lane change provided by another embodiment of the present disclosure. The method for controlling a collaborative lane change provided by the embodiment of the present disclosure is applicable to a traffic control unit. In other embodiments, the method for controlling a collaborative lane change is also applicable to other devices. The present embodiment is illustrated by taking the traffic control unit as an example. The specific steps of this method are as follows:

Step 4201: receiving a lane change request transmitted by a first vehicle, where the lane change request includes vehicle information of the first vehicle.

In the present embodiment, the first vehicle may specifically be the HV-1 as shown in FIG. 41, and a second vehicle may specifically be the HV-2 as shown in FIG. 41. In the present embodiment, the vehicle information of the first vehicle includes at least one of the following: position information and a head direction angle of the first vehicle. In addition, the vehicle information of the first vehicle further includes at least one of the following: time information, a size, a speed, a longitudinal accelerated speed, a yaw velocity, a steering signal and a steering wheel angle of the first vehicle. A data format of the vehicle information of the first vehicle is specifically as shown in Table 2 above.

As shown in FIG. 41, when the HV-1 encounters an obstacle during the drive, it needs to use a lane where the HV-2 is located. At this time, the HV-1 transmits a reverse vehicle routing request to the traffic control unit. The reverse vehicle routing request may include position information of the HV-1, an expected track for the reverse vehicle routing passage, and a reason for the reverse vehicle routing passage.

Step 4202: determining a reverse vehicle routing area in a target lane to which the first vehicle requests to change according to lane information of a first lane where the first vehicle is located.

As shown in FIG. 41, after the traffic control unit receives the reverse vehicle routing request transmitted by the HV-1, it may detect a position, a type, a size and the like of an obstacle in a lane where the HV-1 is located through a road side unit, and determine a possible size of the reverse vehicle routing area that the HV-1 needs to use in a lane where the HV-2 is located according to the information such as the position, the type, the size and the like of the obstacle.

Step 4203: determining an order in which the first vehicle and the second vehicle reach the reverse vehicle routing area according to the vehicle information of the first vehicle and vehicle information of the second vehicle in the target lane to which the first vehicle requests to change.

Further, the traffic control unit may calculate an order in which the HV-1 and the HV-2 reach the reverse vehicle routing area according to position and speed of the HV-1 and position and speed of the HV-2.

Step 4204: transmitting a first control instruction to the first vehicle according to the order in which the first vehicle and the second vehicle reach the reverse vehicle routing area, so as to cause the first vehicle to perform a lane change according to the first control instruction.

Specifically, the transmitting a first control instruction to the first vehicle according to the order in which the first vehicle and the second vehicle reach the reverse vehicle routing area, so as to cause the first vehicle to perform a lane change according to the first control instruction includes the following possible implementations:

one possible implementation is: if the first vehicle reaches the reverse vehicle routing area earlier than the second vehicle, transmitting the first control instruction to the first vehicle, so as to cause the first vehicle to perform a reverse vehicle routing in the reverse vehicle routing area of the target lane according to the first control instruction.

For example, if the traffic control unit calculates that the HV-1 reaches the reverse vehicle routing area earlier than the HV-2, the traffic control unit may transmit a first control instruction to the HV-1, so as to cause the HV-1 to perform a reverse vehicle routing in the target lane, i.e., the lane where the HV-2 is located, according to the first control instruction.

In addition, if the second vehicle reaches the reverse vehicle routing area earlier than the first vehicle, a second control instruction is transmitted to the first vehicle, so as to cause the first vehicle to decelerate or stop according to the second control instruction.

For example, if the traffic control unit calculates that the HV-2 reaches the reverse vehicle routing area earlier than the HV-1, the traffic control unit may transmit a second control instruction to the HV-1, so as to cause the HV-1 to decelerate or stop according to the second control instruction.

Another possible implementation is: transmitting the first control instruction to the first vehicle according to the order in which the first vehicle and the second vehicle reach the reverse vehicle routing area, the lane information of the first lane where the first vehicle is located and lane information of the target lane, so as to cause the first vehicle to perform the lane change according to the first control instruction.

Specifically, if the second vehicle reaches the reverse vehicle routing area earlier than the first vehicle and a traffic flow in the target lane is smaller than that in the first lane where the first vehicle is located, then the first control instruction is transmitted to the first vehicle, so as to cause the first vehicle to perform the reverse vehicle routing in the reverse vehicle routing area of the target lane according to the first control instruction.

For example, if the traffic control unit calculates that the HV-2 reaches the reverse vehicle routing area earlier than HV-1, however, a traffic flow in the lane where the HV-2 is located is smaller than a traffic flow in the lane where the HV-1 is located, that is, the lane where the HV-1 is located is busier than the lane where the HV-2 is located, then the traffic control unit may transmit the first control instruction to the HV-1, so as to cause the HV-1 to perform the reverse vehicle routing in the target lane, i.e., the lane where the HV-2 is located, according to the first control instruction.

If the first vehicle reaches the reverse vehicle routing area earlier than the second vehicle and the traffic flow in the target lane is larger than that in the first lane where the first vehicle is located, then the second control instruction is transmitted to the first vehicle, so as to cause the first vehicle to decelerate or stop according to the second control instruction.

For example, if the traffic control unit calculates that the HV-1 reaches the reverse vehicle routing area earlier than the HV-2, however, the traffic flow in the lane where the HV-2 is located is larger than that in the lane where the HV-1 is located, that is, the lane where the HV-2 is located is busier than the lane where the HV-1 is located, then the traffic control unit may transmit the second control instruction to the HV-1, so as to cause the HV-1 to decelerate or stop according to the second control instruction.

Yet another possible implementation is: if a road right level of the first lane where the first vehicle is located is lower than a road right level of the target lane to which the first vehicle requests to change, transmitting the second control instruction to the first vehicle, so as to cause the first vehicle to decelerate or stop according to the second control instruction.

As shown in FIG. 41, vehicles of the two lanes have different road right levels. That is, by default, a vehicle performing the reverse vehicle routing needs to give way to a vehicle going straight. At this time, the traffic control unit may transmit the second control instruction to the HV-1 to cause the HV-1 to decelerate or stop according to the second control instruction. After the HV-2 passes through, the traffic control unit transmits the first control instruction to the HV-1, so as to cause the HV-1 to perform the reverse vehicle routing according to the first control instruction. A data format of the first control instruction transmitted by the traffic control unit to the HV-1 is specifically as shown in Table 3 above.

In this embodiment, the vehicle and the traffic control unit may communicate based on the cellular network communication or the wireless communication.

In the present embodiment, the traffic control unit receives the lane change request transmitted by the first vehicle, determines the reverse vehicle routing area in the target lane to which the first vehicle requests to change according to the lane information of the first lane where the first vehicle is located, determines the order in which the first vehicle and the second vehicle reach the reverse vehicle routing area according to the vehicle information of the first vehicle and the vehicle information of the second vehicle in the target lane to which the first vehicle requests to change, and transmits the first control instruction to the first vehicle according to the order in which the first vehicle and the second vehicle reach the reverse vehicle routing area, so as to cause the first vehicle to perform the lane change according to the first control instruction, thereby achieving safe and orderly reverse vehicle routing.

Figure 43:
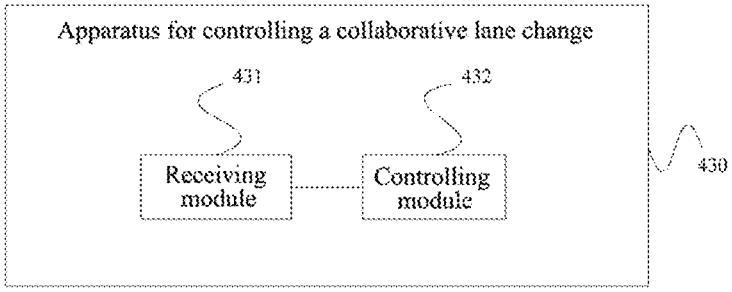
FIG. 43 is a structural diagram of an apparatus for controlling a collaborative lane change provided by an embodiment of the present disclosure.

FIG. 43 is a structural diagram of an apparatus for controlling a collaborative lane change provided by an embodiment of the present disclosure. The apparatus for controlling a collaborative lane change provided by the embodiment of the present disclosure may perform the processing provided by the embodiment of the method for controlling a collaborative lane change. As shown in FIG. 43, the apparatus for controlling a collaborative lane change 430 includes a receiving module 431 and a controlling module 432. The apparatus for controlling a collaborative lane change 430 may be specifically integrated into a traffic control unit, and is configured to implement the CLC application. Specifically, the receiving module 431 is configured to receive a lane change request transmitted by a first vehicle, where the lane change request includes vehicle information of the first vehicle; and the controlling module 432 is configured to transmit a first control instruction to the first vehicle according to the vehicle information of the first vehicle and vehicle information of other vehicles in a target lane to which the first vehicle requests to change to cause the first vehicle to perform a lane change according to the first control instruction.

Optionally, the controlling module 432 is specifically configured to transmit the first control instruction to the first vehicle according to the vehicle information of the first vehicle and the vehicle information of a second vehicle adjacent to the first vehicle in the target lane to which the first vehicle requests to change, so as to cause the first vehicle to perform the lane change according to the first control instruction.

Optionally, the controlling module 432 is specifically configured to transmit the first control instruction to the first vehicle when a speed of the first vehicle is greater than a speed of the second vehicle adjacent to the first vehicle in the target lane to which the first vehicle requests to change, so as to cause the first vehicle to perform the lane change according to the first control instruction.

Optionally, the controlling module 432 is further configured to transmit a second control instruction to the first vehicle when the speed of the first vehicle is smaller than the speed of the second vehicle adjacent to the first vehicle in the target lane to which the first vehicle requests to change, so as to cause the first vehicle to decelerate or stop according to the second control instruction.

Optionally, the controlling module 432 is specifically configured to: transmit the first control instruction to the first vehicle when a lane change preparation action of the first vehicle occurs; or transmit the first control instruction to the first vehicle when a lane change action of the first vehicle occurs.

Optionally, the controlling module 432 is specifically configured to: transmit the second control instruction to the first vehicle when the lane change preparation action of the first vehicle occurs; or transmit the second control instruction to the first vehicle when the lane change action of the first vehicle occurs.

Optionally, the controlling module 432 is specifically configured to transmit the first control instruction to the first vehicle when it is determined that there is no second vehicle, which has a confluence priority higher than a confluence priority of the first vehicle, in a confluence area where the first vehicle is located according to the vehicle information of the first vehicle and the vehicle information of the other vehicles in the target lane to which the first vehicle requests to change, so as to cause the first vehicle to perform a confluence driving according to the first control instruction.

Optionally, the controlling module 432 is further configured to: transmit the second control instruction to the first vehicle if it is determined that there is a second vehicle, which has the confluence priority higher than the confluence priority of the first vehicle, in the confluence area according to the information of the first vehicle and the vehicle information of the other vehicles in the target lane to which the first vehicle requests to change, so as to cause the first vehicle to decelerate or stop according to the second control instruction.

Optionally, the controlling module 432 is specifically configured to determine that there is the second vehicle, which has the confluence priority higher than the confluence priority of the first vehicle, in the confluence area when a road right level of the target lane to which the first vehicle requests to change is higher than a road right level of a first lane where the first vehicle is located, and the second vehicle in the target lane is in the confluence area.

Optionally, the controlling module 432 is specifically configured to determine that there is the second vehicle, which has the confluence priority higher than the confluence priority of the first vehicle, in the confluence area when a road right level of the first lane where the first vehicle is located is equal to a road right of a second lane where the second vehicle in the confluence area, which requests to change to the target lane, is located, and if a third vehicle that performs a confluence driving in the target lane drives out from the first lane.

Optionally, the receiving module 431 is further configured to receive feedback information transmitted by the second vehicle, where the feedback information indicates that the second vehicle has completed a confluence driving; and the controlling module 432 is configured to transmit the first control instruction to the first vehicle, so as to cause the first vehicle to perform the confluence driving according to the first control instruction.

Optionally, the controlling module 432 is specifically configured to: determine a reverse vehicle routing area in the target lane to which the first vehicle requests to change according to the lane information of the first lane where the first vehicle is located; determine an order in which the first vehicle and the second vehicle reach the reverse vehicle routing area according to the vehicle information of the first vehicle and the vehicle information of the second vehicle in the target lane to which the first vehicle requests to change; transmit the first control instruction to the first vehicle according to the order in which the first vehicle and the second vehicle reach the reverse vehicle routing area, so as to cause the first vehicle to perform the lane change according to the first control instruction.

Optionally, the controlling module 432 is specifically configured to transmit, a first control instruction to the first vehicle when the first vehicle reaches the reverse vehicle routing area earlier than the second vehicle, so as to cause the first vehicle to perform a reverse vehicle routing in the reverse vehicle routing area of the target lane according to the first control instruction.

Optionally, the controlling module 432 is further configured to transmit a second control instruction to the first vehicle when the second vehicle reaches the reverse vehicle routing area earlier than the first vehicle, so as to cause the first vehicle to decelerate or stop according to the second control instruction.

Optionally, the controlling module 432 is specifically configured to transmit the first control instruction to the first vehicle according to the order in which the first vehicle and the second vehicle reach the reverse vehicle routing area, the lane information of the first lane where the first vehicle is located and lane information of the target lane, so as to cause the first vehicle to perform the lane change according to the first control instruction.

Optionally, the controlling module 432 is specifically configured to transmit the first control instruction to the first vehicle when the second vehicle reaches the reverse vehicle routing area earlier than the first vehicle and a traffic flow in the target lane is smaller than that in the first lane where the first vehicle is located, so as to cause the first vehicle to perform the reverse vehicle routing in the reverse vehicle routing area of the target lane according to the first control instruction.

Optionally, the controlling module 432 is further configured to transmit the second control instruction to the first vehicle when the first vehicle reaches the reverse vehicle routing area earlier than the second vehicle and the traffic flow in the target lane is larger than that in the first lane where the first vehicle is located, so as to cause the first vehicle to decelerate or stop according to the second control instruction.

Optionally, the controlling module 432 is further configured to transmit the second control instruction to the first vehicle when the road right level of the first lane where the first vehicle is located is lower than the road right level of the target lane to which the first vehicle requests to change, so as to cause the first vehicle to decelerate or stop according to the second control instruction.

Optionally, the vehicle information of the first vehicle includes at least one of the following: position information and a head direction angle of the first vehicle.

Optionally, the vehicle information of the first vehicle further includes at least one of the following: time information, a size, a speed, a longitudinal accelerated speed, a yaw velocity, a steering signal and a steering wheel angle of the first vehicle.

The apparatus for controlling a collaborative lane change provided by the embodiment of the present disclosure may be specifically configured to perform the above method embodiment provided in FIGS. 36, 40 and 42, and specific functions will not be repeated herein again.

In the present embodiment of the disclosure, the traffic control unit receives the lane change request transmitted by the first vehicle, where the lane change request includes vehicle information of the first vehicle, and transmits the first control instruction to the first vehicle according to the vehicle information of the first vehicle and the vehicle information of the other vehicles in the target lane to which the first vehicle requests to change, so as to cause the first vehicle to perform the lane change according to the first control instruction, whereby improving the traffic efficiency and safety of the vehicle during the lane change process.

Figure 44:
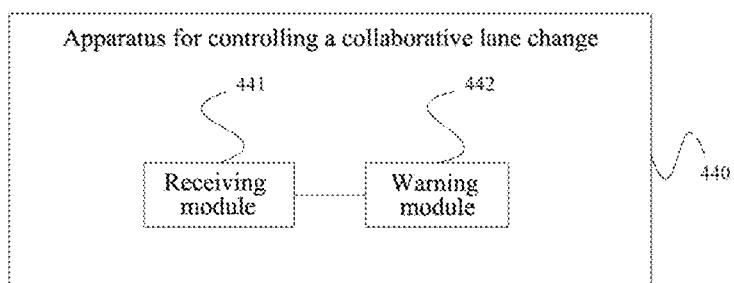
FIG. 44 is a structural diagram of an apparatus for controlling a collaborative lane change provided by another embodiment of the present disclosure.

FIG. 44 is a structural diagram of an apparatus for controlling a collaborative lane change provided by another embodiment of the present disclosure. The apparatus for controlling a collaborative lane change provided by the embodiment of the present disclosure may perform the processing provided by the embodiment of the method for controlling a collaborative lane change. As shown in FIG. 44, the apparatus for controlling a collaborative lane change 440 includes: a receiving module 441 and a warning module 442. The apparatus for controlling a collaborative lane change 440 may be specifically integrated into a mobile phone, a trip computer or an on board unit in a second vehicle, and is configured to implement the CLC application. Specifically, the receiving module 441 is configured to receive a lane change request transmitted by a first vehicle, where the lane change request includes vehicle information of the first vehicle, and the first vehicle requests to change to a second lane where the second vehicle is located through the lane change request; and the warning module 442 is configured to performing a lane changing vehicle warning on the second vehicle according to the lane change request.

Optionally, the warning module 442 is specifically configured to transmit a deceleration warning or a stop warning to the second vehicle when a speed of the first vehicle is greater than a speed of the second vehicle.

Optionally, the warning module 442 is specifically configured to transmit an acceleration warning to the second vehicle when the speed of the first vehicle is greater than the speed of the second vehicle.

The apparatus for controlling a collaborative lane change provided by the embodiment of the present disclosure may be specifically configured to perform the above method embodiment provided in FIG. 34, and specific functions will not be repeated herein again.

In the present embodiment of the disclosure, a terminal device in the second vehicle receives the lane change request transmitted by the first vehicle, and performing the lane changing vehicle warning on the second vehicle according to the lane change request, thereby improving the traffic efficiency and security of the vehicle during the lane change process.

Figure 45:
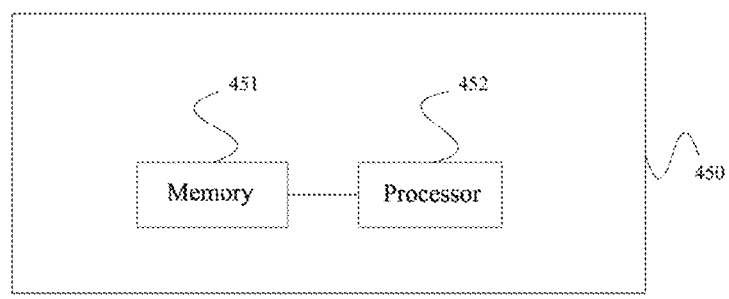
FIG. 45 is a structural diagram of a traffic control unit provided by an embodiment of the present disclosure.

FIG. 45 is a structural diagram of a traffic control unit provided by an embodiment of the present disclosure. As shown in FIG. 45, the traffic control unit 450 includes: a memory 451 and a processor 452; where the memory 451 is configured to store a program code; the processor 452 calls the program code, which, when being executed, is configured to perform the method for controlling a collaborative lane change described in the above embodiments.

Figure 46:
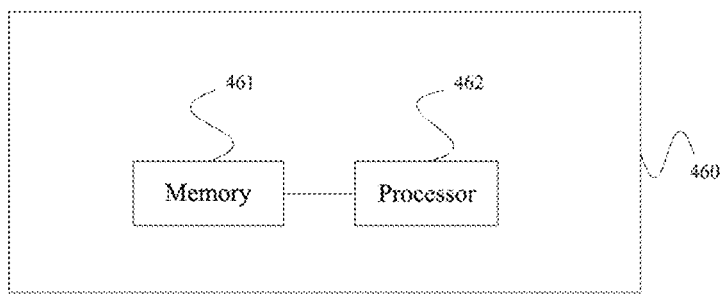
FIG. 46 is a structural diagram of a terminal device provided by an embodiment of the present disclosure.

FIG. 46 is a structural diagram of a terminal device provided by an embodiment of the present disclosure. The terminal device may be a mobile phone, a trip computer or an on board unit in a second vehicle. As shown in FIG. 46, the terminal device 460 includes: a memory 461 and a processor 462; where the memory 461 is configured to store a program code; the processor 462 calls the program code, which, when being executed, is configured to perform the method for controlling a collaborative lane change described in the above embodiments.

In addition, an embodiment of the present disclosure further provides a computer readable storage medium including instructions, which, when being executed on a computer, cause the computer to perform the method for controlling a collaborative lane change as described in the above embodiments.

In the several embodiments provided by the present disclosure, it should be understood that the disclosed apparatus and method may be implemented in other manners. For example, the device embodiments described above are merely illustrative. For example, the division of the unit is only a logical function division. In actual implementation, there may be another division manner, for example, multiple units or components may be combined or integrated into another system, or some features may be ignored or not implemented. Alternatively, the coupling, direct coupling or communication connection shown or discussed may be an indirect coupling or communication connection through some interfaces, devices or units, and may be in electrical, mechanical or other form.

The units described as separate components may or may not be physically separated, and the components illustrated as units may or may not be physical units, that is, may be located in one place, or may be distributed to multiple network units. Some or all of the units may be selected according to actual needs to achieve the objectives of the solution of the embodiment.

In addition, each functional unit in each embodiment of the present disclosure may be integrated into one processing unit, or each unit may exist physically separately, or two or more units may be integrated into one unit. The above integrated unit may be implemented in the form of hardware or in the form of hardware plus software functional units.

The above-described integrated unit implemented in the form of a software functional unit may be stored in a computer readable storage medium. The above software functional unit is stored in a storage medium and includes instructions for causing a computer device (which may be a personal computer, a server, or a network device and the like) or a processor to perform part of the steps in the methods of the various embodiments of the present disclosure. The foregoing storage medium includes: a U disk, a mobile hard disk, a read-only memory (ROM), a random access memory (RAM), a diskette, or an optical disk, and the like, which may store a program code.

A person skilled in the art may clearly understand that for the convenience and brevity of the description, the division of each functional module described above is only exemplified. In practical applications, the above functions may be assigned to and completed by different functional modules as needed, that is, the internal structure of the apparatus is divided into different functional modules to perform all or part of the functions described above. For the specific working process of the apparatus described above, reference may be made to the corresponding process in the foregoing method embodiments, and details are not repeated herein.

Finally, it should be understood that the above embodiments are only used to illustrate the technical solution of the present disclosure, and not to limit it; although the present disclosure has been described in detail with reference to the foregoing embodiments, those skilled in the art would understand that the technical solutions described in the foregoing embodiments may be modified, or equivalent substitutions may be made for some or all of the technical features thereof; these modifications and substitutions do not make the corresponding technical features depart from the scope of the embodiments of the present disclosure.

What is claimed is:

1. A method for obstacle in lane warning, comprising:
receiving information of an obstacle in a front lane of a first vehicle, wherein the first vehicle is in front of a second vehicle; and
performing an obstacle warning on the second vehicle according to the information of the obstacle;
wherein the performing an obstacle warning on the second vehicle according to the information of the obstacle comprises performing the obstacle warning when it is determined that the second vehicle after performing a lane change may collide with the obstacle according to lane change information of the second vehicle.

2. The method according to claim 1, wherein the receiving information of an obstacle in a front lane of a first vehicle comprises:
receiving the information of the obstacle transmitted by the first vehicle, wherein the information of the obstacle is obtained by the first vehicle by detecting the obstacle in the front lane of the first vehicle.

3. The method according to claim 2, wherein the receiving the information of the obstacle transmitted by the first vehicle comprises:
receiving the information of the obstacle transmitted by the first vehicle by broadcasting.

4. The method according to claim 2, wherein the receiving the information of the obstacle transmitted by the first vehicle comprises:
receiving the information of the obstacle transmitted by the first vehicle and forwarded through a traffic control unit.

5. The method according to claim 1, wherein the information of an obstacle in a front lane of a first vehicle comprises:
receiving the information of the obstacle transmitted by traffic control unit, wherein the information of the obstacle is obtained by a road side unit in front of the first vehicle by detecting the obstacle in a driving lane within a sensing range of the road side unit, and the road side unit and the traffic control unit are connected through a wired network or a wireless network.

6. The method according to claim 1, wherein the performing an obstacle warning on the second vehicle according to the information of the obstacle comprises:
performing the obstacle warning when it is determined that the second vehicle may collide with the obstacle according to the information of the obstacle and the vehicle information of the second vehicle.

7. The method according to claim 6, wherein the performing the obstacle warning when it is determined that the second vehicle may collide with the obstacle according to the information of the obstacle and the vehicle information of the second vehicle comprises:
performing the obstacle warning when it is determined that the obstacle is located in a lane where the second vehicle is currently located according to the information of the obstacle and the vehicle information of the second vehicle.

8. The method according to claim 7, wherein the performing the obstacle warning when it is determined that the obstacle is located in a lane where the second vehicle is currently located according to the information of the obstacle and the vehicle information of the second vehicle comprises:
performing the obstacle warning when it is determined that the obstacle is located in the lane where the second vehicle is currently located and a distance between the second vehicle and the obstacle is within a preset range according to the information of the obstacle and the vehicle information of the second vehicle.

9. The method according to claim 1, further comprising:
detecting the lane change information of the second vehicle when it is determined that the obstacle is not located in the lane where the second vehicle is currently located according to the information of the obstacle and vehicle information of the second vehicle.

10. The method according to claim 1, wherein the lane change information comprises at least one of the following: a steering signal and a steering wheel angle.

11. The method according to claim 1, wherein the performing the obstacle warning when it is determined that the second vehicle after performing the lane change may collide with the obstacle according to the lane change information of the second vehicle comprises:
performing the obstacle warning when a lane change preparation action occurs when it is determined that the second vehicle after performing the lane change may collide with the obstacle according to the lane change information of the second vehicle.

12. The method according to claim 1, wherein the performing the obstacle warning when it is determined that the second vehicle after performing the lane change may collide with the obstacle according to the lane change information of the second vehicle comprises:
performing the obstacle warning when a lane change action occurs when it is determined that the second vehicle after performing the lane change may collide with the obstacle according to the lane change information of the second vehicle.

13. The method according to claim 6, wherein the vehicle information of the second vehicle comprises at least one of the following:
position information of the second vehicle, information of the lane where the second vehicle is located, a speed of the second vehicle and a driving direction of the second vehicle.

14. The method according to claim 1, wherein the information of the obstacle comprises at least one of the following:
position information of the obstacle, and information of a lane where the obstacle is located.

15. The method according to claim 14, wherein the information of the obstacle further comprises at least one of the following:
size of the obstacle, type of the obstacle, time information, and description information of the obstacle.

16. A method for obstacle in lane warning, comprising:
receiving information of an obstacle in a front lane of a first vehicle; and
performing an obstacle warning on a second vehicle behind the first vehicle according to the information of the obstacle;
receiving the vehicle information of the second vehicle transmitted by the second vehicle behind the first vehicle;
wherein the performing an obstacle warning on a second vehicle behind the first vehicle according to the information of the obstacle comprises:
performing the obstacle warning on the second vehicle when it is determined that the second vehicle may collide with the obstacle according to the information of the obstacle and vehicle information of the second vehicle;
wherein the vehicle information of the second vehicle comprises:
lane change information of the second vehicle; and
the performing the obstacle warning on the second vehicle when it is determined that the second vehicle may collide with the obstacle according to the information of the obstacle and the vehicle information of the second vehicle comprises:
performing the obstacle warning on the second vehicle when it is determined that the second vehicle after performing the lane change may collide with the obstacle according to the information of the obstacle and the vehicle information of the second vehicle.

17. The method according to claim 16, wherein the receiving information of an obstacle in a front lane of a first vehicle comprises:
receiving the information of the obstacle transmitted by the first vehicle, wherein the information of the obstacle is obtained by the first vehicle by detecting the obstacle in the front lane of the first vehicle.

18. The method according to claim 16, wherein the receiving information of an obstacle in a front lane of a first vehicle comprises:
receiving the information of the obstacle transmitted by a road side unit in front of the first vehicle, wherein the information of the obstacle is obtained by the road side unit in front of the first vehicle by detecting the obstacle in a driving lane within a sensing range of the road side unit.

19. The method according to claim 16, wherein the performing an obstacle warning on a second vehicle behind the first vehicle according to the information of the obstacle comprises:
transmitting the information of the obstacle to the second vehicle behind the first vehicle, so as to cause the second vehicle to avoid a collision with the obstacle.

20. The method according to claim 16, wherein the performing an obstacle warning on a second vehicle behind the first vehicle according to the information of the obstacle comprises:
transmitting obstacle warning information to the second vehicle behind the first vehicle according to the information of the obstacle, so as to cause the second vehicle to avoid a collision with the obstacle.

21. The method according to claim 16, wherein the performing the obstacle warning on the second vehicle when it is determined that the second vehicle may collide with the obstacle according to the information of the obstacle and the vehicle information of the second vehicle comprises:
performing the obstacle warning on the second vehicle when it is determined that the obstacle is located in a lane where the second vehicle is currently located according to the information of the obstacle and the vehicle information of the second vehicle.

22. The method according to claim 21, wherein the performing the obstacle warning on the second vehicle when it is determined that the obstacle is located in a lane where the second vehicle is currently located according to the information of the obstacle and the vehicle information of the second vehicle comprises:
performing the obstacle warning on the second vehicle when it is determined that the obstacle is located in the lane where the second vehicle is currently located and a distance between the second vehicle and the obstacle is within a preset range according to the information of the obstacle and the vehicle information of the second vehicle.

23. The method according to claim 16, wherein the lane change information comprises at least one of the following:
a steering signal and a steering wheel angle.

24. The method according to claim 16, wherein the vehicle information of the second vehicle comprises at least one of the following:
position information of the second vehicle, information of the lane where the second vehicle is located, a speed of the second vehicle and a driving direction of the second vehicle.

25. The method according to claim 16, wherein the information of the obstacle comprises at least one of the following:
position information of the obstacle, and information of a lane where the obstacle is located.

26. The method according to claim 25, wherein the information of the obstacle further comprises at least one of the following:
size of the obstacle, type of the obstacle, time information, and description information of the obstacle.

27. An apparatus for obstacle in lane warning, comprising a memory and a processor;
wherein the memory is configured to store program code;
the processor is configured to call the program code, and when executing the program code, is configured to:
receive information of an obstacle in a front lane of a first vehicle, wherein the first vehicle is in front of a second vehicle perform an obstacle warning on the second vehicle according to the information of the obstacle; and detect lane change information of the second vehicle;

wherein the processor is further configured to determine that the obstacle is not located in the lane where the second vehicle is currently located according to the information of the obstacle and the vehicle information of the second vehicle, and perform an obstacle warning when it is determined that the second vehicle after performing a lane change may collide with the obstacle according to the lane change information of the second vehicle.

28. The apparatus for obstacle in lane warning according to claim 27, wherein the processor is configured to receive the information of the obstacle transmitted by the first vehicle, wherein the information of the obstacle is obtained by the first vehicle by detecting the obstacle in the front lane of the first vehicle.

29. The apparatus for obstacle in lane warning according to claim 28, wherein the processor is configured to receive the information of the obstacle transmitted by the first vehicle by broadcasting.

30. The apparatus for obstacle in lane warning according to claim 28, wherein the processor is configured to receive the information of the obstacle transmitted by the first vehicle and forwarded through the traffic control unit.

31. The apparatus for obstacle in lane warning according to claim 27, wherein the processor is configured to receive the information of the obstacle transmitted by traffic control unit, wherein the information of the obstacle is obtained by a road side unit in front of the first vehicle by detecting the obstacle in a driving lane within a sensing range of the road side unit, and the road side unit and the traffic control unit are connected through a wired network or a wireless network.

32. The apparatus for obstacle in lane warning according to claim 27, wherein the processor is configured to perform the obstacle warning when it is determined that the second vehicle may collide with the obstacle according to the information of the obstacle and the vehicle information of the second vehicle.

33. The apparatus for obstacle in lane warning according to claim 32, wherein the processor is configured to perform the obstacle warning when it is determined that the obstacle is located in a lane where the second vehicle is currently located according to the information of the obstacle and the vehicle information of the second vehicle.

34. The apparatus for obstacle in lane warning according to claim 33, wherein the processor is configured to perform the obstacle warning when it is determined that the obstacle is located in the lane where the second vehicle is currently located and a distance between the second vehicle and the obstacle is within a preset range according to the information of the obstacle and the vehicle information of the second vehicle.

35. The apparatus for obstacle in lane warning according to claim 27, wherein the lane change information comprises at least one of the following:

a steering signal and a steering wheel angle.

36. The apparatus for obstacle in lane warning according to claim 27, wherein the processor is configured to perform the obstacle warning when it is determined that the second vehicle after performing the lane change may collide with the obstacle according to the lane change information of the second vehicle and a lane change preparation action occurs.

37. The apparatus for obstacle in lane warning according to claim 27, wherein the processor is configured to perform the obstacle warning when it is determined that the second vehicle after performing the lane change may collide with the obstacle according to the lane change information of the second vehicle and a lane change action occurs.

38. The apparatus for obstacle in lane warning according to claim 27, wherein the vehicle information of the second vehicle comprises at least one of the following:

position information of the second vehicle, information of the lane where the second vehicle is located, a speed of the second vehicle and a driving direction of the second vehicle.

39. The apparatus for obstacle in lane warning according to claim 27, wherein the information of the obstacle comprises at least one of the following:

position information of the obstacle, and information of a lane where the obstacle is located.

40. The apparatus for obstacle in lane warning according to claim 39, wherein the information of the obstacle further comprises at least one of the following:

size of the obstacle, type of the obstacle, time information, and description information of the obstacle.

41. An apparatus for obstacle in lane warning, comprising a memory and a processor;

wherein the memory is configured to store program code;

the processor is configured to call the program code, and when executing the program code, is configured to:

receive information of an obstacle in a front lane of a first vehicle; and perform an obstacle warning on a second vehicle behind the first vehicle according to the information of the obstacle;

wherein the processor is further configured to receive vehicle information of the second vehicle transmitted by the second vehicle behind the first vehicle;

wherein the vehicle information of the second vehicle comprises:

lane change information of the second vehicle; and the processor is configured to perform the obstacle warning on the second vehicle when it is determined that the second vehicle after performing a lane change may collide with the obstacle according to the information of the obstacle and the vehicle information of the second vehicle.

42. The apparatus for obstacle in lane warning according to claim 41, wherein the processor is configured to receive the information of the obstacle transmitted by the first vehicle, wherein the information of the obstacle is obtained by the first vehicle by detecting the obstacle in the front lane of the first vehicle.

43. The apparatus for obstacle in lane warning according to claim 41, wherein the processor is configured to receive the information of the obstacle transmitted by a road side unit in front of the first vehicle, wherein the information of the obstacle is obtained by the road side unit in front of the first vehicle by detecting the obstacle in a driving lane within a sensing range of the road side unit.

44. The apparatus for obstacle in lane warning according to claim 41, wherein the processor is configured to transmit the information of the obstacle to the second vehicle behind the first vehicle, so as to cause the second vehicle to avoid a collision with the obstacle.

45. The apparatus for obstacle in lane warning according to claim 41, wherein the processor is configured to transmit obstacle warning information to the second vehicle behind the first vehicle according to the information of the obstacle, so as to cause the second vehicle to avoid a collision with the obstacle.

46. The apparatus for obstacle in lane warning according to claim 41, wherein the processor is configured to perform the obstacle warning on the second vehicle when it is determined that the obstacle is located in a lane where the second vehicle is currently located according to the information of the obstacle and the vehicle information of the second vehicle.

47. The apparatus for obstacle in lane warning according to claim 46, wherein the processor is configured to perform the obstacle warning on the second vehicle when it is determined that the obstacle is located in the lane where the second vehicle is currently located and a distance between the second vehicle and the obstacle is within a preset range according to the information of the obstacle and the vehicle information of the second vehicle.

48. The apparatus for obstacle in lane warning according to claim 41, wherein the lane change information comprises at least one of the following:
   a steering signal and a steering wheel angle.

49. The apparatus for obstacle in lane warning according to claim 41, wherein the vehicle information of the second vehicle comprises at least one of the following:
   position information of the second vehicle, information of the lane where the second vehicle is located, a speed of the second vehicle and a driving direction of the second vehicle.

50. The apparatus for obstacle in lane warning according to claim 41, wherein the information of the obstacle comprises at least one of the following:
   position information of the obstacle, and information of a lane where the obstacle is located.

51. The apparatus for obstacle in lane warning according to claim 50, wherein the information of the obstacle further comprises at least one of the following:
   size of the obstacle, type of the obstacle, time information, and description information of the obstacle.

52. A terminal device, comprising: a memory and a processor;
   wherein the memory is configured to store program code;
   the processor is configured to call the program code, which, when being executed, is configured to perform the method described in claim 1.

53. A traffic control unit, comprising: a memory and a processor;
   wherein the memory is configured to store program code;
   the processor is configured to call the program code, which, when being executed, is configured to perform the method described in claim 16.

54. A non-transitory, computer readable storage medium, comprising instructions, which, when being executed on a computer, cause the computer to perform the method of claim 1.

55. A non-transitory, computer readable storage medium, comprising instructions, which, when being executed on a computer, cause the computer to perform the method of claim 16.

* * * * *